US012475537B2

(12) United States Patent
Davies et al.

(10) Patent No.: US 12,475,537 B2
(45) Date of Patent: *Nov. 18, 2025

(54) METHOD AND SYSTEM FOR IMAGE PROCESSING

(71) Applicant: MONSTERS ALIENS ROBOTS ZOMBIES INC., Toronto (CA)

(72) Inventors: Thomas Davies, Toronto (CA); Ali Mahdavi-Amiri, North Vancouver (CA); Matthew Panousis, Toronto (CA); Jonathan Bronfman, Toronto (CA); Lon Molnar, Toronto (CA); Paul Birulin, Toronto (CA); Debjoy Chowdhury, Toronto (CA); Ishrat Badami, Toronto (CA); Anton Skourides, Toronto (CA)

(73) Assignee: MONSTERS ALIENS ROBOTS ZOMBIES INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,914

(22) Filed: Jan. 16, 2024

(65) Prior Publication Data

US 2024/0273676 A1 Aug. 15, 2024

Related U.S. Application Data

(63) Continuation of application No. 17/696,535, filed on Mar. 16, 2022, now Pat. No. 11,875,491.
(Continued)

(51) Int. Cl.
*G06T 5/50* (2006.01)
*G06T 7/11* (2017.01)
(Continued)

(52) U.S. Cl.
CPC ............... *G06T 5/50* (2013.01); *G06T 7/11* (2017.01); *G06T 11/60* (2013.01); *G06V 10/774* (2022.01);
(Continued)

(58) Field of Classification Search
CPC ... G06T 5/50; G06T 7/11; G06T 11/60; G06T 2207/20084; G06T 2207/30196;
(Continued)

(56) References Cited

U.S. PATENT DOCUMENTS 5,912,994 A * 6/1999 Norton .................. G11B 27/034
348/E5.051
10,372,991 B1 8/2019 Niemasik et al.
(Continued)

FOREIGN PATENT DOCUMENTS

| CA | 3152644 A1 | 9/2022 |
| CN | 114049278 A | 2/2022 |
| EP | 2277141 A2 | 1/2011 |

OTHER PUBLICATIONS

Holden, D., 2017. Reducing animator keyframes (Doctoral dissertation).*
(Continued)

*Primary Examiner* — Sarah Lhymn
(74) *Attorney, Agent, or Firm* — Norton Rose Fulbright Canada LLP

(57) ABSTRACT

An image processing system comprising: a computer readable medium and at least one processor configured to provide a machine learning architecture for image processing. In particular, modified keyframes are used for training the machine learning architecture. The modifications are then automatically propagated to remaining frames requiring modification through interpolation or extrapolation through processing remaining frames through the trained
(Continued)

machine learning architecture. The generated modified frames or frame portions can then be inserted into an original video to generate a modified video where the modifications have been propagated. Example usages include automatic computational approaches for aging/de-aging and addition/removal of tattoos or other visual effects.

20 Claims, 29 Drawing Sheets

Related U.S. Application Data

(60) Provisional application No. 63/161,967, filed on Mar. 16, 2021.

(51) Int. Cl.
　　*G06T 11/60*　　(2006.01)
　　*G06V 10/774*　　(2022.01)
　　*G06V 40/10*　　(2022.01)
(52) U.S. Cl.
　　CPC .... *G06V 40/10* (2022.01); *G06T 2207/20084* (2013.01); *G06T 2207/30196* (2013.01)
(58) Field of Classification Search
　　CPC ...... G06T 11/00; G06V 10/774; G06V 40/10; G06V 10/25; G06V 10/7788; G06V 10/82; G06V 20/46; G06V 40/103; G06V 40/161
　　See application file for complete search history.

(56) References Cited

U.S. PATENT DOCUMENTS

| | | | |
|---|---|---|---|
| 10,658,005 | B1 | 5/2020 | Bogan, III et al. |
| 11,435,886 | B1 | 9/2022 | Yavercovski |
| 11,875,491 | B2* | 1/2024 | Davies .................. G06V 10/82 |
| 12,118,668 | B2* | 10/2024 | Bloesch .................. G06T 7/593 |
| 2015/0065803 | A1* | 3/2015 | Douglas ................. G06T 7/143 |
| | | | 600/200 |
| 2018/0035869 | A1* | 2/2018 | Yamaya ............. A61B 1/00098 |
| 2019/0087660 | A1 | 3/2019 | Hare et al. |
| 2019/0197670 | A1 | 6/2019 | Ferrer et al. |
| 2019/0311202 | A1 | 10/2019 | Lee et al. |
| 2021/0056313 | A1 | 2/2021 | Nir et al. |
| 2021/0272599 | A1 | 9/2021 | Patterson et al. |
| 2021/0329338 | A1 | 10/2021 | Khov et al. |
| 2022/0084272 | A1* | 3/2022 | Wang ..................... G06N 3/045 |
| 2022/0084273 | A1* | 3/2022 | Pan ........................ G06N 3/049 |
| 2022/0207875 | A1 | 6/2022 | Kopparapu et al. |
| 2022/0239844 | A1* | 7/2022 | Lv ......................... G06T 15/205 |

OTHER PUBLICATIONS

Islam et al., Face Attribute Modification Using Fine-Tuned Attribute-Modification Network, Electronics 2020, 9(5), 743.
Schroff et al., FaceNet: A Unified Embedding for Face Recognition and Clustering, Jun. 17, 2015, arXiv:1503.03832.
Szegedy et al., Going Deeper with Convolutions, pp. 1-9, 2015 IEEE Conference on Computer Vision and Pattern Recognition (CVPR).
Zhou et al., GeneGAN: Learning Object Transfiguration and Attribute Subspace from Unpaired Data, May 14, 2017, arXiv:1705.04932.
PCT International Search Report and Written Opinion dated Feb. 6, 2024 issued in PCT/CA2023/051554.

\* cited by examiner

METHOD AND SYSTEM FOR IMAGE PROCESSING

CROSS REFERENCE

This application is a continuation of U.S. application Ser. No. 17/696,535, dated 2022 Mar. 16, entitled METHOD AND SYSTEM FOR IMAGE PROCESSING which is a non-provisional of, and claimed all benefit including priority to, U.S. Application No. 63/161,967 dated 2021 Mar. 16 and entitled METHOD AND SYSTEM FOR IMAGE PROCESSING, incorporated herein by reference in its entirety.

FIELD

The present disclosure relates to image processing, more specifically it relates to the automatic application of visual effects to objects and characters, or portions thereof in captured images appearing in motion picture productions, and gaming productions.

INTRODUCTION

Visual effects, referred to as VFX, are used in relation to media productions. VFX describes imagery created, altered, or enhanced for a film or other moving media that cannot be accomplished during live-action shooting. Accordingly, much of the visual effects takes place in post-production, after primary image capture is complete. Visual effects can be added to live-action, captured through techniques such as matte painting; rear-projection and front-screen projection; miniature or forced perspective sets; computer graphic objects, characters, and environments; and compositing of images recorded in any number of ways. Visual effects are computationally intensive and technically complex due to the large volume of information conveyed in video. This problem is further compounded for high resolution/high frame rate video.

VFX effects, such as, de-aging shots are demonstrated in films as early as 2008, and more recent movies released in 2019. However, the underlying technology for the de-aging often requires expensive and unwieldy camera rigs, tracking markers, motion capture technology or actors to be three dimensionally scanned/photographed from a multitude of angles. Furthermore, these prior art methods are unable to substantially avoid the "Uncanny Valley". As such, the visual output looks fake and plastic. The de-aging is typically conducted manually, on a frame-by-frame basis, and consumes significant production resources and budget. As noted earlier, this is further compounded by high frame rate videos. For example, a recent movie, in 2019, required a significant budget for de-aging the two main actors (e.g., from 70 year old actors to remove 30-40 years of age).

The uncanny valley in aesthetics, is a hypothesized relation between an object's degree of resemblance to a human being and the emotional response to said object. The hypothesis suggests that humanoid objects that imperfectly resemble actual humans provoke "uncanny" familiar feelings of eeriness and revulsion in observers. The "valley" refers to a sharp dip in a human observer's affinity for the replica, which otherwise increases with the replica's human likeness. For example, certain lifelike robotic dolls, which appear almost human, risk eliciting cold, eerie feelings in viewers. This is especially challenging for de-aging type technologies relating to facial modifications, as audiences are well tuned to spot problematic or non-realistic facial modifications.

Cutting-edge methods for automating de-aging and face replacements include deepfake technology, which is becoming widely recognized solution in Hollywood. However, deepfake technology is rarely used in a Hollywood production because it fails logistically and on execution. Logistically, deepfake technology requires thousands of images to train on, which either need to be sourced from old footage of the actor or actress or be created manually. Neither of these approaches are viable for productions. Sourcing from different sources of older footage to capture all the poses and expressions of the actor/actress creates inconsistency in the 'de-aged' look. Furthermore, few older films have been remastered in 4K Blu-Ray which means the level of skin detail and resolution will not match the current project. Edits that were made at a lower resolution may yield unrealistic results as those edits are simply not scalable or adaptable in a new resolution. Additionally, this approach to dataset creation does not allow for aging, beauty work, wig and prosthetic fixes, or any other kind of facial alteration.

At an execution level, deepfake technology fails because it cannot provide anywhere near the level of skin detail needed to pass Hollywood's production quality control process. Generally, 2D solutions are used for 'beauty work' and 'wig and prosthetic fixes'. Using a 3D solution with regards to those applications has been faced with challenges of being impractical, far too expensive. For example, 3D solutions, if not applied correctly, can create a plastic visual aesthetic and do not look as real as the raw footage itself, and no Hollywood studio will opt to degrade the visual aesthetic of the actor/actress themselves in order to remove something as nominal as a blemish or crows feet. Furthermore, no actor or actress will sign off if the finished product is a substantial departure from their likeness. Finally, 3D solutions are far too expensive for this type of work. Accordingly, 3D solutions are not a trade-off worth making for any stakeholders involved in the process. The alternative approach to data creation for deepfake technology is having 2D artists manually create thousands of "de-aged", "aged", or "beautified" frames. This cumbersome approach to dataset creation is also impractical because it offsets the time and cost savings of using AI in the first place.

Researchers experimenting with artificial intelligence solutions have not done so with a lens of solving production-specific challenges. In particular, a production-specific challenge is that there is often no budget to justify the creation of thousands of images of data. Spending those dollars on dataset creation offsets the gains of using AI in the first place and if that were a requirement of the workflow, production would spend those dollars doing the work traditionally, as they would achieve the same outcome, for the same price.

Another solution in the market requires large datasets in order to achieve acceptable results, and in a fast-paced production context, there isn't time, nor is there budget to accommodate for that level of data creation. Content producers in motion picture productions, television productions and gaming productions are always strapped for time and budget.

Given the incredible need for the VFX work for productions and the shortage of VFX studios capable of doing such work, studio executives are forced to allocate VFX work within a single project across multiple vendors. However, this approach to de-aging and beauty tends to lead to inconsistencies between different artists and different studios and an administrative burden that studios would prefer not to take on if they could place all the work in a single VFX company.

SUMMARY

This application is directed to a technical approach for image processing for utilization, for example, in digital visual special effects (VFX) processing. A specific, computer implemented approach is proposed that utilizes a combination of machine learning architectures and training approaches to improve approaches for automatically or semi-automatically applying corrections to images (e.g., modifying an age, adding/removing tattoos, adding science-fiction elements, correcting skin aberrations). In particular, the proposed approaches are utilized to reduce the overall computational and manual burden associated with corrections through using specific architectures, processes, and training approaches to yield computer generated frames that extrapolate or interpolate based on a subset of manual corrections (either in the form of corrected keyframe images for specific keyframes, or machine instructions representing corrections that are applied to specific keyframes).

By extrapolating and interpolating from these keyframes, manual edits can be distributed automatically across all frames including a particular actor, human being, or even an object, depending on the usage scenarios. As the automatically generated edits may still include some accuracy or visual artifacts/aberrations, in some embodiments, the edits are processed in a further post-generation validation stage whereby automatically generated frames are accepted, designed for touch-ups/revisions, or rejected. The acceptance and designation for touch-ups/revisions can also be used for further re-training of the system, such as re-training and/or modifying weights of a machine representation exhibited in a model architecture. In some embodiments, the machine representations are maintained on a per actor basis (e.g., eye-bag removal for a specific actor or actress), and in other embodiments, the machine representations are maintained on a global human being level for a particular type of edit (e.g., eye-bag removal applicable to all humans). In some embodiments, machine representations are maintained on a per type of modification level (e.g. a trained model for eye-bag removal, another for wrinkle removal, another for chin shape modifications).

Prior approaches to image processing for these usage scenarios involved significant manual effort, or the use of makeup/prostheses, yielding high visual effects costs (e.g., frame by frame manual corrections), imperfect corrections (e.g., hair piece has an unnatural hair line), or extremely uncomfortable prosthetics (e.g., a visor in a science-fiction show caused the actor to suffer from headaches due to the constant pressure applied to the actor's head).

An automatic or semi-automatic approach is desirable as it frees up valuable and limited visual effects resources. However, it is technically challenging to implement in practical scenarios in view of practical limitations on available computer processor resources, as alternative "brute force" type approaches require significant resources (e.g., months for an entire movie or show to be processed). A further challenge of utilizing computer-based approaches is that the human mind is capable of identifying small discrepancies (e.g., the "uncanny valley"), and thus the computer-based approaches have low error tolerance and the output must have a high fidelity with a reference look of the actor/actress.

In the proposed approach, specific approaches and structures for machine learning are described which combine deep learning approaches and techniques that are adapted for interpolation and/or extrapolation using a keyframe-based training approach for training a machine learning model architecture. The trained machine learning model architecture represents a trained model and can be utilized to process input frames such that instead of manually editing each frame individually, frame edits are propagated across interpolated or extrapolated frames. Variations are also described in relation to approaches for using modified inputs and/or outputs into the system to help improve the performance or the functioning of the machine learning architecture in practical real-world situations. The modified inputs, for example, can include the establishment of an augmented set of original keyframe images, whereby for a particular original keyframe image, the frame images are also scaled, translated, rotated, flipped, having varying tints, hues, brightness, saturation, contrast, etc., and these augmented sets are provided instead for training. The augmentations can, in a first embodiment, be conducted after manual edit of the keyframe by a visual effects specialist, or in a second embodiment, the visual effects specialist can edit each of the augmented keyframes.

In some embodiments, the augmentations and identification of keyframes can be established based on a pre-processing of the entire production or set of relevant frames to identify the relevant ranges of various visual characteristics that can then be used to inform and/or guide the identification/selection of keyframes. In particular, keyframes can be identified or selected from the overall set of frames being analyzed that have a particular distribution that is able to strongly represent the ranges of the visual characteristics (instead of a naïve approach where, for example, every $100^{th}$ frame is used, etc.). Similarly, as described herein, in a variant embodiment, augmentations are generated in a "guided" manner whereby the augmentations are generated based on a perturbation of various visual characteristics to improve how well the modified keyframes in training represent the distribution or ranges of various visual characteristics in the relevant frames. A guided approach for augmentations can help improve performance relative to a naïve augmentation approach where frames are simply perturbed to create the expanded set without knowledge of the overall shot selection and/or relevant frames.

A combination of the guided augmentation approach and the keyframe selection based on the identified distributions or ranges of the visual characteristics can be used in concert to address various shortcomings in the training set in terms of representation relative to the overall set of frames to be analyzed, improving the ability of the model to accurately generalize during inference time with new input frames. When used in concert, the augmentation approach and the keyframe selection can be used to increase representation in respect of complementary visual characteristics. For example, for augmentation, the approach is well suited for modifications such as brightness, tint, hue, contrast, cropping, rotations, translations, etc. On the other hand, keyframe selection is well suited for identifying representative keyframes where poses are different (e.g. looking in different directions), lighting is coming from different directions or numbers of sources). The combination of guided keyframe selection and augmentation approaches can thus be used to address the shortcomings of each to provide an improved combined solution.

These augmentations are useful in supporting an intentional overfitting approach in a variant embodiment described herein that improves the fidelity of the machine learning model, at a technical cost of increased complexity.

Experimental validation was conducted on various embodiments described herein for experimental use cases in relation to eye-bag removal. The eye-bag removal was conducted across two different television/film productions, where a training set was originally established for a subset of frames designated as keyframes. The training set is a combination of images from the production, as well as images edited or annotated by a visual effects artist (e.g., either in the form of an input stream of processed image keyframes, or instruction sets generated by the visual effects artist for correcting the original frame).

In the validation, example artist time savings were estimated at 51.5% and 56.8%, respectively. The resulting frames automatically generated by the system were then visually inspected to classify a revision status for the frames (e.g., perfect, polish, redo) to control downstream correction processes, which is still required in certain situations to address deficiencies in the outputs of the automated system. In some variations, the correction process outputs can be used as feedback for improving the overall functioning and training of the system in the form of a controlled feedback loop.

A number of variant embodiments are described herein, relating to augmenting the training set without the need for additional manual input from a visual effects artist, methods of training the machine learning model, restricting the image processing to a particular area of interest, editing facial and non-facial features, using the trained machine learning model to process other videos, and de-graining videos prior to their editing.

A proposed approach is described that utilizes an overfitting approach to train the machine learning model with a large number of scenarios, while only requiring a small number of images that have been annotated by a visual effects artist. This increases the fidelity of the machine learning model over a wider range of situations without disproportionately increasing cost. Each image in the training set, both original images and images edited or annotated by a visual effects artist, is subjected to the same automated transformation or combination of transformations to generate a new image that together compose an augmented training set that is many times larger than the original. In this way, the machine learning model can be overfit by using such an expansive training set.

In an example embodiment, a system is provided that uses dimensional transformations and colour alterations to augment the original training set. Dimensional transformations includes scaling, translating and flipping. Colour alterations include varying brightness, hue, saturation and contrast. The dimensional transformations and colour alterations are applied individually and in combination to the original training set. Such an augmented training set allows the machine learning model to function under a wider range of perspectives and lighting.

The machine learning model is capable of being trained for use in a variety of situations, whether it is on a per shot, per episode or per show basis. Optimization may be desirable to improve the performance of the machine learning model under particular circumstances, such as varying the ratio between structural similarity and pixel loss. A model favouring structural similarity loss provides better results on a per episode or per show basis while training favouring per pixel loss provides better results on a per show basis.

In another example embodiment, a system is provided that restricts the image processing to a specific region of interest, which avoids the possibility of undesired changes elsewhere if the entire image is processed. Limiting the processing to the region of interest is also desirable because it reduces the needed processing power and time. A region of interest can be defined by cropping the original image with a rectangular bounding box. The region of interest can be further segmented by using masks to define the area of the image that can undergo image processing. The machine learning model can be used to generate the masks as an output.

The machine learning model is capable of determining the differences between original images from the production and the corresponding edited or annotated images on both a textural and a structural basis. For de-aging, textural changes can address issues such as wrinkles, eye bags and age lines, while structural changes are needed to adjust the size and shape of features such as the nose, jaw, ears, chin and cheeks. It may be sufficient to determine textural modifications by calculating differences between the images in the training set on a per-pixel basis. Determining structural modifications first requires identification of the parameters defining the modified structural feature, followed by calculating the differences at the structural level.

In another proposed approach, the machine learning model can be trained and applied to the correction of both facial and non-facial features. Facial features corrected include removal of wrinkles, removal of eye-bags, and alternation of skin texture and colour. Non-facial features corrected include removal or addition of tattoos and hair.

In yet another proposed approach, the machine learning model can contain a parallel branch architecture. The branching structure of the parallel branch architecture allows for parallel learning and thus the ability to extract features having more local context from a limited number of images in the training set. The additional local context is beneficial for visual effects artists working with high resolution data.

Different approaches can be utilized for parallel processing. In some embodiments, the trained latent space can be utilized for generating outputs in parallel, for example, where there is a single encoder and multiple decoders. The same latent space can be applied across different threads, cores, or processing units, for example, enabling a single trained model to be simultaneously utilized across multiple frames in a distributed approach. Each of the trained networks can then be coupled with a frame pipeline, and input frames could be segmented into groups and provided sequentially to each of the trained networks, which operate in parallel. This approach is useful in utilizing specialized parallel processing capabilities of some processors, such as graphical processing units.

A proposed system for correcting the images of an actor or actress in a video described herein comprises a processor and a computer readable non-transitory storage medium. The computer readable non-transitory storage medium contains machine interpretable instructions that can be executed by the processor, and the instructions encode the machine learning architecture that is trained using a small number of manually modified keyframes relative to the total number of frames in the video. Once trained, the machine learning architecture can be used to correct features of the same actor or actress in in the remaining unmodified frames of the video. The processor can include a computer processor or a microprocessor.

The system comprises a processor and a computer readable non-transitory storage medium. The computer readable non-transitory storage medium contains instructions that can be executed by the processor, and the instructions encode the machine learning architecture that is used to correct the features of the actor or actress. In some embodiments, the system is a special purpose machine, such as a server that is residing in a data center, for example, as a rack mounted appliance. The server can be specially configured to operate in conjunction or in concert with other visual effects computer systems, and may be coupled with a network bus or other type of networking interface to upstream and downstream systems. As described herein, the system generates automatically modified frames based on an initial training set of keyframes that can be modified by a visual effects artist, for example, and the automatically modified frames propagating edits based on a trained computational representation. As part of a quality review cycle, a quality control individual may then review the automatically modified frames for suitability, and identify certain automatically modified frames for re-vision, correction, or touch ups. In some embodiments, the failed automatically modified frames can then be manually modified by a visual effects artist, and the corresponding new modified frames can be added to the training set along with their corresponding unmodified original versions to re-train the machine learning model as part of a feedback pipeline. By using this type of feedback pipeline, the system is further tuned in this embodiment to specifically correct for mistakes that were made initially by the system.

The server is configured for a first training process whereby the system's machine representation in the form of model data architectures are iteratively trained, and then for an inference process for use in production whereby new input frames corresponding to a video, including both a set of corrected keyframes or representations thereof are received, and the system generates output frames or images representing frame regions (e.g., in a situation where masks or regions of interest are utilized to reduce the overall computational burden relative to generating full output frames, which is especially useful for high resolution images).

The newly generated frames are validated and processed, and re-generated or replaced in certain scenarios. The output frames can then be combined with the remaining non-modified frames to generate the final output video, where, for example, the relevant frames of the actors and/or actresses have been computationally edited or modified (e.g., eye-bag removal, wrinkle removal), interpolating the edits from the keyframes across the remaining frames to significantly reduce an amount of manual work.

In some embodiments, the machine learning models are maintained on a per-actor/actress basis, and can be adapted for use against other media in which the actor or actress is in (e.g., extrapolation).

The machine learning architecture is trained using a data set composed of pairs of images, where the first image of each pair is the original image from a keyframe. Keyframes are selected to be representative of the range of different situations in which the target actor or actress appears. Keyframes are also selected so that there are more than one frame, and preferably a large number of frames, between each keyframe. Each keyframe is then modified to generate its modified counterpart. Each modified and/or original keyframe can be augmented by applying different transformations to the modified and/or original keyframe in order to account for the variations in conditions that will be encountered in other frames, including changes in lighting and orientation. Augmentation in this manner makes the training data set more robust and increases the range of conditions in which the machine learning architecture can be used, beyond the conditions of the original keyframes. The training data set is then generated by pairing the original keyframes with their modified counterparts.

Training of the machine learning architecture with the training data set containing manually selected keyframes is done by identification of the perceptual differences between the original and modified keyframes that considers structural differences. The machine learning architecture also considers differences between the original and modified keyframes on a per pixel basis. Using a sufficiently robust training data set allows a single trained machine learning architecture to be used to correct videos of the same actor or actress across an entire movie or television series with multiple episodes.

The trained machine learning model can then be used to modify all frames that are not keyframes containing the target actor or actress by applying the corresponding correction function to each uncorrected frame. The correction function is based on the selected set of keyframes, and generalizes the situation to give a general correction for the entire set of frames. Preferably, the trained machine learning model is able to identify the regions of interest on the body of an actor or actress to which the corrections apply, and, in some embodiments, can be configured to restrict changes to the uncorrected frames to these regions of interest. The trained machine learning model can also be used in other ways to improve the efficiency of the video correction process. It can be used to generate masks delineating the regions of interest within a frame to which the image corrections are limited, preventing undesirable modifications from being made elsewhere in the frame. The masks can then be used to train a second machine learning model. Use of both machine learning models allows for more efficient and more accurate modification of uncorrected frames.

The machine learning model can be trained and processed using different types of frames. Training the machine learning model with de-grained keyframes from which noise has been removed improves the efficiency of the training and allowing the machine learning model to identify small changes in the keyframes that would otherwise be obscured by noise in the images.

The trained machine learning model can be used to make a range of corrections to an actor's image. This includes corrections to facial features such as removal of eye-bags and wrinkles. It can also be used to correct non-facial features such as tattoos and clothing.

In one example, two encoders are provided together instead that interoperate in concert instead. One of the encoders is used for establishing modifications, and the other is used for tracking image segmentation regions, and their combined outputs are used together to place the modifications in the correct region of new input images being processed through the machine learning architecture. Both can be trained on a combination of the original keyframes and their corresponding modified versions, the second encoder configured for tracking regions of interest. When a new input is received during inference time, the first encoder identifies the modification to be applied, and the second encoder pinpoints where the modification should be applied (e.g. by using a segmentation mask around the region of interest).

In this example, there is provided a method for image processing comprising at least one processor and a computer readable medium comprising instructions executable by the at least one processor and configured to provide a machine learning architecture for image processing, to at least:
  receive a plurality of images associated with a scene;
  crop the plurality of images for the region of interest and create cropped first training image pairs (X, Y);
  with crops of the plurality of images, pre-train a first auto encoder using image pairs (X, X) to learn an identity function;

train the first autoencoder using the cropped first training image pairs (X, Y);
perform image modification using the trained autoencoder and generate a first output image;
generate image masks (mask_X) for second training image pairs (X, mask_X);
train a second autoencoder for image segmentation using training image pairs (X, mask_X);
segment a target region of modification and generate a second output image; and
add the first output image to the target region identified by the second output image.

In another example, there is provided an image processing system comprising:
a data ingestion module for receiving a plurality of original images;
a dataset preparation module for cropping the plurality of original images for a region of interest and creating cropped first training image pairs (X, Y), wherein the first training image pairs (X, Y) are used for training a first autoencoder;
an image modification and translation module for performing modification within the region of interest of the plurality of original images using the trained first autoencoder and generating a first output image;
a region of interest (ROI) segmentation module for generating image masks (mask_X) for second training image pairs (X, mask_X), and training a second autoencoder for image segmentation using the second training image pairs (X, mask_X) and segmenting a target region of modification and generating a second output image; and adding the first output image to the target region identified by the second output image.

Advantageously, the image processing method for alterations in this disclosure comprises a model that requires substantially small data sets for training and making inferences on, without impacting the output quality. Accordingly, substantially high resolution and high level of detail can be achieved. Generally, it is desirable to have a model that requires small datasets for training or retraining, as substantially less computing resources are required and the computations are executed in substantially less time. Given the time and budget constraints in the moving media production industries, having either a general model that is easily retrainable with very little data is preferable. Furthermore, the amount of post-production time and effort required to refine a shot or an image output by the machine-learning model is substantially reduced. Although the training is performed using a small dataset. The virtual size of the training data that the model sees is much higher than the original training data. This can be achieved through a technique called data augmentation. For images, various data augmentation e.g. translation, scaling, mirroring, intensity and color contrast changes, etc., are applied. Through this technique, the model can learn and perform as well as the one trained on the high amount of data.

In addition, the method is able to accommodate for 'beauty work' and 'wig and prosthetic fixes', or any other kind of facial alteration, and achieves temporally consistent results, and substantially minimizes flickering, discolouration. By working directly off of the raw footage, the image processing method for alterations in this disclosure maintains a natural aesthetic that does not fall into the "Uncanny Valley".

The method also offers a meaningful way to reduce both time and cost for VFX, which is one of the biggest line items in the entire production budget. The image processing methods and system application areas are common across most projects, and offer a meaningful time and cost savings on nearly every project, including consistent results and scalable capacity for VFX tasks.

The method and system described in this document does not require relatively expensive and unwieldy camera rigs, specialized camera equipment, specially shot footage, tracking markers, motion capture technology, or actors to be three dimensionally scanned or photographed from a multitude of angles, or measurements of actors. The approaches described herein provide a computational solution to address various technical deficiencies in the above alternate approaches. However, as noted herein, it is technically challenging to provide such a solution and specific architectures and computational approaches for training and interference are also described for practical viability of the proposed approaches given practical constraints on computational resources and processing time.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
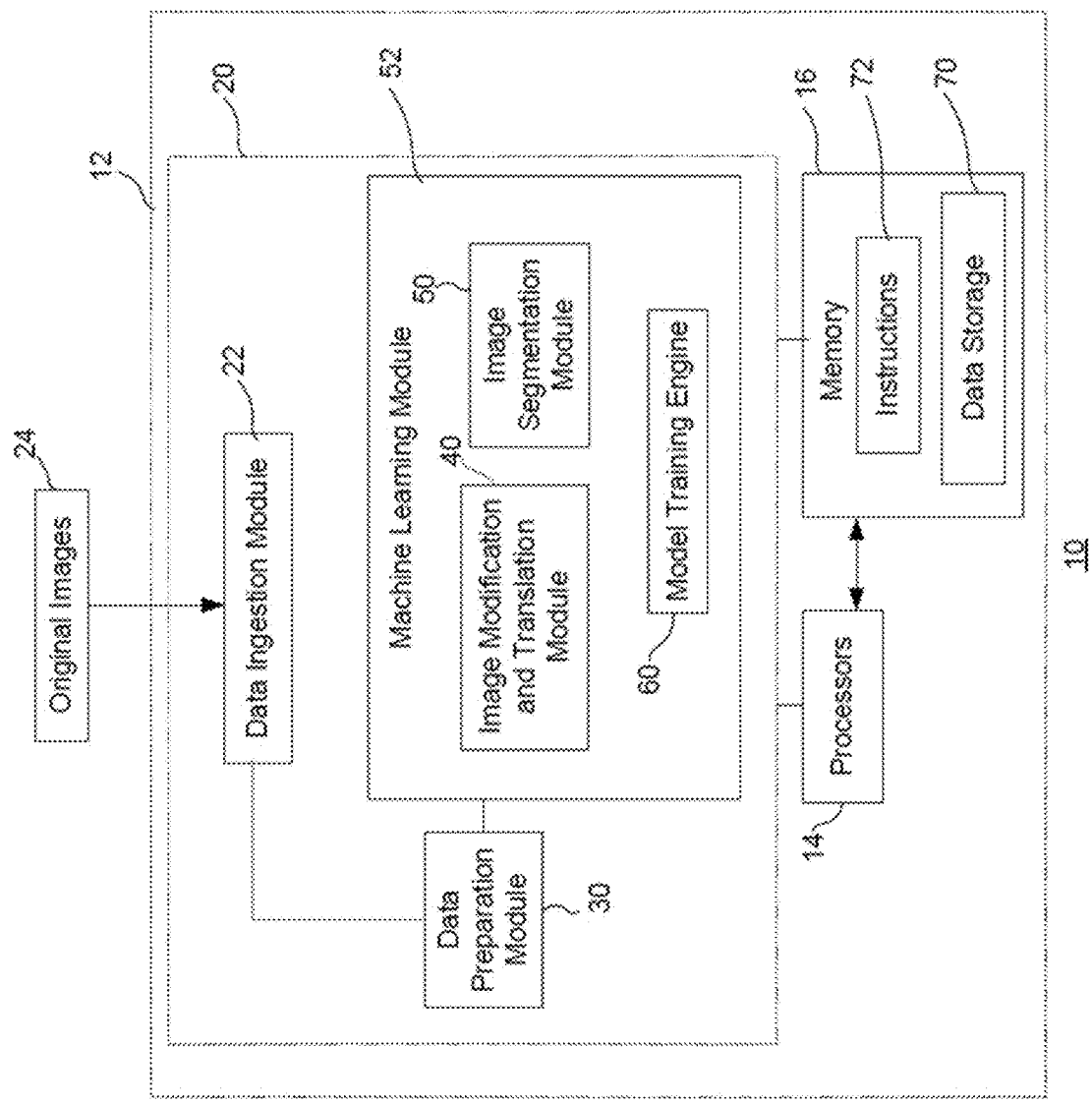
FIG. 1 shows an operating environment for an image processing system, according to some embodiments.

In face editing tasks in high-definition videos, for example, a crucial aspect is to match the facial edits closely with client specifications, and to keep the local image features consistent within its spatial and temporal neighbourhood.

A glossary of terms which may be found within this description:

Annotated (Target) images: Images modified by professional artists as per the clients' requirements Dataset: Collection of original images provided by the client (source images) as well as artist-modified images (target images)

Degrained images: Images that have the noise removed by artists

Episode: Collection of shots typically ordered into a show's film segment

EXR file type: High dynamic range raster image file type. EXR files use a nonlinear colour space and each channel is 32-bit. In order to view the image and train the network, it is converted to linear RGB space. Note, images typically used are of shape [2160, 3840, 3] in pixel space.

Frame: Still image—one of many that compose a moving picture

Inference: Application of the learned transformation to the entire shot

Keyframes: Selection of frames from the shot, trying to cover the major changes in pose and lighting condition Masks: Black and white binary images. An image is white in the region of interest (ROI) and black in the rest of the region.

Output (Inferred) images: Images that are automatically modified by this software Shot: Sequence of frames that runs uninterrupted for a given period of time Source frames: Original keyframes provided by clients for modification Status: Evaluation metric for a shot by the composition artist. Perfect shots require no further manual editing. Polish shots require some minor degree of manual corrections. Redo shots require a large number of manual corrections.

Styleframes: Ensure creative alignment between the client and us, the vendor, by establishing the "look". They are used to grade the creative look which is used in the bidding phase, where a styleframe per character and a moving test are done. The styleframes are delivered as an EXR and QT (or whatever format is preferred). In the Machine Learning training phase, the look is replicated across the entire shot.

Test images: Remaining original (X) and corresponding annotated images (Y) after the Training images have been selected Training: Step where the annotated frames and the source frames are fed into the model, and over many iterations, it learns to predict a generalized version of the transformation that was applied by the artists to the frames during dataset creation.

Training images: Set of original (X) and corresponding annotated images (Y)

When editing videos for clients, such as a television show, using deep learning methods, there are often three considerations. First, the incoming dataset should be as small as possible, due to the manual labour associated with input data. Second, machine learning outputs should maintain an affinity with the reference look throughout the entire video, with very high-fidelity, accuracy and consistency from frame to frame. For instance, the output prediction may be required to match the dataset with an accuracy of 0.0001 in linear EXR format (equivalent of 0.025 for 8-bit PNG format. I.E. less than 1 for 0.255 traditional range). This accuracy should also be preserved between keyframes. Third, pixels outside a region of interest (ROI) should not have a difference with the source frame, more than, for example, 0.0001.

An incoming video can be broken into separate shots from a processing pipeline perspective, and in some embodiments described herein, training networks can be established on a per-shot basis, which is helpful if a particular shot has a set of visual characteristics that help define it. For example, in a zombie movie, there may be above ground scenes, underground scenes, indoor scenes, among others. In this example movie, it can be broken into a series of shots, and each of these different shots may have differing ranges of visual characteristics, such as lighting conditions (above ground may be sunny, while below ground is illuminated by indoor lighting or dark). An advantage of training models on a per-shot basis is that the available breadth/distribution/range of visual characteristic representations to be handled by a particular machine learning model can be constrained, so that the system is more capable to generalize the modifications without deviating too far from the training set. For example, it may be difficult to domain shift modifications on keyframes for underground scenes to above ground sunny scenes. As described herein, specific approaches are also proposed in variant embodiments where specific "guided" keyframe selection approaches and augmentation approaches are used to improve how well the training set fits to the shot by pre-processing the shot to understand the full range or distribution of visual characteristic conditions. By pre-processing the shot to computationally assess and obtain an understanding of the full range or distribution of visual characteristic conditions, the training set of keyframes can be tailored (e.g. expanded or selected) to improve representation. This is a useful approach to minimize the amount of expensive visual effects manual modifications required while attaining a satisfactory level of accuracy of the system.

Deep learning networks can be trained on a large amount of data to reduce the variance of the network. These models often focus on achieving general solutions with a single model. However, they underperform in the VFX tasks, which require high fidelity to the reference look generated by trained VFX artists, as per a client's needs.

The diversity of face poses, sizes, lighting conditions in real movies is generally very high. This leads to a wide variety and uniqueness of the skin textures, making it technically challenging to build a model that is generalized in its task and specific for a given face. Further, VFX requirements for pixel-level accuracy in the predicted image-frames are very high. Described herein is a proposed model that, according to some embodiments, simultaneously memorizes, overfits to, the textures and generalizes the other facial features like pose, shape, etc. The described technical solution of combining both memorization and generalization allows the proposed model to correctly interpolate the textures between keyframes and predict them with required accuracy. This yields a computational improvement that is useful in practical implementations of the system, adapted to improve performance in view of changes and diversity in image conditions as described above.

Using such an approach may allow a model to be trained using a minimal amount of data, which is manually edited by VFX artists. For example, for a video 400 to 500 frames long, a few images may be used as a reference look and overfit the network to generate the same image edits for the rest of the frames in the video, while maintain the required accuracy and consistency demanded in VFX. The selection of the specific images, in some embodiments, can be specifically conducted to improve the performance of the system. For example, rather than selecting edit frames periodically, the edit frames, in some embodiments, may be selected automatically by the system to establish a set of frames which best represent the diversity of potential image conditions that are encountered in a particular full movie or sequence of images. For example, the selected images can, for training purposes, represent images having a diversity of lighting conditions, rotations, translations, size, among others, improving the training time for the system by reducing the amount of time required to attain a particular minimum level of accuracy in the outputs. An additional submodule, sub-process, or sub-routine can be added as a first pre-processing step for selecting which images of a sequence of images in a video will be used as the keyframes for editing.

In an example embodiment, the overfitting includes first augmenting the training set by applying the series of automated transformations or combinations of transformations to the keyframes. In doing so, as described, the more expansive training set is conducted.

This augmentation is conducted before or after the modification of the keyframes by a visual effects artist, and for example, a single keyframe is now converted into a plurality (e.g. 2, 3, 4, 5, 6, 7, 8, 9, 10) variations of that keyframe in different permutations, such as in different lighting settings, tints, contrasts, rotations, among others.

In the augmentation before the modification of the keyframes, the visual effects artist may be requested to generate correction versions or instructions for different augmented versions of the same keyframe. By using the different augmented versions of the keyframe and modifications thereof, the system is better attuned to correct for the specific variation established by the augmentation (e.g. if the augmentation is the same frame by having different brightness levels, the different in instruction corrections can be used to aid the system in propagating the edits in the future to non-keyframes having different brightness levels).

In the augmentation after the modification of the keyframes by the visual effects artist, the corrections instructed by the visual effects artist are propagated across all of the augmented frames, for example, by replicating the set of modification instructions generated in a tool tracking the types of activities used to correct the frame (e.g. airbrush from coordinate X to coordinate Y, blending tool usage, filters).

Through training the model using the augmented keyframes in combination with the original keyframes, the training process is enhanced such that the model boundaries represented in the model weights are improved in respect of the normal types of variations encountered in a particular production. This causes the model to be "overfit" in respect of the corrections, and improves the accuracy of the model when used for future inference.

In a further embodiment, the feature set for generating augmentation permutations (e.g., varying brightness, contrast, rotation, translation, tint) are also represented in certain specific feature nodes in the model architecture, such that the model architecture is specifically adapted for tracking the differences established in the augmented training set.

In another further embodiment, a "guided augmentation" approach is utilized whereby the range of potential augmentations is bounded by a pre-analysis of a particular set of frames (e.g. corresponding to a type of shot or shot sequence), or the frames of the entire production. In the guided augmentation approach, an understanding of the full shot or sequence of frames is utilized to set the bounds for the expanded variation scope of the augmentations.

For example, if a guided augmentation approach is utilized to vary brightness, contrast, and tint, for example, the set of relevant frames (e.g. shot frames, full movie/film/ episode frames) are analyzed and pre-processed to identify the range or distribution of possible brightness, contrast, and tint characteristics that are utilized in the relevant frames. As a non-limiting example, brightness can be varied between 0.3 and 0.5, for example, for a shot sequence that is set in a particularly dark setting (e.g. an underground scene), contrast between 0.1 and 0.9 (perhaps a flashlight is turned on partway in the scene), and tint is between 0.3 and 0.5 (as the hallway does not have many different colours). In this example, the guided augmentation would then create bounds for the augmented additional keyframes by binding the augmentations between the same bounds. In further embodiment, the augmentations are selected at periodic intervals within the bounds or based on a distribution of the values (e.g., a Gaussian distribution) such that they provide a stronger representation of the types of conditions likely to be faced during interpolation and/or extrapolation during inference time.

In some embodiments, the guided augmentation approach is combined with a keyframe selection process to aid in improving the representativeness of the training sets provided to the model for training. For example, keyframe selection can be utilized to obtain a variety of different poses (e.g. directions of heads/bodies), lighting directions (e.g. from rear, from front), lighting conditions (e.g. overhead light, multiple light sources), which are all features that are not easily generated through augmentation. On the other hand, augmentation can be used for other features, such as brightness, contrast, tint, among others.

In this example, the pre-processing step of all of the relevant frames of the shot sequence (or of the entire production) includes an automated analysis of each frame to further generate characteristic values associated with poses of particular actors/actresses, lighting conditions, among others. For example, frame 1 could include a pose value of 0.3 (indicating the person is showing mostly the left side of the face), a lighting being provided from a right side represented in a lighting value of 0.4, and a lighting condition score indicating that there is one source of light.

Each of the relevant frames are pre-processed to generate these scores, and keyframes can be automatically selected amongst the relevant frames based on their representation of various scores distributed amongst the scores for the relevant frames. For example, if there is a pose value between 0.3-0.9 exhibited in the frames, keyframes may be selected at 0.3, 0.5, 0.7, and 0.9. Keyframes may be selected such that there is strong representation across the various intervals, and in some embodiments, representation may also take the form of distribution analysis. Automatic keyframe selection and guided augmentation can thus operate in concert to automatically improve the relevance of the training set.

Applying alternate image-to-image translation methods for data overfitting, for instance using other existing models, does not provide desired results for various reasons. Particularly, existing autoencoders fail to identify the skin region that needs to be edited versus the skin region outside the ROI that needs to be reconstructed unchanged. Further, a highly overfit network cannot generalize the image translations through a short video sequence that varies in the face pose, lighting conditions, and scale. Lastly, the time to train the deep autoencoders that can perform complex image regressions, using only a few images, requires an unpractical amount of time. The presented model proposes to solve address some of these problems.

In some embodiments, an input inception layer separates sparsely edited skin pixels from the background. This may be, for example, because each show consists of a different set of spatial edits on an actor's face. These image edits can vary in size and spatial location, even within one shot due to actor or camera movements. Because of this significant variation in the location of the edits, choosing the right kernel size for convolution operation becomes technically challenging. A larger kernel is preferred for facial modifications distributed more globally, and a smaller kernel is preferred for modifications distributed more locally. Therefore, rather than the standard convolution layer with a fixed-size kernel, in some embodiments, the inception layer, in the beginning, captures different facial changes easily.

Convolution layers plus Relu activations in the global skip connections can learn the pixel-wise nonlinear image transformation with higher accuracy than global skips without them. This makes it possible to learn with high accuracy from a few samples of the edits of the face, including texture changes and especially geometrical changes, and also how to reconstruct the background at different resolutions and leave the edited part out and without the necessity of forward and backward cropping of the face into the whole frame. Without this, the model cannot learn face edits from a small dataset with the desired accuracy. Further, the proposed model may, in some embodiments, be forced to overfit fine-grained textures to achieve the desired accuracy of predicted frames. Trainable global skips add more nonlinearity and may allow the model to correctly combine the overfitting (of non-generalizable textures) with the generalization of other features (face shape, pose, among others).

Instead of batch normalization, the model, according to some embodiments, may use instance normalization and training on separate images, to avoid averaging the features over the training images and keep the high-resolution features intact. Additionally, instance normalization may speed up the training by approximately five times.

Empirically, a set of augmentations (translation and intensity change) were found, which balance generalizing edits consistently over each frame in a video while keeping the pose-specific image features close to the annotated target images. This set of image augmentation improves the temporal consistency without compromising the fidelity to the reference images. Augmentation gives the model, in some embodiments, additional data for better interpolation between keyframes.

Images may, in some embodiments, be de-grained (remove noise) to further speed up the training, and achieve the desired accuracy. For example, the grain profile follows the edges in the image closely. When the facial edits change the edge profile of the face, the corresponding grain also changes. If the network is trained without removing the grain from training images, the network will typically get stuck in a local minimum to learn the grain changes in different frames. Hence, it can significantly increase the convergence time for training. Additionally, the noise hides the useful signal preventing the model, in some embodiments, from learning small details with the desired accuracy.

The described technical improvements of the proposed machine learning pipeline provides advantages over the traditional VFX 4K video pipeline for face editing due to the complete automation of the manual operations. The compositing artist needs to edit only a few keyframes, and the ML pipeline edits the rest of the frames with high-quality consistency. It may, in some embodiments, save more than 50% of the time and labour, while still achieving the same quality and consistency, and satisfying client requirements.

FIG. 1 is a schematic block diagram of an example of a physical computing environment 1010 for image processing according to some embodiments. System 10 comprises computing device 12 having processors 14 and memory 16. System 10 comprises a plurality of data processing modules 20 including data ingestion module 22 for ingesting, or receiving, input images; dataset preparation module 30, image modification and translation module 40 and region of interest (ROI) segmentation 50. The plurality of data processing modules 20 include, in addition to the data ingestion module 22, machine learning module 52 configured to apply a layer of artificial intelligence to a machine learning model to process image alterations and output realistic altered images. The particular modules can be implemented in the form of programmatic subroutines, circuits, or functions, and are shown as an example. Variations on the modules are possible.

Machine learning module 52 comprises machine learning training engine 60, which may be software hardware, embedded firmware, or a combination of software and hardware, according to various embodiments. Training engine 60 is configured to receive one or more data sets representative of a neural network model, and to train the neural network using a step-size value which varies over time. Generally, the neural network, step-size values, meta-weights, vectors, states and any other relevant data or parameters are stored in data storage 70, which is configured to maintain one or more data sets, including data structures storing linkages and other data. Data storage 70 may be a relational database, a flat data storage, flat file data storage, a non-relational database, among others. In some embodiments, data storage 70 may store data representative of a model distribution set including one or more modified models based on a neural network model; including instructions memory 72.

Examples of neural networks include Fully Connected Neural Networks (FCNNs), Recurrent Neural Networks (RNNs), Convolutional Neural Networks (CNNs), Long Short-Term Memory (LSTM) networks, autoencoders, deep belief networks, and generative adversarial networks.

An example of machine learning module 52 may be one or more relatively specialized hardware elements operating in conjunction with one or more software elements to train a neural network and/or perform inference with a neural network relatively more efficiently than using relatively less specialized hardware elements. Some implementations of the relatively specialized hardware elements include one or more hardware logic circuitry elements such as transistors, resistors, inductors, capacitors, wire interconnects, combinatorial logic (e.g., NAND, NOR) gates, latches, register files, memory arrays, tags for memory arrays, content-addressable memories, flash, ROM, DRAM, SRAM, Serializer/Deserializer (SerDes), I/O drivers, and the like, such as implemented via custom logic, synthesized logic, ASICs, and/or FPGAs. Some of the relatively less specialized hardware elements include conventional CPUs and conventional GPUs. In one exemplary implementation, machine learning module 52 is enabled to process dataflow in accordance with computations performed for training of a neural network and/or inference with a neural network.

The following terms which appear in this document are defined as follows:

Dataset: the original images that are provided by the client at the beginning.

Annotated images: the manually modified images by professional artists as per the clients' requirements.

Training images: a set of original images (X) from the dataset and corresponding annotated images (Y).

Test images: The rest of the original images.

Masks: Black and white images; an image is white in the region of interest (ROI) and black in the rest of the region.

Output images: Final output of this image processing system.

Figure 2:
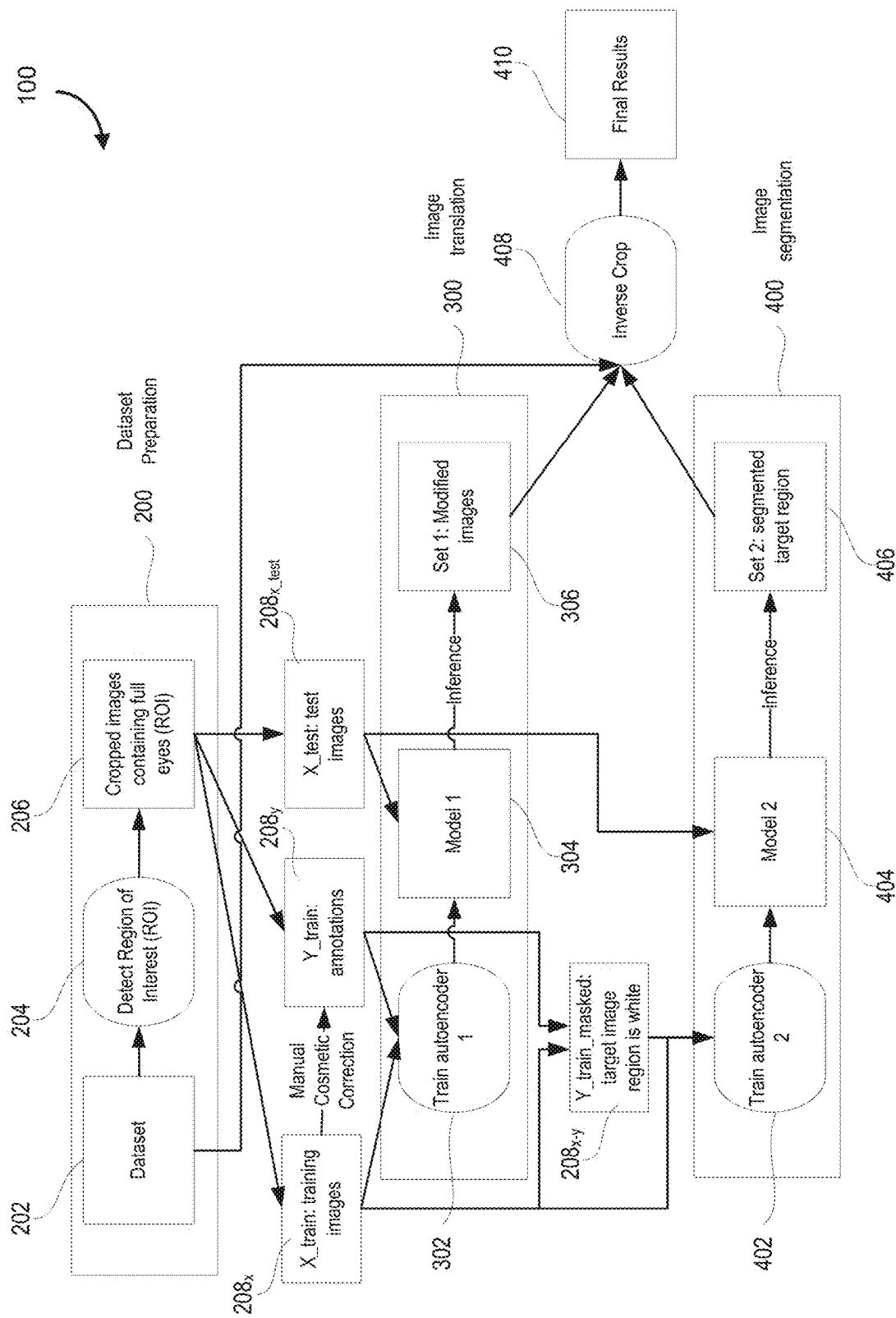
FIG. 2 shows an exemplary functional diagram of an image processing system, according to some embodiments.

FIG. 2 is an overall functional diagram 100 of an image alteration workflow for a system for image alterations, according to some embodiments. This is an overall functional diagram of the functions performed that result in an output altered image that most-closely resembles the input image. The first function is dataset preparation 200, in which original images 202 forming a part of a video are received from data ingestion module 22. These original images 202 may be original images from a source, such as a client. These original images 202 are divided into a set of shots. In one example, the input data is a set of 2D RGB image frames captured by an image capture device, such as, a commercial movie camera.

As an example, these images may be of high resolution, such as 4K or 8K, and so forth. These images 202 are divided into similar-looking groups of frames that usually form a single shot of the movie. For each shot, a handful of frames are picked for cosmetic correction by the compositing artist to create annotated images. Each shot consists of a set of images 202 that are continuous in time. The original image frames 202 and their ground truth annotations are then used for training a deep neural network.

The images 202 may then undergo a de-graining process which removes the sharp information in the image and smooths the image overall. The de-graining step maintains the high-resolution detail of the image without having to undergo a learning process. The de-grained information is later added back to the image once the automatic image modification is complete.

Next, in step 204, a region of interest (ROI) is detected within images 202. Following ROI detection, the de-grained images are then automatically cropped for a region of interest (ROI), since it is typically sufficient to process only the region of an image that requires modification (step 206). Having a ROI allows for a substantially shorter machine learning model training process. Generally, the use of full images for training the machine learning model decreases computational efficiency, as well as performance accuracy. It should be noted, however, if the application requires the full image transformation, for example, style transfer, then the cropping step for a ROI may be omitted. For each shot, a very small set of images $208_{X\_TRAIN}$ are selected to be modified by professional artists manually to produce manually modified images $208_{Y\_TRAIN}$. Next, images $208x$ TRAIN and manually modified images $208_{Y\_TRAIN}$ are used as input and target images for training a machine learning model.

The next function is image modification and translation 300 performed by image modification and translation module 40 comprising the first autoencoder 302. Generally, first autoencoder 302 is a type of deep neural network, and comprises an encoder for learning the most crucial local and global features in the images for the VFX task at hand; and a decoder which uses the learned features, and then maps the information back into the image space to reconstruct the annotated image. The number of hidden layers of the neural network and their internal connections may be adjusted depending on the complexity of the task and the desired goal. This model is discriminative in nature, and therefore models a transformation function from the input to the output.

Figure 3A:
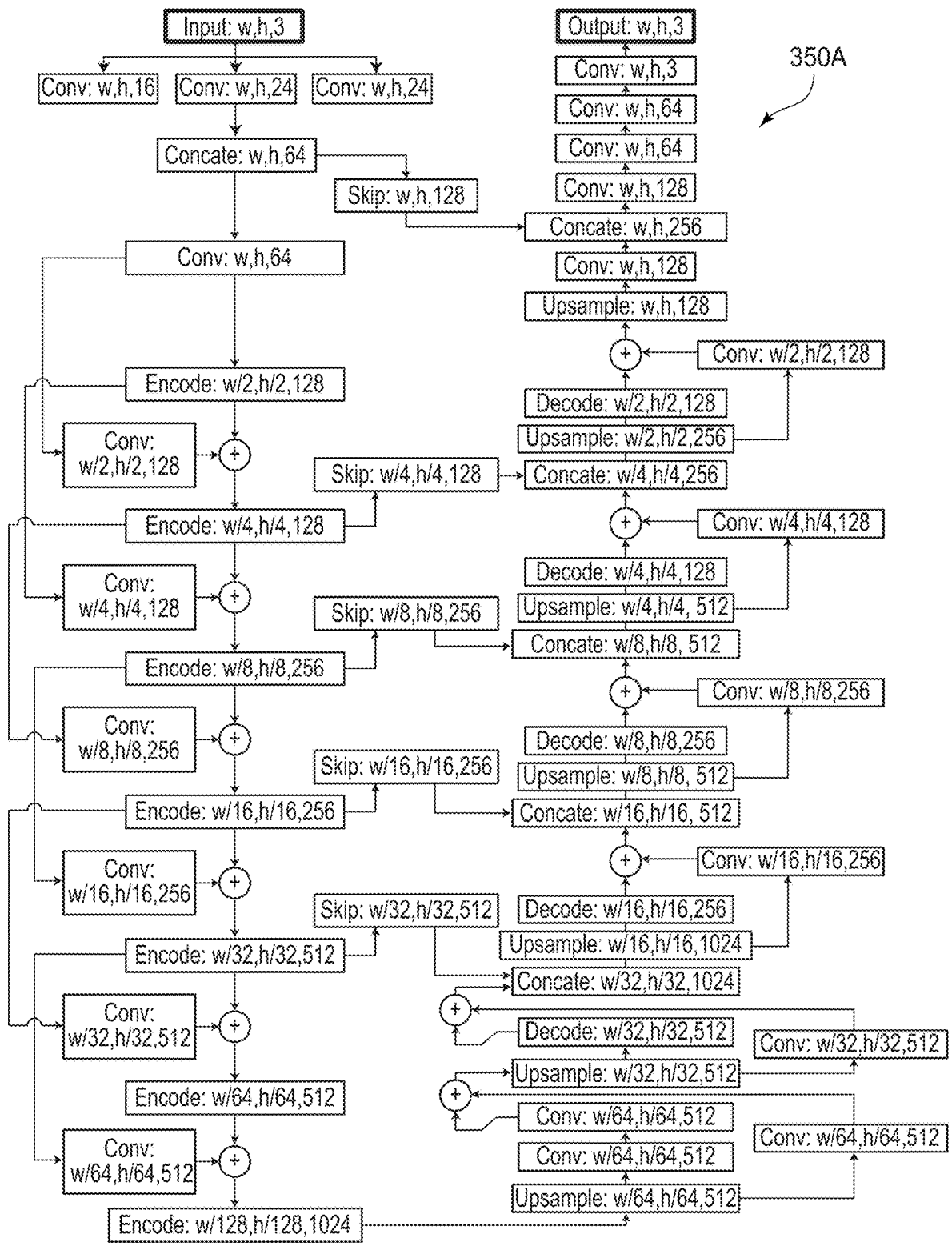
FIG. 3A, FIG. 3B, and FIG. 3C show detailed schematic architectures of an autoencoder for a machine learning framework, according to some embodiments.
Figure 3B:
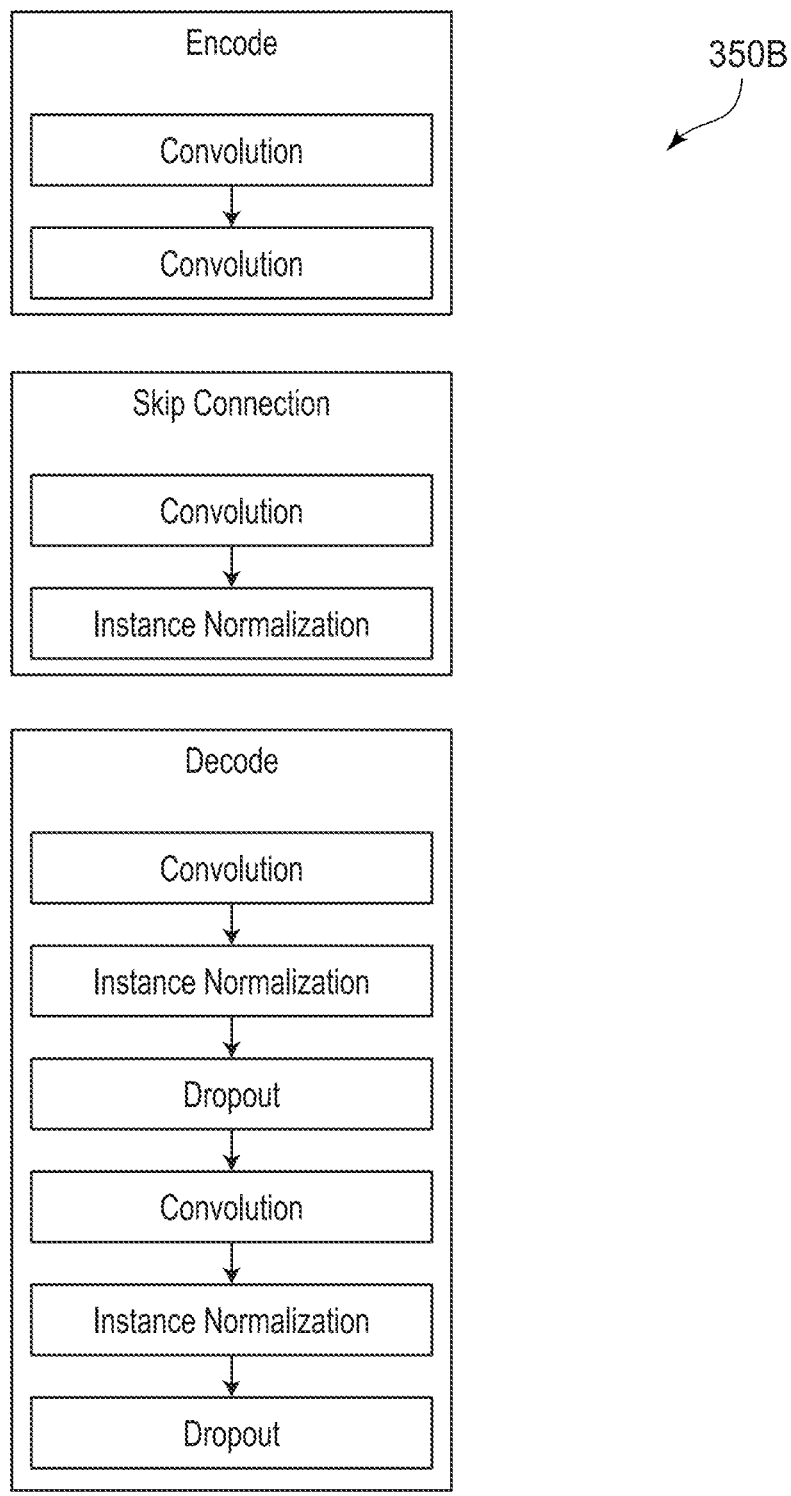
Figure 3C:
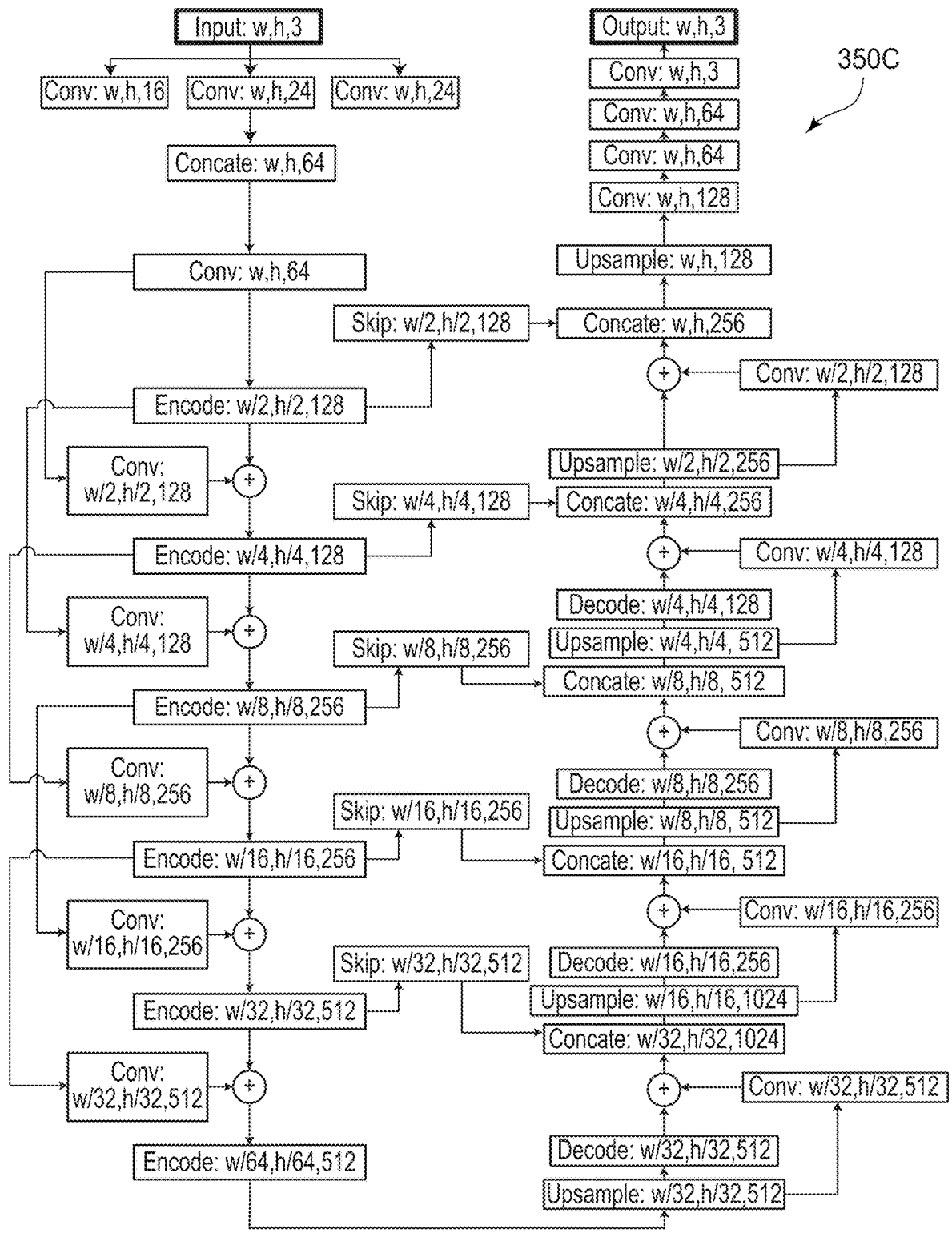

FIG. 3A and FIG. 3B show a detailed schematic architecture 350A and 350B of the first autoencoder 302 for the machine learning framework, according to some embodiments. FIG. 3C shows an alternate detailed schematic architecture 350C of the first autoencoder 302 for the machine learning framework, according to some embodiments.

Using the crops of all the original images, the first autoencoder is pre-trained using image pairs (X, X) to learn an identity function, such that the initial weights of each layer in the autoencoder are stable and close to the solution space of image alteration application in the very high dimensional space. The identity function is utilized to establish an ability to learn unity reconstruction. For example, the autoencoder may be trained with each iteration to update the representation of the latent space, and attempt to generate a same output from the input (e.g. despite a dimensionality reduction). After training the model sufficiently such that it is able to satisfactorily generate outputs similar to the training inputs, it is applied to new inputs to apply the trained latent space in generating new outputs, generalizing the latent space. During the training process, in some embodiments, the system is configured to minimize an error, and in some embodiments, skip connections are also utilized and the system is primed to use the skip functions to minimize the error.

Looking back at FIG. 2, using training image pairs $208_{X\_TRAIN}$ and training images with annotations $208_{Y\_TRAIN}$, first autoencoder 302 is first trained for the type of image improvement the model needs to perform. The training performs supervised learning. The network is trained for each segment of the movie clip: the shot, using the original and manually modified image frames, $208_{Y\_TRAIN}$. The training is concluded when the optimized function is converged to a specific value. This value is empirically identified for each individual project. After training, test images $208_{X\_TEST}$ that are also cropped for the region of interest are passed as an input to this model 304 and the model returns the inferred/modified image 306.

The next function is image segmentation 400 performed by image segmentation module 50 comprising a second autoencoder 402 with another machine learning model 404 trained to learn and segment the target area.

Accordingly, annotated image $208_{Y\_TRAIN}$ is subtracted from the original image $208x$, and the non-zero region of the resultant image from this subtraction is the exact region of the target, thereby defining a mask $208_{Y\_TRAIN}$_MASKED. A set of pairs of images $208_{X\_TRAIN}$, $208_{Y\_TRAIN}$, and their masks $208_{Y\_TRAIN}$_MASKED are used as input and target to train this network 402. The trained model 404 is then applied to the rest of the images $208_{X\_TEST}$ to segment the target image region pixels to form a segmented target region 406 via an inference process. The inference process is a regression model that reconstructs the image by predicting the value of each pixel in the resultant image.

Next, the modified pixels in the output image 306 from the image translation model module 40 are back-projected i.e. inverse-crop 408, to the original image 202 in the target image region 406 identified in the segmentation model output 122 to produce a final result 410.

Figure 4A:
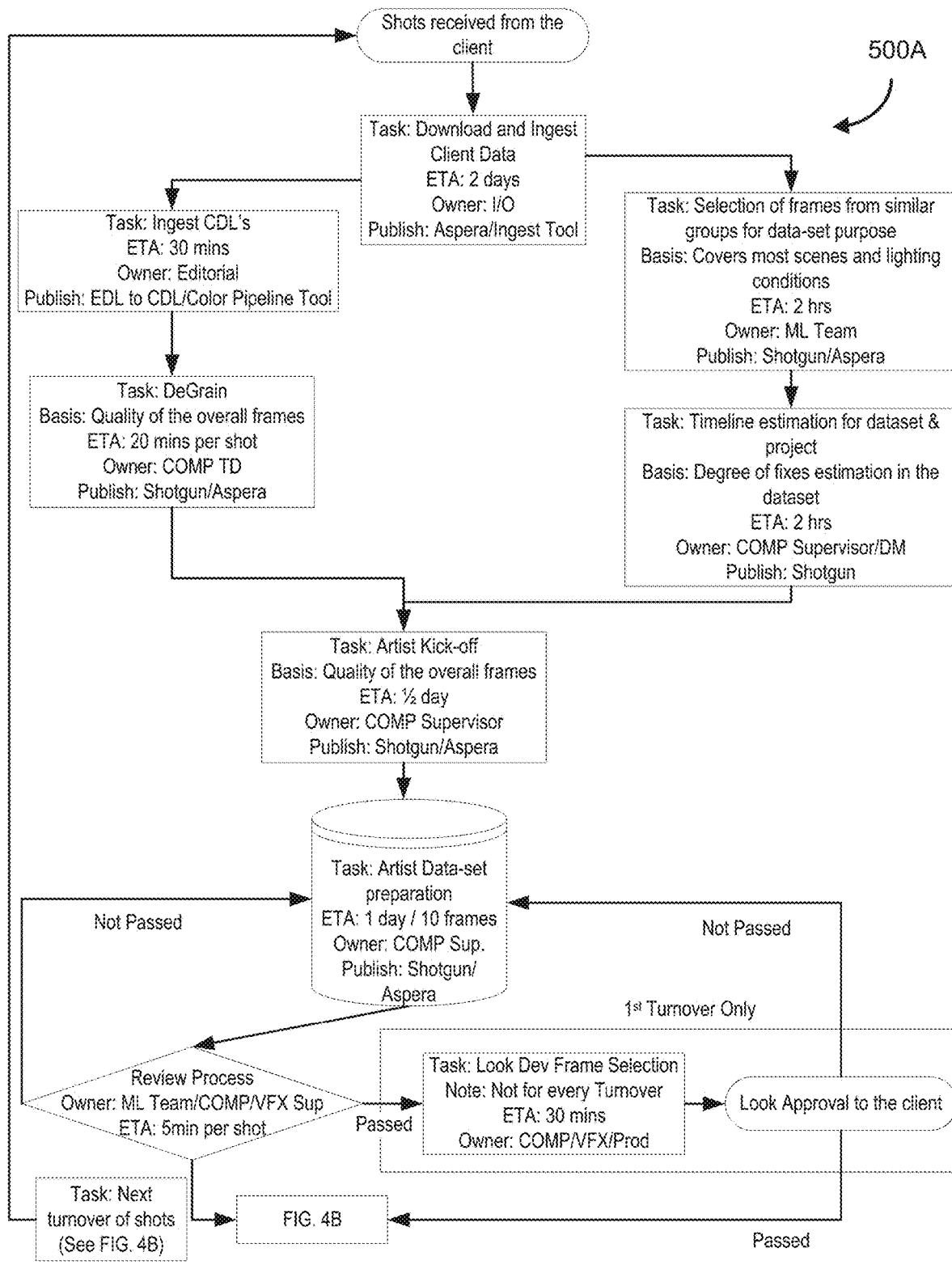
FIG. 4A, FIG. 4B, and FIG. 4C show an exemplary flowchart depicting a workflow outlining exemplary steps for image processing, according to some embodiments.
Figure 4B:
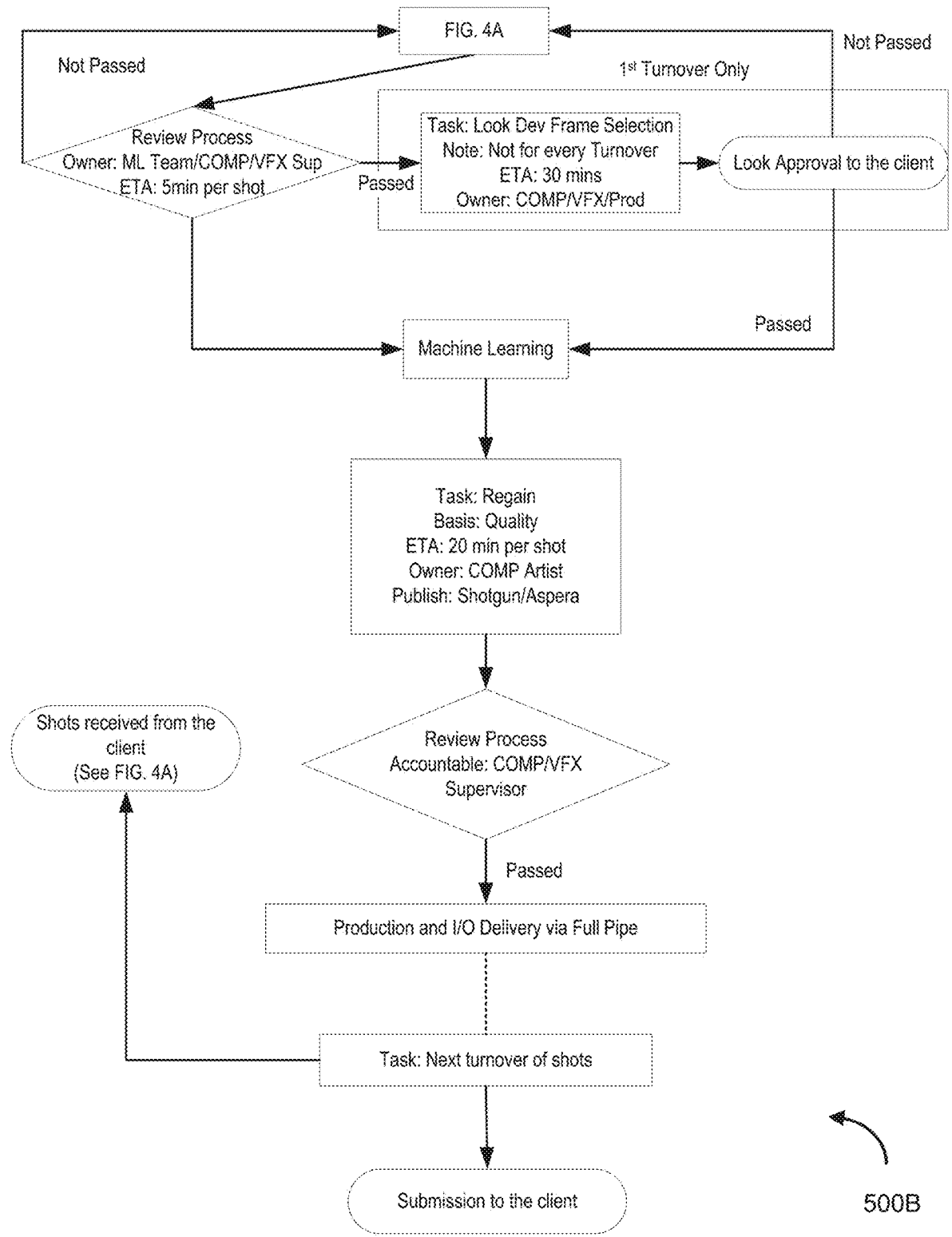
Figure 4C:
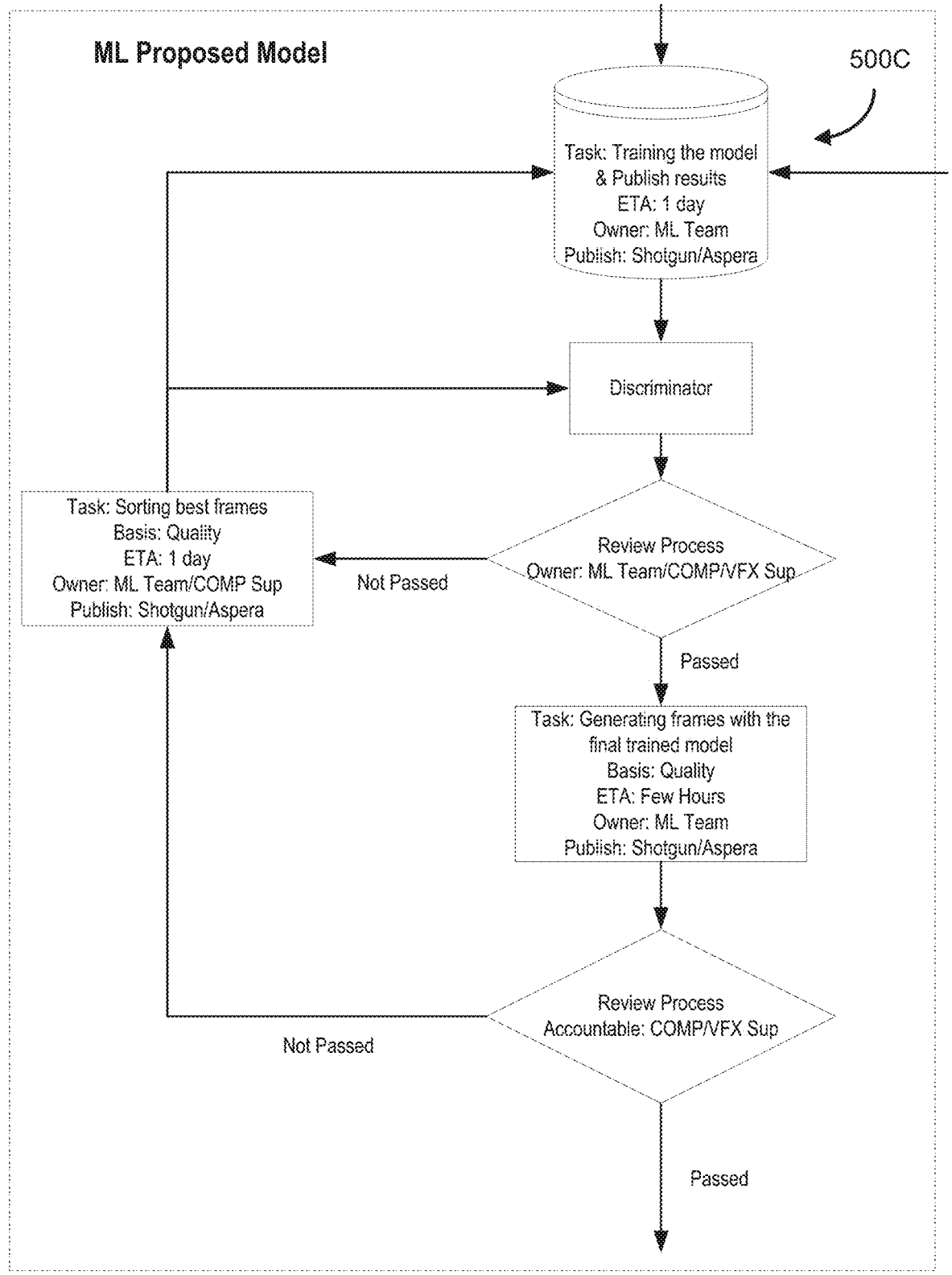

FIG. 4A, FIG. 4B and FIG. 4C show an exemplary flowchart 500A, 500B, and 500C depicting a workflow outlining exemplary steps for image processing, according to some embodiments, and exemplary pseudocode for the workflow of FIG. 4A, FIG. 4B, and FIG. 4C is:
1. Crop all the images for the region of interest (ROI)
2. Train the autoencoder using cropped training image pairs (X, Y)
3. Perform image modification using the trained autoencoder→out1
4. Compute image masks for training images, mask_X:=X−Y
5. Train the second autoencoder for image segmentation using training image pairs (X, mask_X)
6. Segment the target region of modification→out2
7. Back project the modified image in the original image to the target region identified by out2.

The workflow for image processing according to one embodiment may follow such a process outlined above, but may in other embodiments include more or less steps, and may be performed in various orders.

Figure 5:
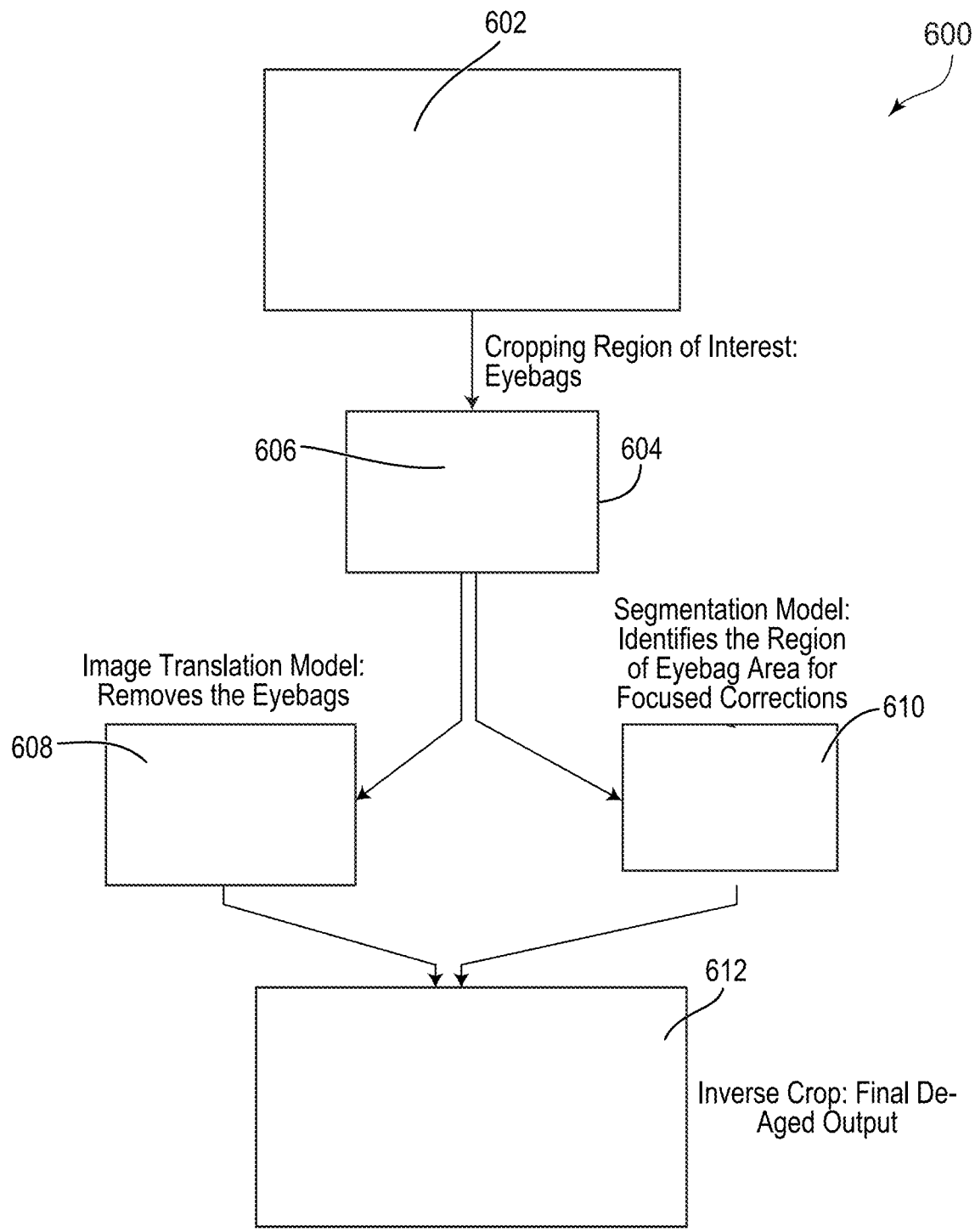
FIG. 5 shows a machine learning workflow with an example of de-aging editing, according to some embodiments.

In one exemplary implementation, the image processing system may be used in an eye de-aging process, in which aging wrinkles and black circles adjacent the eyes are removed. FIG. 5 shows a machine learning workflow 600 with an exemplary de-aging editing process. For example, an aging actress 602 filming a movie over a number of months may forego the laborious and time-consuming process of make-up each day on the set to hide wrinkles, blemishes etc. The input image 604 comprises cropped eyes 606 of the actors for each image frame in every shot. Some of the images are handpicked such that it covers the variety of light conditions, facial expression, etc. This subset of images is sent to the composition artist to perform manually for the desired cosmetic corrections. Once the client approves these corrections, they are used as ground truth to train a supervised autoencoder. The second model learns the precise location of the bags under the eyes 608. Only those modified pixels that are identified as eye bag region by segmentation model 610 are then considered to be projected back to the original image to generate the final de-aged face 612. In some embodiments, described in more detail below, segmentation model 610, may not be needed.

In one exemplary implementation, the system and methods are particularly applicable to image alterations in an augmented reality, virtual reality, or mixed reality (AR/VR/MR) environment, a game application, a movie, or other visual content.

In one exemplary implementation, the system and methods are particularly applicable to alterations, such as, body augmentation, limb augmentation, nip/tuck augmentation, clothing changes, skin colour alterations, hair addition/removal and scale and "weight" augmentation, tattoo removal, scar removal, wire removals and other changes to background.

In one exemplary implementation, a generative model may be used to replace the manual annotations of the selected image frames for each shot. Accordingly, the generative model can learn the probability distribution of the inputs. Hence, a generative model can generate data samples from the learned probability distribution. This property makes the generative model desirable for tasks that have less amount of data for training.

In one exemplary implementation, image translation by autoencoder is replaced by a generative adversarial network (GAN). This network comprises a generator for generating an image using an input image frame, and a discriminator for determining the quality of the output of the generator. In one example, for training, a handful of the images and their annotations is provided to the generator and the discriminator. The generator generates an image given the original image frame and the discriminator decides the quality of the output image by merely comparing the annotation with the output generated by the generator. The GAN loss is calculated and back-propagated to train both the networks simultaneously. Accordingly, the GAN generator generates the image proposals, and the artist may classify the image as acceptable or not. Such binary annotation is a lot less laborious than creating a target image for training a supervised autoencoder. For a generator, a hierarchical variational autoencoder (VAE) is used, and the discriminator comprises a convolutional neural network (CNN) classifier.

In one exemplary implementation, processor 30 may be embodied as a multi-core processor, a single core processor, or a combination of one or more multi-core processors and one or more single core processors. For example, processor 14 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, Application-Specific Standard Products (ASSPs), System-on-a-chip systems (SOCs), Complex Programmable Logic Devices (CPLDs), Programmable Logic Controllers (PLC), Graphics Processing Units (GPUs), and the like. For example, some or all of the device functionality or method sequences may be performed by one or more hardware logic components.

Data storage 70 may be embodied as one or more volatile memory devices, one or more non-volatile memory devices, and/or a combination of one or more volatile memory devices and non-volatile memory devices. For example, memory 16 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY™ Disc), and semiconductor memories (such as mask ROM, PROM (programmable ROM), EPROM (erasable PROM), flash ROM, RAM (random access memory), etc.).

System 10 comprises an I/O module configured to facilitate provisioning of an output to a user of a computing system and/or for receiving an input from the user of the computing system, and send/receive communications to/from the various sensors, components, and actuators of system 10. I/O module is configured to be in communication with processor 30 and memory 16. Examples of the I/O module include, but are not limited to, an input interface and/or an output interface. Some examples of the input interface may include, but are not limited to, a keyboard, a mouse, a joystick, a keypad, a touch screen, soft keys, a microphone, and the like. Some examples of the output interface may include, but are not limited to, a microphone, a speaker, a ringer, a vibrator, a light emitting diode display, a thin-film transistor (TFT) display, a liquid crystal display, an active-matrix organic light-emitting diode (AMOLED) display, and the like. In an example embodiment, processor 30 may include I/O circuitry configured to control at least some functions of one or more elements of I/O module, such as, for example, a speaker, a microphone, a display, and/or the like. Processor 30 and/or the I/O circuitry may be configured to control one or more functions of the one or more elements of I/O module through computer program instructions, for example, software and/or firmware, stored on a memory 16, for example, data storage 70, and/or the like, accessible to processor 30.

Communication interface enables system 10 to communicate with other entities over various types of wired, wireless or combinations of wired and wireless networks, such as for example, the Internet. In at least one example embodiment, communication interface includes a transceiver circuitry configured to enable transmission and reception of data signals over the various types of communication networks. In some embodiments, communication interface may include appropriate data compression and encoding mechanisms for securely transmitting and receiving data over the communication networks. Communication interface facilitates communication between computing system 10 and I/O peripherals.

It is noted that various example embodiments as described herein may be implemented in a wide variety of devices, network configurations and applications.

Other embodiments of the disclosure may be practiced in network computing environments with computer system configurations, including personal computers (PCs), industrial PCs, desktop PCs), hand-held devices, multi-processor systems, microprocessor-based or programmable consumer electronics, network PCs, server computers, minicomputers, mainframe computers, and the like. Accordingly, system 10 may be coupled to these external devices via the communication, such that system 10 is controllable remotely. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In another implementation, system 10 follows a cloud computing model, by providing an on-demand network access to a shared pool of configurable computing resources (e.g., servers, storage, applications, and/or services) that can be rapidly provisioned and released with minimal or nor resource management effort, including interaction with a service provider, by a user (operator of a thin client). Accordingly, the model training and inference may be executed remote computing resources in a cloud computing configuration.

In some embodiments, the system operates in the context of a processing production ecosystem, where the system is provided as an on-premises computing appliance which is configured to integrate into an existing frame production pipeline. Relevant frames or shots of a production are provided across a message bus, and keyframes are selected for modification by a visual effects artist. The keyframes, including augmented keyframes in some embodiments, are then utilized to train a machine learning model as described in various embodiments herein. When the machine learning model is trained, it can be applied and adopted as a mechanism that is configured to ingest various input frames of the production to generate modified output frames. The use of the machine learning model may fit within the production pipeline and controlled by various scripts, for example, using a command-line interface or other types of application programming interfaces.

In some embodiments, the frame ingestion is utilized as part of the post-production pipeline, generating output frames being associated, for example, with one or more confidence scores from the machine learning model which can then be used to pre-emptively flag specific frames for additional consideration by a reviewer. The confidence score, for example, can utilize a same loss function that was used to train the machine learning model, or in other embodiments, can be based on an amount of pixel loss or differences relative to the original frame. A reviewer may then, as part of the pipeline, review certain generated frames (or all generated frames) to establish whether the frame was edited properly, touch ups are required, or if the generated frame is not acceptable. The metrics for the review can be fed back to the system for retraining, and in some embodiments, the system is automatically retrained following each rejected and re-done frame, or with each re-polished frame. In this example, the pipeline may include an additional feedback loop whenever frames are redone or repolished such that the system gradually tunes based on the preferences of the supervisor.

The trained model may be encapsulated or reside in memory or storage coupled to an application on a production engineer's computer.

The described systems and methods, in some embodiments, automate the majority of the traditional VFX process for specific VFX tasks, including de-aging, aging, beauty work, blemish fixes, wig and prosthetic fixes, and facial alterations, including the addition or removal of facial hair, wounds, scars, and tattoos. It offers Hollywood studios and production companies significant speed, cost, and volume advantages versus the traditional VFX workflow for these tasks.

Application is not limited to facial alterations. Many 2D body alterations can be automated leveraging the same workflow, including body and limb augmentation, nip/tuck augmentation, clothing changes, skin color alterations, hair addition/removal, and scale and "weight" augmentation.

This application is described as image-to-image translation. The model design is superior to existing image-to-image translation methods in its practical ease and versatility, and allows the model to be trained and infer results with a minimal dataset compared to conventional neural net models. The model performs remarkably on very high-resolution images (4K), which is necessary in many industries, such as VFX. Without modifying the network design, it can be used for almost any image-to-image translation applications.

De-aging in VFX refers to a process where the age of an actor is reduced to make him/her appear younger as per the requirements of the plot. There are many different use cases for de-aging, including the need to look younger for a particular role, and/or a flashback scene where they are younger than their current self, among others.

For example, de-aging of an actor's face may involve edits made to the following list of features: Forehead lines, hair density on eyebrows and color of the eyebrows, frown lines between eyebrows, drooping eyebrow, drooping eyelid, crows feet, contrast on iris and pupil of the eye, whiteness of the sclera/white area of the eye, under eye wrinkle and eye bags, deepening of nasolabial folds/laugh lines, vertical lip lines around the lips, marionette lines/mouth frown lines right by the lips on both the sides, lip color, mental crease, facial hair, skin texture (pores, pigmentation, evenness), teeth whitening, among many others.

In some embodiments, correction may be made to non-facial features, and to edits not related to de-aging. For example, in some embodiments, corrections may be made to remove or add tattoos, fix clothing, among others.

Traditionally, de-aging was carried out using makeup and/or facial prosthetics. It used to be a tiring and cumbersome process, sometimes taking hours, which meant less time for shooting. The makeup and prosthetics were difficult to wear all the time, making actors uncomfortable and hindering their abilities to act naturally in the scenes. In some cases, where the actor's age in the plot was significantly less than the current age, de-aging by using makeup/prosthetics wasn't an option. Another actor would need to be hired to act in the scenes where the original actor is required to look younger.

Computer-generated imagery (CGI) can be applied to improve the de-aging task. De-aging is carried out by special visual effects (VFX) methods which modify the shots frame-by-frame to maintain consistency across the entire shot. This is a significant improvement in time and cost over makeup-based de-aging as the movies or shows can now be shot in fewer days and then handed over to VFX artists for any required corrections.

Although the time needed for VFX-based techniques is significantly less than for makeup-based de-aging, it would still take months for an entire movie or show to be processed.

Table 1 shows an optimistic estimate of the time required by VFX techniques. A shot can be anywhere between two seconds to fifty seconds of screen time. Traditionally, each shot consists of twenty-four frames per second, which means approximately fifty to one thousand frames per shot. Editing each frame can take up to four hours, and one complete shot can take anywhere between eight hours to eight days depending on the length of the shot and its complexity. On average, considering an optimistic timeline of four hours per shot, an episode of two hundred shots would take eight hundred hours to complete. This means a few months of work to edit an entire show or movie.

TABLE 1

Artist Time Saved, Traditional VFX vs ML Solution

|   | VFX de-aging | ML de-aging Production 1 | ML de-aging Production 2 |
|---|---|---|---|
| 1 shot | 4 hrs | — | — |
| Total time for dataset (200 shots) | — | **1.5 hrs × 200 = 300 hrs | **1.5 hrs × 200 = 300 hrs |
| Total time for an episode (200 shots) | 4 hrs × 200 = 800 hrs | (0 × 0.71 + 1 × 0.19 + 2.5 × 0.10) × 200 + 300 = 388 hrs | (0 × 0.85 + 1 × 0.10 + 2.5 × 0.05) × 200 + 300 = 345 hrs |
| Artist's Time Saved | — | 51.5% | 56.8% |

A new way of de-aging is disclosed, which makes use of machine learning applications in computer vision. In some embodiments, deep learning techniques carry out de-aging on a person in the input shot by processing entire shots at once, without having to work on each frame individually.

Table 2, described further below, shows the result of de-aging according to some embodiments, which was accepted by the production team and reduced the time taken by the VFX team by nearly half. The application specific to these tested embodiments was removing eye bags, which may represent roughly 10% of an entire de-aging task. However, according to other embodiments, advanced deep learning solutions may accomplish de-aging on a complete face within the same timelines.

According to some embodiments, an objective may be, given a training dataset of degrained source images from the original shot captured by camera and target images which are edited frames from a shot as key examples, train a model which can perform de-aging on frames/shots not in the training set. In each shot, only one actor (usually the lead actor) may be considered for de-aging.

According to some embodiments, the set of training source and target pairs should be minimal. Further, the training/fine-tuning time for a given actor/show should be an acceptable within a production.

The training dataset contains original images from the show and images professionally edited/annotated by a VFX artist in 4K resolution. The colour space is as follows:
 1. Linear RGB with EXR extension
 2. Log3G10 with DPX extension In some embodiments, the training should happen on the linear RGB or sRGB space. For other types of colour spaces, the model may introduce artifacts. Traditionally in composition work, the artist will convert images to linear RGB prior to any composition task.

In some embodiments, the described model may be a deep neural network that replicates a particular look requirement set by a show's producers.

Data may be provided in small video clips called shots. As a metric for success, compositing artists classified the performance of the final shot output as Perfect, Polish, and Redo, defined as follows:

Perfect: The ML output shot does not require any further changes before being shipped to a client.

Polish: The ML output requires touch-ups or minor fixes which can be done by VFX artists in minutes.

Redo: The ML output deviates from the required quality to a significant degree and it is faster to edit the original shot by VFX artists than making corrections in the ML.

Steps for quality checks (QC) may involve
1. Technical QC:
　 1. Grain match
　 2. Black levels and white levels
　 3. Warping edges
　 4. Matte edges
　 5. BG stretching
　 6. NaN pixels/Illegal values (NaN=Not A Number)
　 7. Edge of frame
　 8. Identifying any missing frames
　 9. Identifying frame ranges
　 10. Identifying colour spaces
　 11. Identifying correct file formats and compression
　 12. Identifying bounding boxes
　 13. Identifying alpha channels
　 14. Identifying pixel differences
　 15. Identifying any image ghosting/double images/image artifacts 16. Tracking issues or floating patches
17. The lighting value matches
18. Identifying sharpness or softness in the image or modified area
19. Retime
20. Repo 2. Creative QC:
1. Look match—Compare against the client-approved data set or client-approved shot.

The steps for quality checks according to one embodiment may follow such a process outlined above, but may in other embodiments include more or less steps, and may be performed in various orders.

As described above, there exist various technical challenges which the described embodiments propose to resolve. For example, the data is high-resolution, 4K, and there are limited off-the-shelf pre-trained models for such high-resolution image data. Hence, the model, in some embodiments, may be trained in-house. Training a temporal model requires temporal data, which increases an artists' manual labor. Thus, in some embodiments, only per image inference that should be temporally consistent may be used. If not, the temporal inconsistency can only be mitigated through post-processing the output video data.

Additionally, the error tolerance in VFX is low. The inferred output must have a very high fidelity with the actor's reference look generated by the composition artist. There should also not be any changes outside of the Region of Interest (ROI).

Figure 6:
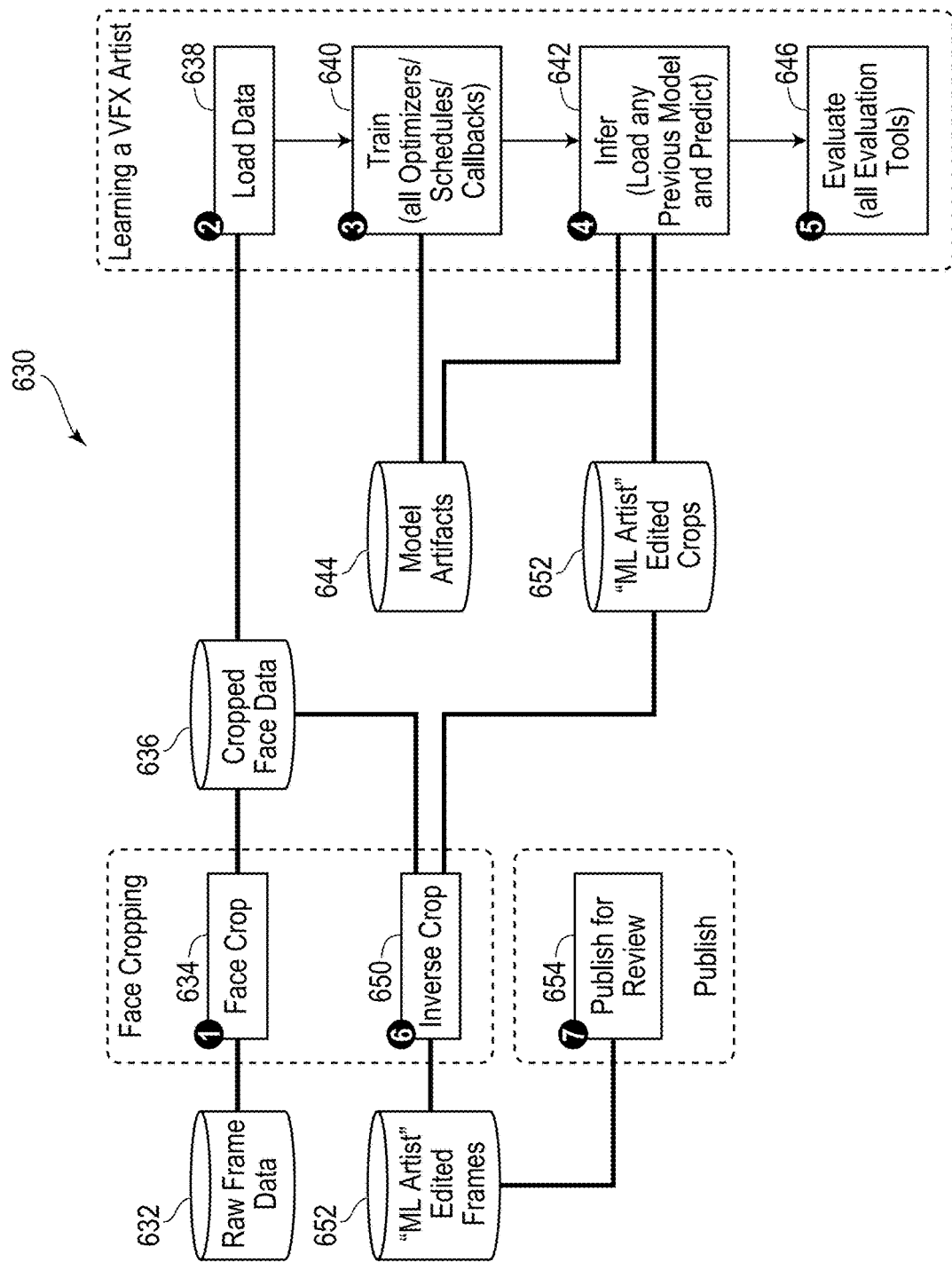
FIG. 6 shows a block diagram illustrating a high-level workflow of an exemplary system, according to some embodiments.

FIG. 6 shows a block diagram illustrating a high-level workflow of an exemplary system 630, according to some embodiments. The following steps are exemplary, and some embodiments may have more or less steps, and may be performed in various orders.

Raw frame data 632 is received, upon which face crop 634 may occur, producing cropped face data 636. In some embodiments, cropping may not be performed on the face, and may be performed on other parts of an actor/subject. The cropped face data may then be loaded into a model at 638, such that the model can begin to learn a VFX artist. The model may then be trained in 640, including all optimizers/schedulers/callbacks. Inference may then be made in 642, and the system may involve any previously trained models, making a prediction. Together, the training and inference steps may produce model artifacts 644. The model may then be evaluated in 646.

In some embodiments, training may be stopped when pixel error is reduced below a certain value, for instance a target pixel error of X. For example, pixel error X may be 0.0007. This is to reduce the chance of overfitting to the keyframes alone, and saves computation time (because once X is achieved, an eye cannot tell the difference).

Machine learning artifacts 644 may be output by the training process 640.

After model training, and a prediction is made, "ML Artist" edited crops 648 are produced. An inverse crop 650 may then be performed to re-insert the edited crops into the original frame, editing or correcting the portion of the original frame identified and cropped during face cropping. The produced "ML Artist" edited frames 652 may then be published for review in 654.

It should be noted that input and output from any ML model is typically cropped region of the full frame, however some embodiments may use a full frame. Crop may be used to both limit the effects of any errors to the regions of interest (face/eyes/mouth) and focus the network capacity on the regions of interest, thereby reducing use of computer resources.

Figure 7A:
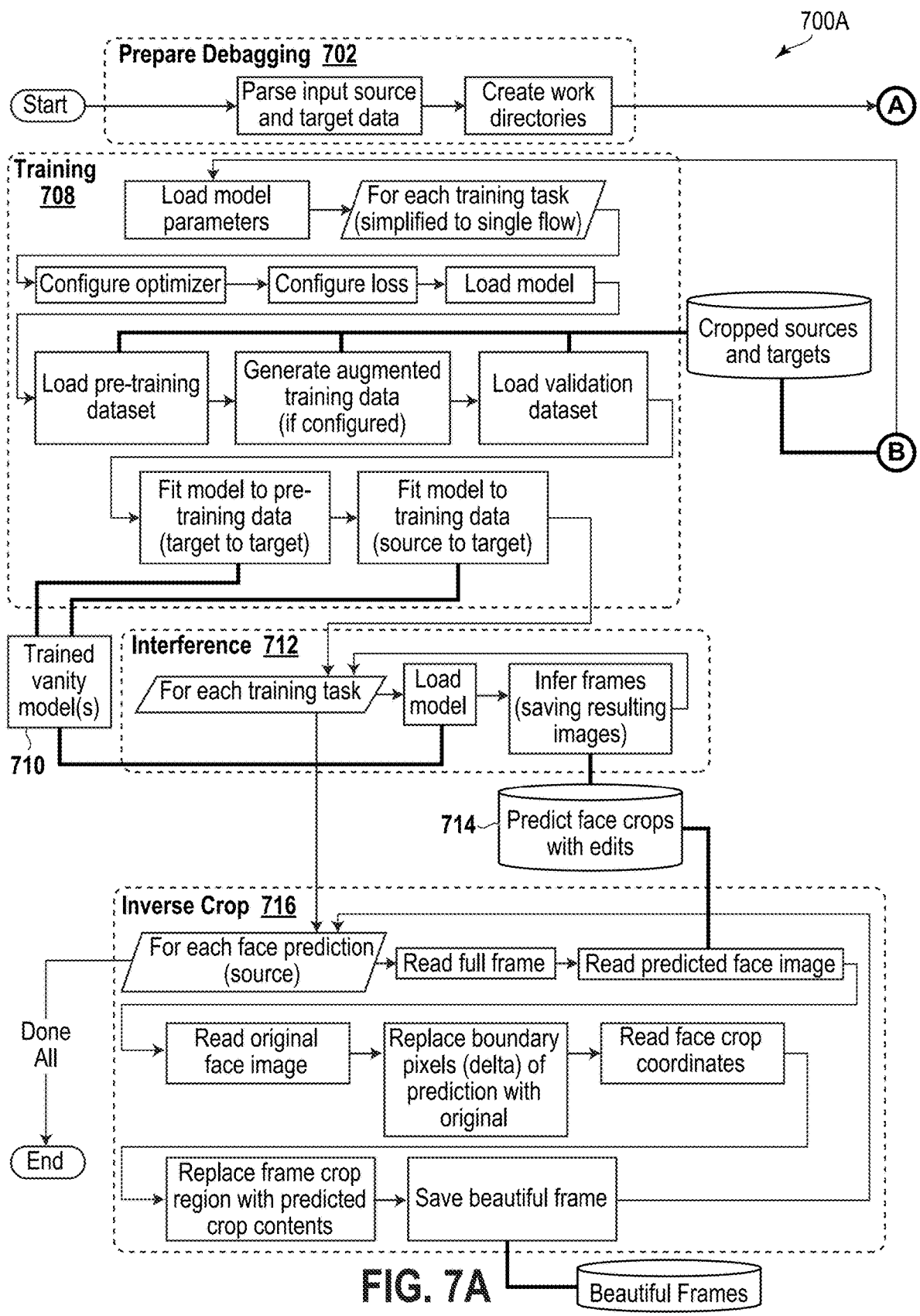
FIG. 7A and FIG. 7B show a block diagram illustrating a detailed workflow of an exemplary system, according to some embodiments.
Figure 7B:
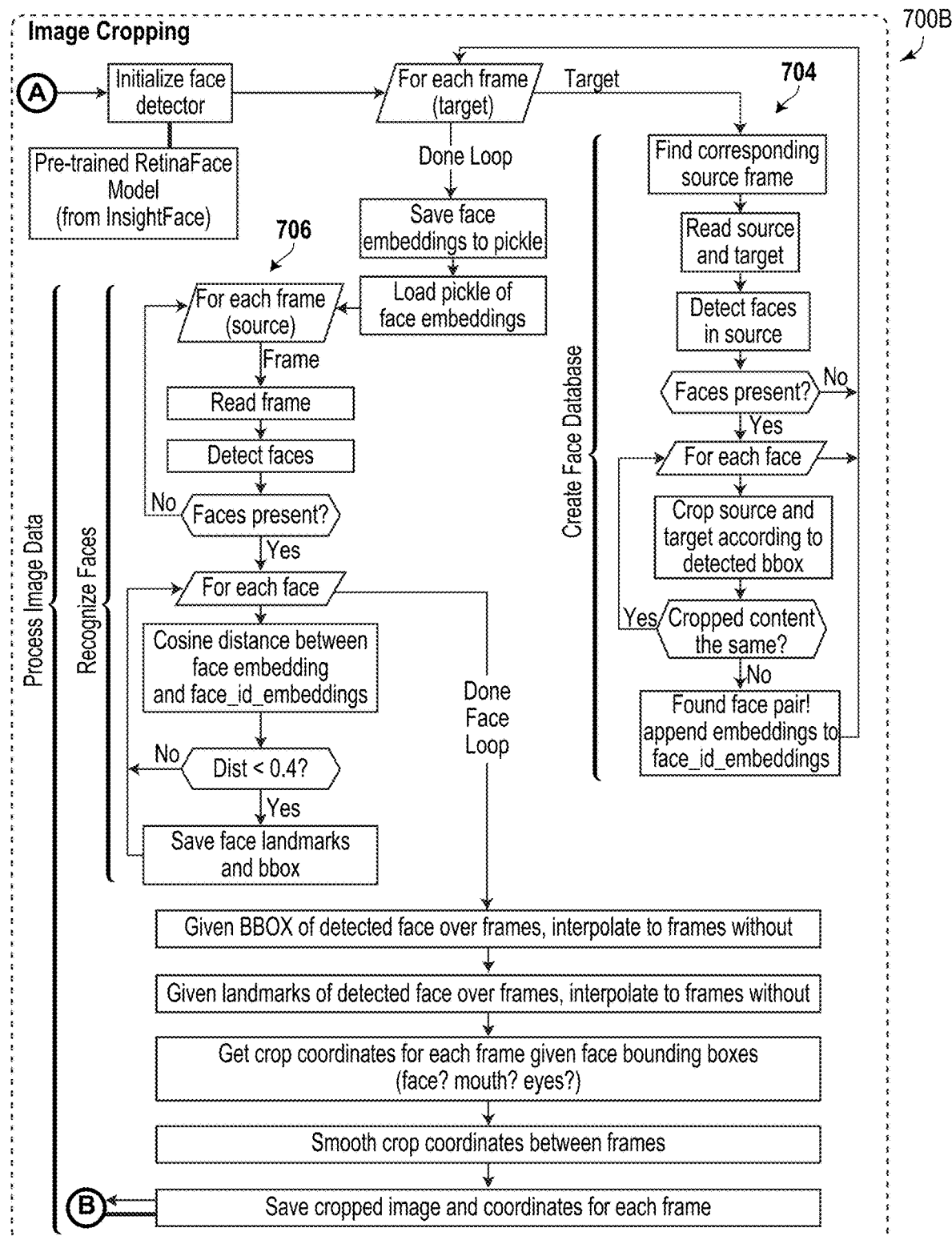

FIG. 7A and FIG. 7B show a block diagram illustrating a detailed workflow of an exemplary system 700A and 700B, according to some embodiments. The following steps are exemplary, and some embodiments may have more or less steps, and may be performed in various orders.

Initially, a debagging preparation phase 702 process may occur, which may involve parsing input source data and target data, and creating work directories. The system may then proceed to image cropping. In some embodiments image cropping may be performed by a third party model, for example InsightFace.

In some embodiments, during dataset preparation, original images may be part of a video. This video is further divided into a set of shots. Each shot consists of a set of images that are continuous in time. These images may be of a very high resolution (4K, for example).

As a first step, in some embodiments, the images may be de-grained by the artists. This step removes the sharp information in the image and smooths the image overall. The de-grained information may then be added back to the image once the automatic image modification is complete. The purpose of this step is to maintain the high-resolution detail of the image. The de-grained images are then automatically cropped for a region of interest. It is sufficient to process only the region of an image that requires modification. However, the region of interest is larger than the actual target area of image modification; this step increases the software's computational efficiency significantly. A very small set of images are selected for each shot to be modified by professional artists manually. These images and their modifications are used as input and target images for the machine learning model in question.

In some embodiments in 704, for each target frame, the system may find the corresponding source frame, reads both frames and detects faces in the source.

If no face is found, this loop returns and begins with another frame. If faces are present, then for each face, the system may crop the source and target according to a detected bounding box. The system will then check, comparing the cropped source and target, to determine if they are the same. If the two are the exact same, then this is not the face for editing, and this process is repeated on any other previously detected faces.

Cropped source and target frames are paired and the embedding appended to face_id_embeddings, and this loops finding all the edits made to faces, and the loop breaks once completed. The face embeddings may then be pickled (saved to a pickle, i.e. transformed into a serial stream of bytes), and then loaded. In some embodiments, the embeddings contain the target face information of the keyframes, and this information may be used to find the target face in the non-keyframes.

In some embodiments in 706, for each source frame, similarly, the frame is read and faces are detected in a loop. For each detected face, a cosine distance between the embedding and face_id_embeddings may be measured, and a certain distance threshold may be used to determine the face of interest.

For example, Dist<0.4? may be evaluated to determine the if the detected face is the face of interest. If so, the face landmarks and bounding box will be saved, and this loop will continue until done for all faces.

Given a bounding box of a detected face over frames, the system may interpolate to frames without a bounding box.

Given landmarks of a detected face over frames, the system may interpolate to frames without landmarks. Frames may not have a bounding box or landmarks because no faces were found by the face detector, or the embedding of found faces was not close enough to the person of interest. The system may then obtain crop coordinates for each frame given the face bounding boxes, for example the face, mouth, and eyes. Crop coordinates between frames may then be smoothed and interpolated for tracking crop regions from frame to frame, and the cropped images and coordinates for each frame are saved. The coordinates may be needed for inverse cropping.

In other words, face cropping may, in some embodiments, use target and source images, employ a third party detector, RetinaFace face detector for example, to identify faces in the images and generate a database of unique faces in the shot. Using the faces identified, the system may generate bounding box coordinates as well as five face landmarks (two eye centres, tip of nose, two corners of mouth), refine the bounding box for a cropped part of interest (e.g. eyes, mouth, full face), save new bounding box coordinates for later use in the inverse crop, among others. In some embodiments, face crop may be performed using a pre-trained model, such as InsightFace's face analysis app, for example.

After image cropping, the model may, in some embodiments, undergo training as part of step 708. The model parameters are loaded, which may be a per shot, per episode, or global model, described in more detail below. For each task in training 708, an optimizer and loss may be configured, and the model may be loaded. The cropped sources and targets may then be fed into the training flow 708, when loading a pre-training dataset, then generating augmented training data, and loading a validation dataset, in some embodiments. The validation dataset is the training set before augmentation.

In some embodiments, the loss may be the difference between the target and the "ML Artist" or model prediction. Various loss functions may be used for training purposes. For example, a loss function may be "pixel loss". However, pixel loss does not preserve any structural information, and thus other types of loss functions may be used. In some embodiments the loss may be specified in a configuration file, and the model architecture may consider this loss function during the training process.

Similarly, there may be a wide variety of optimizers from which a best fit can be chosen. The choice of optimizer may help with quality of the output, as well as the speed at which the network will converge.

The model may then be fit to pre-training data, target to target. The pre-training task is mapping target to target, according to an embodiment. The model may then be fit to training data, source to target. In some embodiments, after the model is trained, it may be added to a repository of trained models 710.

For instance, in some embodiments, the pre-trained dataset contains the same input as a target. It may be the pair of (Y, Y), for example. The goal is that the network may learn some facial features, and then this pre-trained model may be used as a starting point for actual training (i.e. with (X, Y) pairs of data). In some embodiments, the same model may be used for pre-training, and maps target to target. In some embodiments, an autoencoder may be used to perform the image modification/translation automatically. This autoencoder is trained for the kind of image improvement the model needs to perform using training images. After training 708, test images that are also cropped for the region of interest are passed as an input to this model, and the model returns the inferred/modified image in 712. The inferred images are not the final outputs.

These images are cropped at the region of interest that contains the target area of modification. However, the machine learning model can inadvertently modify image regions that are outside the target area. Hence, it may be important to identify and segment the target's exact area and return the modifications to this region.

The training 708, in some embodiments, performs supervised learning. The network may be trained for each segment of a movie clip, for example: the shot, using the original and manually modified image frames. The training may be concluded when the optimized function is converged to a specific value. This value is empirically identified for each individual project.

Once the model has been trained, in some embodiments, a prediction may be made during an inference stage 712. For each training task, the model is loaded and frames are inferred, saving the resulting frames. In some embodiments, the loaded model may be a previously trained model. This process may be repeated for the required frames. The output from the inference stage 712 are predicted face crops with edits made 714.

The face crop edit predictions may then be fed into an inverse cropping stage 716. The inverse cropping stage 716, in some embodiments, may be performed for each source face prediction. The system may read the full frame, the predicted face image, and the original face image. Then, the system may replace boundary pixels (delta) of the prediction with the original. The face crop coordinates can then be used to replace the frame crop region with the predicted crop contents. The frame has now been edited, and can be saved. This process may be repeated for the required frames.

Figure 8:
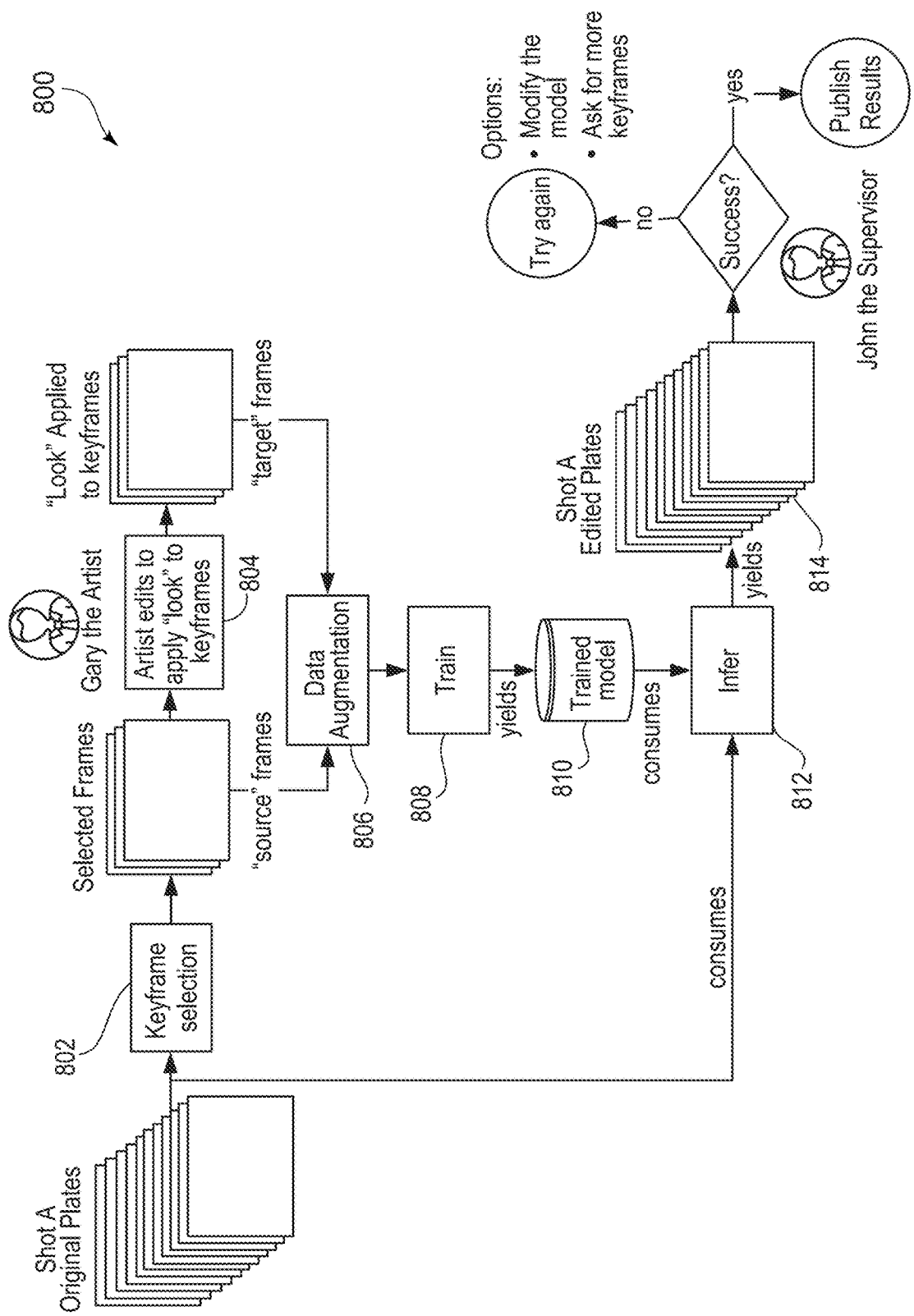
FIG. 8 shows a high-level flowchart of a per shot model training, according to some embodiments.

FIG. 8 shows a high-level flowchart of per shot model training 800, according to some embodiments. The illustrated flow, may in some embodiments, be similar to the describe workflows in FIG. 6, FIG. 7A and FIG. 7B.

Keyframe selection 802 may first be conducted, and may be conducted manually by an artist or machine learning engineer. In some embodiments, keyframe selection 802 may be done automatically. Automatic keyframe selection may be done using contrastive learning, for instance, with approaches specific to selecting frames from shots, differing from existing approaches which consider images as independent without temporal understanding. Typically, 3-5 keyframes are requested per shot, which may vary depending on the motion and complexity of the shot being edited.

A VFX artist applies edits to these selected keyframes in 804.

Data augmentation 806 may then be performed manually, applying flip, scale, translation, crop, and color augmentations to the edited frame pairs to increase generalization to remaining frames. This may be done by an engineer, looking at a shot and toggling augmentations to improve results for that shot. In some embodiments, data augmentation 806 may be tailored to the specific shot being trained. For example, eye bag removal on a production benefited most from translation, scale, color and flip augmentations. While full face editing on another production benefitted from random crop additionally. In some embodiments applying data augmentations 806 may be an automated process, with no need for an engineer to apply the augmentations manually.

In some embodiments, during training 808, to enforce unity reconstruction, a two part training scheme may be used. First, the model may be pre-trained to predict target images from target images. Once trained to an acceptable error, <0.0001 per pixel average difference for example, the model may then be further trained to predict edits from source images. Training may again be stopped once an acceptable error has been reached. The goal of pre-training is to promote unity reconstruction of the generated images. Namely, in VFX, the output image, must have no visible error in regions in which edits do not occur. Pre-training has significant impact on meeting this requirement. In some embodiments, the pre-training scheme and focus on unity reconstruction has been designed specifically to improve output quality when dealing with high resolution images, which is a challenge encountered in VFX.

The trained model 810 may then be used to infer edits on each source frame in 812. A VFX supervisor may check the results, and can visually decide whether the plates are of acceptable quality for production. If the edited plates 814 are not of acceptable quality, the model may be modified, or more keyframes may be used and the process may be repeated.

A per-shot model solution, according to an embodiment, is described below.

Initial experiments were performed on a show called Production 1. The task here was to remove the eye bags below the main character's eyes to make her look younger. To overcome the challenges mentioned above, the following method was employed:

A U-Net model was trained using a minimal set of image pairs (roughly three to six) for each small video clip (shot) of two hundred to four hundred image frames. This highly overfit model allowed maintenance of the required fidelity and accuracy of the output images. Furthermore, for most shots that did not contain significant head motion, the temporal consistency within the individual image output was acceptable and did not require further post-processing.

Results:

I. Hyperparameter-Tuning

Hyper tuning was performed on a set of representative shots to select the best "starting" parameters for any production run. More specifically, the same model was trained with different parameters in an attempt to find the best performing model across a set of shots. This "best model configuration" may serve as a default for any new show/shot. In production, if the results using such a default model are inadequate, manual experimentation may be done, further tuning to improve the results on the shot in question (shown by 'try again" in most diagrams).

The parameters tuned are highlighted below:
Dataset Augmentation
Flip
Translate
Random crop
Color
Scale
Model Architecture
Number of res blocks in encoder and decoder
Num filters per layer
Kernel sizes
Activation method
Normalization methods In some embodiments, more or less parameters may be tuned.

For hyperparameter-tuning, the combined data of episodes 205 and 206 were used. One hundred six images from twenty-four shots were used for training and thirty-one images from six shots were used for validation. The best set was selected based on the statistics of Mean Absolute Error (MAE) from the validation data. The below hyperparameter set was accountable for the best MAE of 0.0014.
Batch size: 1
Learning rate: 0.00001
Optimizer: Adam
Normalization layer: no normalization
Dropout: 0
Number of encoder/decoder blocks: 5
Augmentation: Best results with colour, translation, and horizontal flip
Skip connections: Best results with all skip connections are present II. Eye-Bag Experiment Results Two types of eye-bag experiments were conducted based on the best hyperparameter set:
1. Training shot-by-shot on twenty-four shots from episodes 205 and 206, and visual check on twelve shots.
2. Training on combined data twenty-four shots from episodes 205 and 206, and visual check on twelve shots (six seen data and six unseen).

These results were visually inspected by the Comp team. In the experimental outputs, the system achieved four Perfect, six Polish, and two Redo for shot-by-shot training. For the combined training there were eleven Polish outcomes and one Perfect outcome. Although the global training had less Perfect results compared to the per shot, it also had no Redos, which is considered a better result.

Achieved results were a Perfect rate of 71%, a Polish rate of 19%, and a Redo rate of 10%.

A drawback of the above solution may be that transfer learning is not possible between the two trained models. Consequently, the data requirement over time is constant and the model has to be trained for every shot.

A second solution, a global model, is described below, according to another embodiments.

In some embodiments, a model may be trained which combines all available image pairs from different actors. This data from was collected from previous productions or shows successfully delivered for the task of de-aging.

An advantage of this embodiment is that there is only one model to be trained, and the model is less overfitted and hence, more general. A drawback may be low fidelity towards actor-specific look.

Results:
Various Loss Comparison Experiments:

Several sets of experiments were conducted on the global Production 1 dataset which consisted of thirty-one shots across two different episodes (205 and 206). Twenty-five shots of the total number of shots were used for training the model in each experiment and six shots were used for testing. The objective was to assess the performance of the residual U-Net model on several recent changes such as configurable network depth, optimized hyperparameters, and different loss functions.

Table 2 shows the various architectures and their results (total number of Redo, Polish and Perfect shots as reviewed by the comp team). Base Autoencoder refers to the original model, which was used for shot-by-shot training during the production of the Production 1 show by the ML team. A residual U-Net model is the redefined architecture of Base Autoencoder. It has a modular structure in which many parameters of the model, such as depth of encoder and decoder, loss functions, normalization method, and skip connections are configurable by making changes in a single configuration file. The experiments e0001 and e0002 were performed shot by shot to reproduce the benchmark on both the models separately. The following experiments used different losses on the combined training dataset of twenty-four shots. The first three experiments used 'pixel loss' to train the models. The fourth experiment used a structural similarity index measure as loss, also known as SSIM loss, while the fifth used a 1:1 ratio combination of SSIM and pixel loss. The sixth and seventh experiments used multi-scale SSIM (MS-SSIM) loss and a 1:1 ratio combination of MS-SSIM and pixel loss. The multiscale SSIM applies SSIM over multiple resolutions of the output images through a process of multiple stages of downsampling. The learning rate used was 0.00001.

As evidenced above, the remodeled Residual U-Net outperforms Base Autoencoders on the shot-by-shot as well as the combined dataset of two episodes. Combined training using Residual U-Net in the third experiment performs better than shot-by-shot training on either model. Furthermore, SSIM loss used in the fourth experiment and later is better in the eyes of Comp review when compared to pixel loss. The two shots which were marked 'Redo' in case of SSIM loss were overdone as per the comp team, meaning that the texture near the eyes was smoothed more than what was required. A combination of SSIM loss and pixel loss suffered from the same issue. Multiscale SSIM loss didn't improve upon the results obtained by SSIM loss, which signifies that best results in the given settings can be obtained by a combination of SSIM loss and pixel loss.

It can be concluded from the above outcomes that the combined dataset offered better results when compared to a per shot model. Further SSIM loss produced more accepted shots (Perfect and Polish) when compared to pixel loss. However, it was also observed that SSIM loss tends to be unstable during per shot training, owing to the unnormalized nature of the training data.

According to another embodiment, a global model rather than per shot training, is described below.

TABLE 2

Architecture used for Production 1's global dataset experiments

| Experiment Name | Architecture Name | Loss | Training Data | No. of Encoders and Decoders | Redo | Polish | Perfect |
|---|---|---|---|---|---|---|---|
| e0001 | Base Autoencoder | Pixel loss | per shot | 7 | 4 | 5 | 2 |
| e0002 | Residual U-Net | Pixel loss | per shot | 5 | 2 | 6 | 4 |
| e0003 | Residual U-Net | Pixel loss | 24 shots from 205, 206 | 5 | 0 | 11 | 1 |
| e0004 | Residual U-Net | SSIM Loss | 24 shots from 205, 206 | 5 | 2 | 2 | 8 |
| e0005 | Residual U-Net | PIXEL + SSIM Loss | 24 shots from 205, 206 | 5 | 3 | 2 | 7 |
| e0006 | Residual U-Net | MS-SSIM Loss | 24 shots from 205, 206 | 5 | 3 | 4 | 5 |
| e0007 | Residual U-Net | PIXEL + MS-SSIM Loss | 24 shots from 205, 206 | 5 | 3 | 4 | 5 |

Table 3 summarizes the results of the experiments. For evaluation, the results of the experiments were submitted to the Comp team. They provided detailed feedback on each of the shots, explaining in particular when a shot was marked 'Polish' or 'Redo'.

The per shot training model, in some embodiments, trains a few frames from a given shot and performs inference on the same shot. The main drawback of the per shot model, in some embodiments, is that it has to be trained individually on all the shots which require de-aging. The model trained

TABLE 3

Shot-wise comparison of results on different experiments

| Episode | Shot | Train/test | e0001 | e0002 | e0003 | e0004 | e0005 | e0006 | e0007 |
|---|---|---|---|---|---|---|---|---|---|
| 205 | 002_020 | Train | Redo | Polish | Polish | Perfect | Perfect | Perfect | Perfect |
| 205 | 009_210 | Train | Redo | Perfect | Polish | Redo | Redo | Redo | Redo |
| 205 | 024_050 | Train | Redo | Redo | Polish | Perfect | Perfect | Redo | Redo |
| 206 | 003_050 | Train | Redo | Polish | Polish | Polish | Perfect | Redo | Redo |
| 206 | 016_060 | Train | Polish | Polish | Polish | Perfect | Polish | Perfect | Perfect |
| 206 | 022_070 | Train | Polish | Polish | Polish | Redo | Redo | Polish | Polish |
| 205 | 003_030 | Test | Polish | Perfect | Polish | Perfect | Polish | Polish | Polish |
| 205 | 015_085 | Test | Redo | Redo | Polish | Perfect | Perfect | Perfect | Perfect |
| 205 | 020_080 | Test | Perfect | Perfect | Perfect | Perfect | Perfect | Perfect | Perfect |
| 206 | 005_060 | Test | Polish | Perfect | Polish | Perfect | Perfect | Perfect | Perfect |
| 206 | 012_150 | Test | Perfect | Polish | Polish | Polish | Redo | Polish | Polish |
| 206 | 015_180 | Test | Polish | Polish | Polish | Perfect | Perfect | Polish | Polish | on one shot cannot generalize to another shot since the dataset is very specific to the one shot on which it is trained.

However, as shown in Table 4, it achieved significant success on the eye bag removal task with a total of 90 shots marked as Perfect or Polish, and only ten shots requiring a Redo by VFX artists. On average, the training and inference time required for the per shot eye-bag model was an hour.

TABLE 4

Summary of results by model

| Per shot model | Per episode model | Per show model |
|---|---|---|
| Trained from scratch shot by shot | Trained on all the keyframes of the shots from a single episode. | Trained from several sample frames from several episodes of the same show. |
| Performs inference only on the shot with which it is trained. | The same model performs inference across all the shots in that episode. | The same model performs inference across the entire show. |
| Perfect: 71 | Perfect: 24 | Perfect: 13 |
| Polish: 19 | Polish: 40 | Polish: 50 |
| Redo: 10 | Redo: 36 | Redo: 37 |
| Takes 1 hour training time per shot | Takes 18 hours training time for 450 + epochs over 4 GPUs | No additional training done. Model trained on one episode is directly used for another episode |
| Good for fire-starting or small projects | Good for building scene-specific model | Good for building per actor model |

Due to the lack of generalization abilities of the per shot model, in some embodiments, and the time required in training, a global model according to some embodiments is proposed in a variant embodiment, which may be trained on a huge variety of datasets to perform the de-aging task. A step towards a global model was to train a per episode model. A per episode model is trained on all the keyframes of the shots from a single episode and inference is done on the frames/shots which are not in the training set. Since the dataset is larger, the training time is longer. The training here was performed on episode 205 of Production 1 separately which took eighteen hours to train the model. The model performed moderately well with two-thirds of the shots marked as Perfect or Polish while three shots were categorized as complete Redo. The model parameters were the same as mentioned in the hyperparameter tuning section above.

The next step towards a general model was to train using the dataset from a show across different episodes. For this, the dataset from episodes 205 and 206 of Production 1 were used to train and test the model. The model did not register significant improvement over the per show model with thirteen Perfect, fifty Polish, and thirty-seven Redo shots marked by the VFX QC team.

Figure 9:
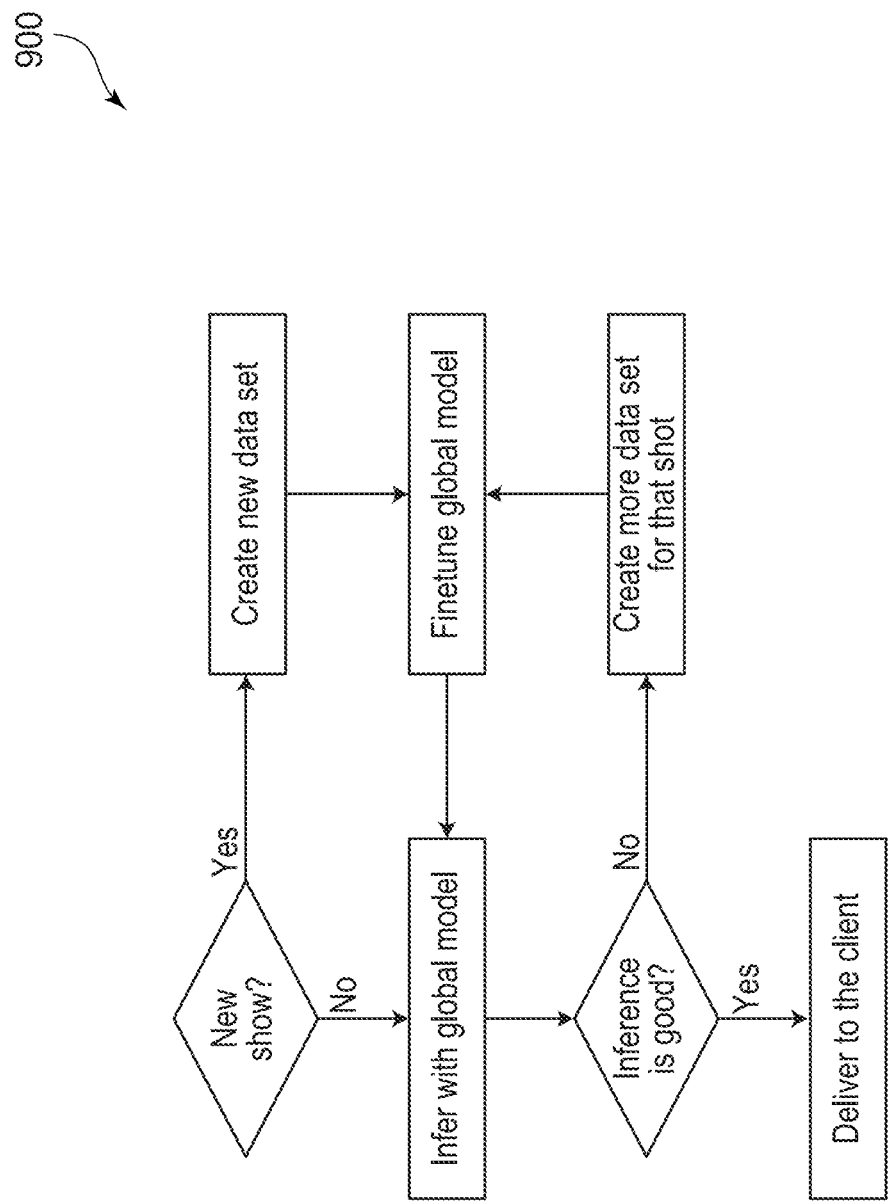
FIG. 9 shows a high-level flowchart of global model training, according to some embodiments.

FIG. 9 shows a high-level flowchart of global model training, according to some embodiments.

As shown in flowchart 900, for a new show a small dataset may be created for the initial set of shots in. The model may be trained with this data and may infer those shots as well. For new shots from the same show, in some embodiments, infer initially with this pre-trained model and check the quality of the inference. If the results pass the review then deliver them directly to the client, if not, create new data for that shot and fine-tune the existing model.

Repeat this process until all the shots are processed.

The flow for training a global model according to one embodiment may follow such a process outlined above, but may in other embodiments include more or less steps, and may be performed in various orders.

Figure 10:
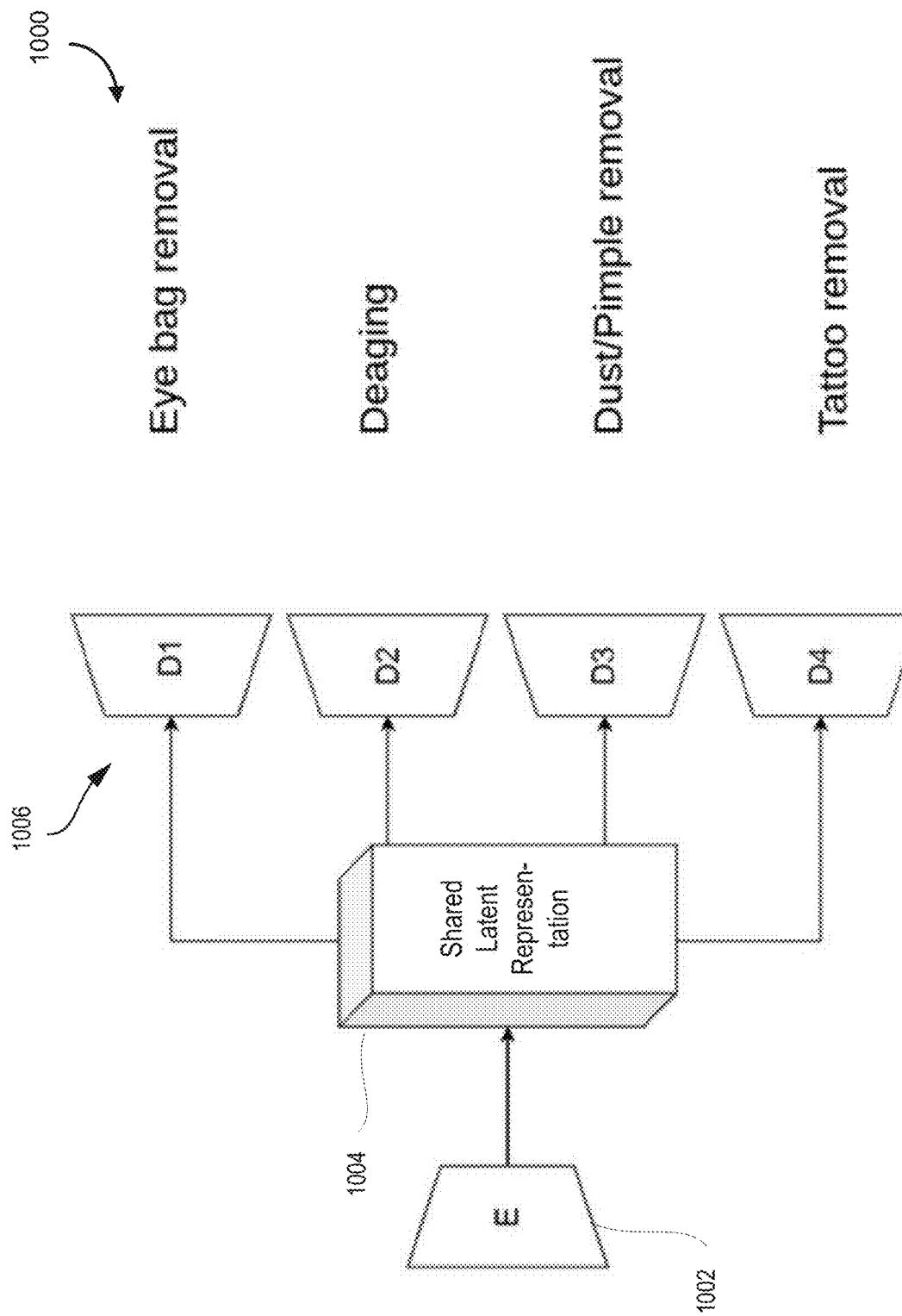
FIG. 10 shows a block diagram illustrating a single-encoder multi-decoder model, according to some embodiments.

FIG. 10 shows a block diagram illustrating a single-encoder multi-decoder model 1000, according to some embodiments.

As shown in FIG. 10, the system, according to some embodiments, uses a multi-actor, multi-task common encoder 1002 and shared latent space 1004 trained with task-dependent or actor-dependent decoders 1006. This allows use of the previously annotated data, which in turn reduces the data requirement and helps converge training more quickly for decoders.

The latent space is a high-dimensional representation of data compressed by the encoder. It may preserve the most important features of the data. A small tweak in the latent space may highly influence the output as the output may be based off of unsampling the latent space, by a decoder. If any random noise is being added to the latent space, there may be undesired changes in the output, for example.

Figure 11:
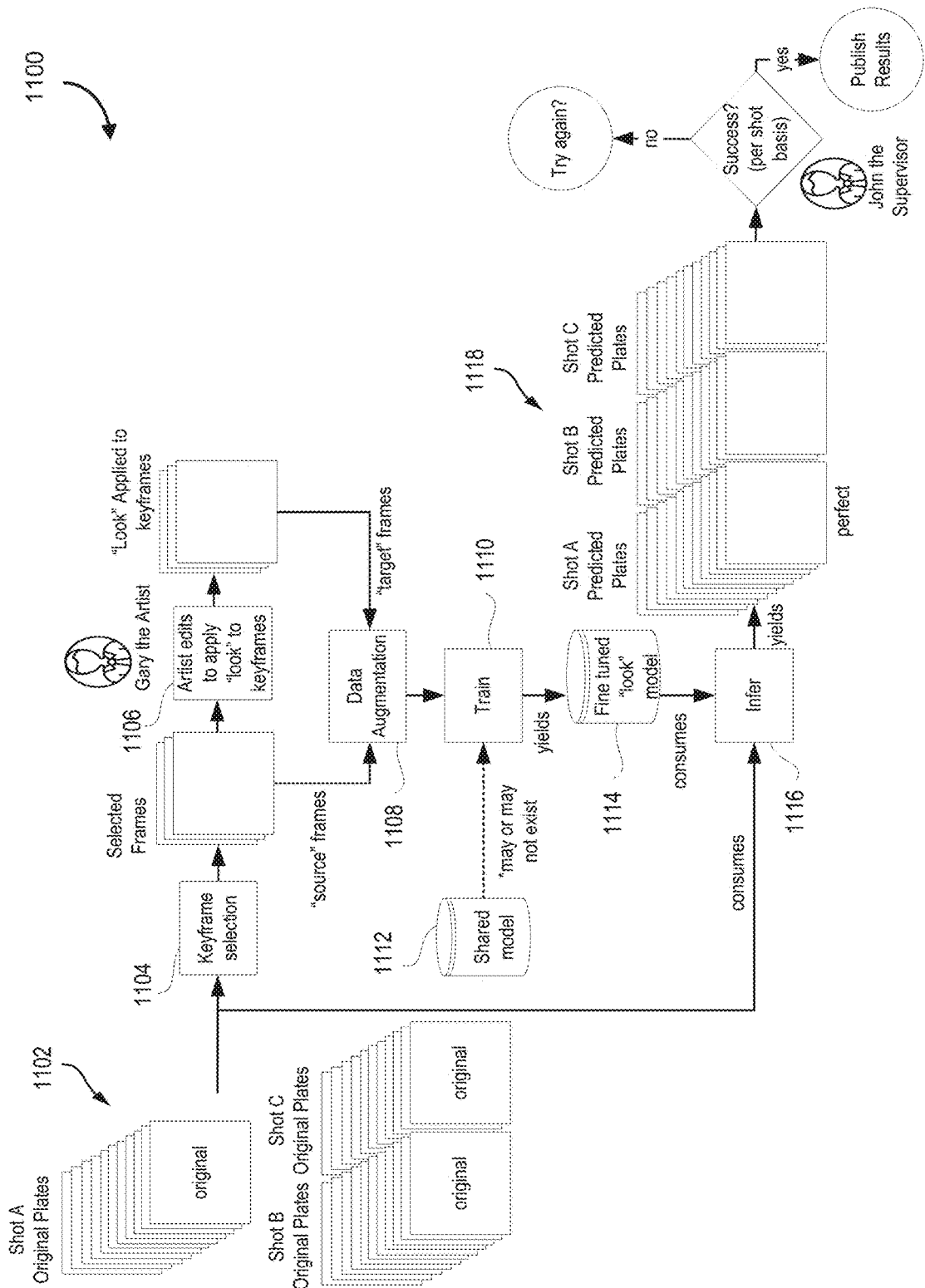
FIG. 11 shows a block diagram illustrating a global per-episode/show model, according to some embodiments.

FIG. 11 shows a block diagram illustrating a global per-episode/show model 1100, according to some embodiments.

In some embodiments, a sometimes more practical global model, such as a per episode or per show model may be preferred to a per shot model, described above and shown in FIG. 8. As shown in FIG. 11, a global model follows a similar underlying model architecture, however instead of selecting keyframes from a single shot, keyframes are selected from a collection of shots 1102. This may, in some embodiments, enable shorter training times, as a whole, and reduced work by a VFX artist.

Keyframe selection 1104 may then be conducted, and may be conducted manually by an artist or machine learning engineer. In some embodiments, keyframe selection 1104 may be done automatically. Automatic keyframe selection may be done using contrastive learning, for instance, with approaches specific to selecting frames from shots, differing from existing approaches which consider images as independent without temporal understanding. Typically, 3-5 keyframes are requested per shot, which may vary depending on the motion and complexity of the shot being edited.

A VFX artist applies edits to these selected keyframes in 1106.

Data augmentation 1108 may then be performed manually, applying flip, scale, translation, crop, and color augmentations to the edited frame pairs to increase generalization to remaining frames. This may be done by an engineer, looking at a shot and toggling augmentations to improve results for that shot. In some embodiments, the data augmentation 1108 may be tailored to the specific shot being trained. For example, eye bag removal on a production benefited most from translation, scale, color and flip augmentations. While full face editing on another production benefitted from random crop additionally. In some embodiments applying data augmentations 1108 may be an automated process, with no need for an engineer to apply the augmentations manually.

In some embodiments, during training 1110, to enforce unity reconstruction, a two part training scheme may be used. First, the model may be pre-trained to predict target images from target images. Once trained to an acceptable error, <0.0001 per pixel average difference for example, the model may then be further trained to predict edits from source images. Training 1110 may again be stopped once an acceptable error has been reached. The goal of pre-training is to promote unity reconstruction of the generated images. Namely, in VFX the output image must have no visible error in regions in which edits do not occur. Pre-training has significant impact on meeting this requirement. In some embodiments, the pre-training scheme and focus on unity reconstruction has been designed specifically to improve output quality when dealing with high resolution images, which is common in VFX.

In some embodiments, a shared model 1112 may be used to help with training, which may include assisting with pre-training. For example, a model may have been previously trained, which may be able to assist with training, and fitting the training data appropriately. In other embodiments, a shared model may already have been pre-trained, or fully trained.

The trained model, or in some embodiments a fine tuned "look" model 1114, may then be used to infer edits on each source frame in 1116, globally across an entire episode or show. A VFX supervisor may check the results, and can visually decide whether the plates are of acceptable quality for production. If the plates 1118 are not of acceptable quality, the model may be modified, or more keyframes may be used and the process may be repeated.

Figure 12:
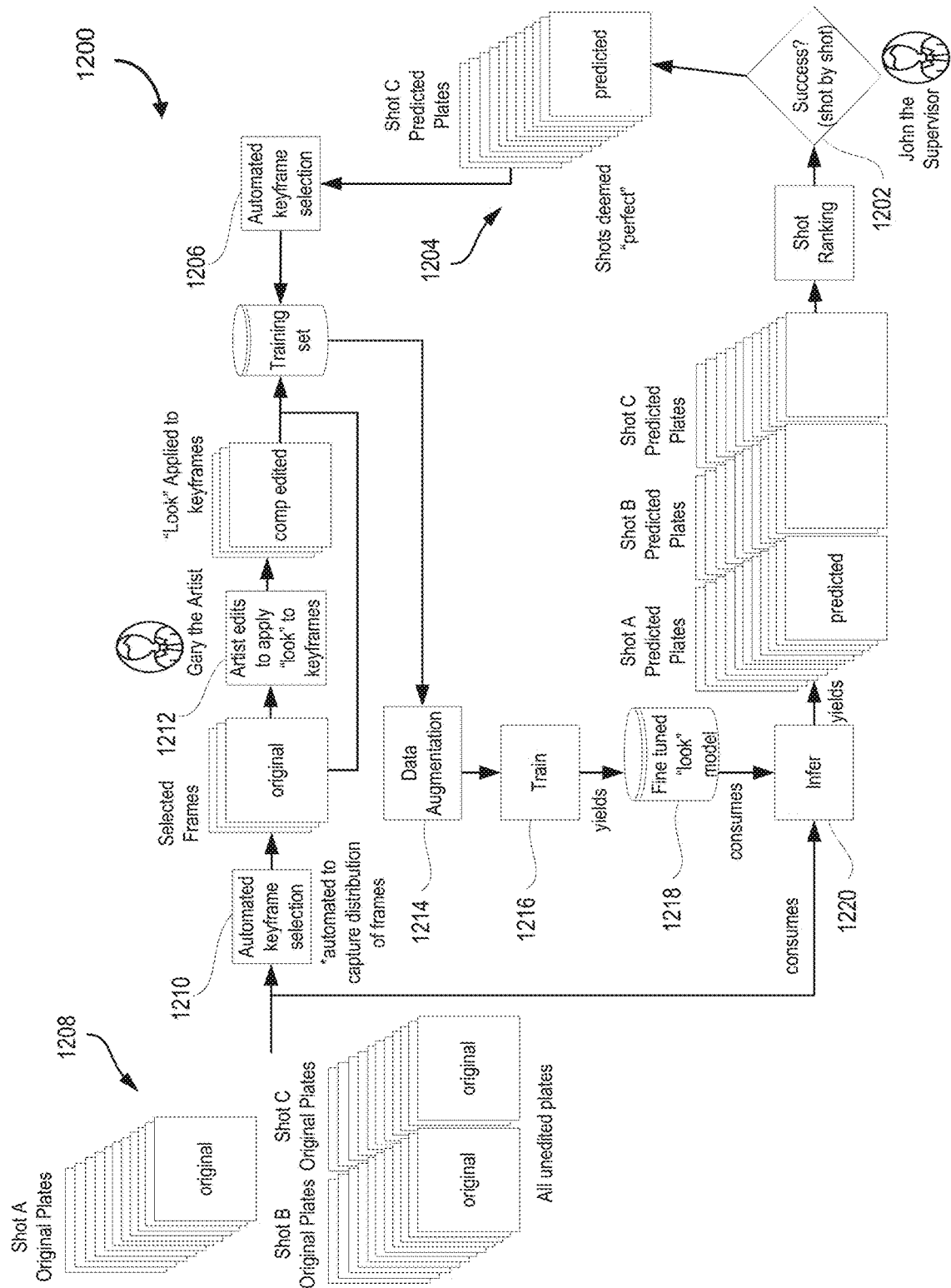
FIG. 12 shows a block diagram illustrating a feedback model, according to some embodiments.

FIG. 12 shows a block diagram illustrating a feedback model 1200, according to some embodiments.

In some embodiments, a VFX supervisor 1202 may be involved in the process, providing feedback by feeding shots 1204 deemed "perfect" back into the training process for the next refinement, and may in some embodiments also include keyframe selection 1206, and/or automated keyframe selection. In some embodiments, a feedback model may emulate active learning, where a VFX supervisor 1202 may be correcting the output of the model on a semi-regular basis.

In some embodiments, a global model, such as a per episode or per show model may be preferred to a per shot model, as described above. As shown in FIG. 12, a global feedback model follows a similar underlying model architecture, however instead of selecting keyframes from a single shot, keyframes are selected from a collection of shots 1208. This may, in some embodiments, enable shorter training times, as a whole, and reduced work by a VFX artist.

Keyframe selection 1210 may then be conducted, and may be conducted manually by an artist or machine learning engineer. In some embodiments, keyframe selection 1210 may be done automatically. In a variation, automatic keyframe selection is implemented using contrastive learning, for instance, with approaches specific to selecting frames from shots, differing from existing approaches which consider images as independent without temporal understanding. Typically, 3-5 keyframes are requested per shot, which may vary depending on the motion and complexity of the shot being edited. In some embodiments, automated keyframe selection may be used, automated to capture a specified, or determined distribution of frames.

A VFX artist applies edits to these selected keyframes in 1212.

Data augmentation 1214 may then be performed manually (in other variations, it can be performed automatically), applying flip, scale, translation, crop, and color augmentations to the edited frame pairs to increase generalization to remaining frames. This may be done by an engineer, looking at a shot and toggling augmentations to improve results for that shot. In some embodiments, data augmentation 1214 may be tailored to the specific shot being trained. For example, eye-bag removal on a production benefited most from translation, scale, color and flip augmentations. On another production, full face editing benefitted from random crop augmentations. In some embodiments applying data augmentations 1214 may be an automated process, with no need for an engineer to apply the augmentations manually.

In this automated process, for example, the augmentations 1214 may be determined by an auxiliary machine learning model which tracks one or more feature representations which yielded the best outcomes in prior uses of the system, and pre-processes incoming videos to generate the selected frames. For example, frames showing a diversity of a feature that the system otherwise has increased problems on such as lighting, contrast, size, etc., aids in improving the overall functioning of the system in relation to accuracy. The auxiliary machine learning model may automatically track that redos and rejections occur most often in lighting situation changes, for example, and such an approach would tailor the selection of frames and training to improve the model accuracy automatically to adjust for differences in lighting situation.

In some embodiments, during training 1216, to enforce unity reconstruction, a two part training approach may be used. First, the model may be pre-trained to predict target images from target images. Once trained to an acceptable error, <0.0001 per pixel average difference for example, the model may then be further trained to predict edits from source images. Training 1216 may again be stopped once an acceptable error has been reached. The goal of pre-training is to promote unity reconstruction of the generated images. Namely, in VFX the output image must have no visible error in regions in which edits do not occur. Pre-training has significant impact on meeting this requirement. In some embodiments, the pre-training scheme and focus on unity reconstruction has been designed specifically to improve output quality when dealing with high resolution images, which is common in VFX.

The trained model, or in some embodiments a fine tuned "look" model 1218, may then be used to infer edits on each source frame in 1220 on a per shot basis or globally across an entire episode or show. A VFX supervisor 1202 may check the results, and can visually decide whether the plates are of acceptable quality for production. If the shot is deemed to be "perfect" by a VFX supervisor, the predicted shots 1204 may be added back in as a feedback loop, with keyframes being selected automatically in 1206, and being incorporated into the training process for the next refinement. In some embodiments, a feedback model may emulate active learning, where a VFX supervisor may be correcting the output of the model on a semi-regular basis.

Figure 13:
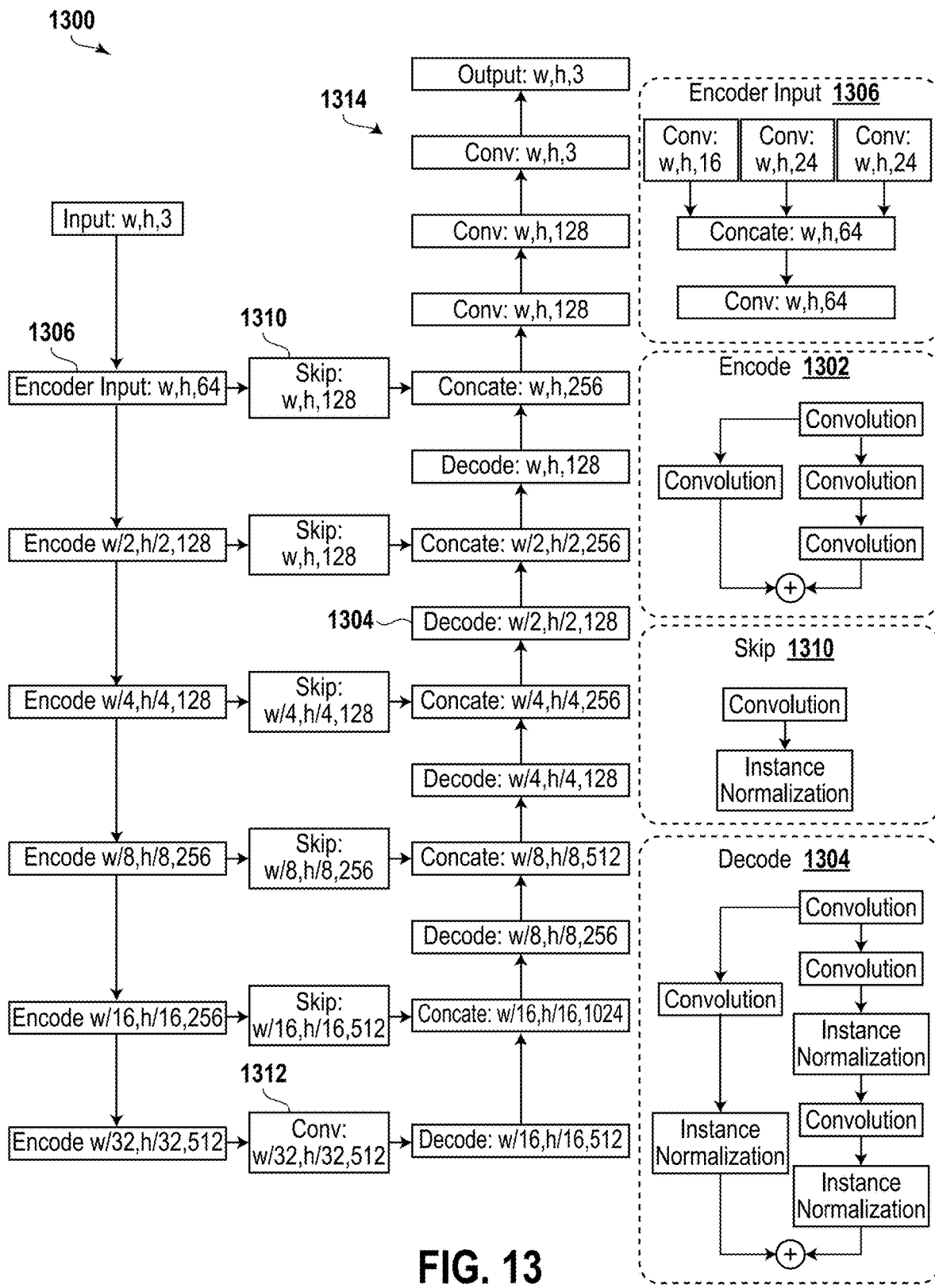
FIG. 13 shows a block diagram illustrating Residual U-Net architecture, according to some embodiments.

In some embodiments, the model performs face de-aging on input images using a U-Net-style neural network with a ResNet encoder backbone. FIG. 13 shows a block diagram illustrating Residual U-Net architecture 1300, according to some embodiments. The goal of the model is to perform image-to-image translation and perform de-aging given a set of paired images for an actor. De-aging can include both textural changes (e.g. wrinkles, eye bags, age lines) and structural changes (e.g. adjusting the size of nose, jaw, ears, chin, cheeks, etc.). De-aging is particularly difficult on structural changes, and there is a greater chance of re-dos and rejections for structural edits. Accordingly, in some embodiments, separate machine learning model architectures can be used for a particular actor or actress in respect of textural changes as opposed to structural changes, and in some further embodiments, separate machine learning model architectures may be used for each type of structural change to obtain a sufficient minimum level of accuracy. As a potential factor that can be adjusted based on a difficulty level of a particular type of edit, in some embodiments, a region of interest size parameter may be adjustable such that a speed of edit can be modified, as a technical trade-off against accuracy. For example, if eye-bags and crows feet are being edited, an expanded region may be utilized to cover both as the textural changes may be relatively simple from a computational perspective to replace. On the other hand, for structural edits, the difficulty level may be high and the region of interest may need to be reduced to achieve a practical run-time. In some embodiments, parallel processing may be required for complex edits each requiring a small region of interest, and the output regions of interest could be stitched together to generate the output frames.

In some embodiments, the speed of edits and region of interest size can be tuned based on a desired target processing time, generated, for example, based on estimates from tracked historical data based on previous runs of the system.

An autoencoder is a type of deep neural network. It has broadly two components, an encoder 1302, and a decoder 1304. The purpose of the encoder, in some embodiments, is to automatically learn the most crucial local and global features in the images for the problem at hand. The decoder, in some embodiments, using the learned features, then maps the information back into the image space to reconstruct the annotated image. Depending on the goal, the number of hidden layers and their internal connections may be adjusted.

A difference in the described model, in some embodiments, from the Residual U-Net (ResUnet) structure is that it has an inception-like input layer at the beginning. By looking at the architecture diagram shown in FIG. 13, it is visible that the Encoder Input 1306 has three parallel branches which are not present in the standard ResUnet. The benefit of this structure is that it helps to extract features having more local context from the image. See the box 1306 on top right of the architecture diagram. As VFX artists work with very high resolution data, it is important to have as much local context as possible on the feature maps. This branch structure is helpful in providing local context that enables this improvement.

Another difference in some embodiments, from the standard ResUnet, is in the skip connections convolution layers 1310 that are used. The convolution layers 1310 help the network to understand the unity in a learned manner. In other words, it can be said the convolution kernel acts as an attention map where the network learns which global features are important for unity learning.

A latent representation layer is introduced here, which works as a transition layer from encoder to decoder. In some embodiments, the latent space of the network may be modified. This is shown as the grey convolution block 1312 in the architecture diagram, according to some embodiments, in FIG. 13. In the standard ResUnet the decoder takes output from the encoder directly.

Finally, three successive convolution layers 1314 are used in the output layer to reduce the impact of the input in the modified region. As there are skip connections 1310 being used from every resolution level, there is a good chance that the network only learns the unity. To mitigate this kind of error and help the network to minimize the impact of the input in the ROI, these layers 1314 play a supporting role.

According to some embodiments, the architecture shown in FIG. 13 differs from the architecture shown in FIG. 3A and FIG. 3B in that architecture 1300 may be more flexible. For instance, it may allow modifications and changes to the network more easily. It may be described as "modular" fashion architecture. The architecture in FIG. 13 has roughly half as many parameters as that shown in FIG. 3A and FIG. 3B, and as a result of a lighter weight network, the training may be completed more quickly in architecture 1300.

The method to perform image-to-image translation and perform de-aging, for example, on given a set of paired images for an actor consists mostly of three parts: Dataset preparation/cropping, image modification translation, and inverse cropping, according to some embodiments.

Dataset Preparation:

The original images may be part of a video. This video is further divided into a set of shots. Each shot consists of a set of images that are continuous in time. These images may be of a very high resolution (4K, for example). As a first step, in some embodiments, the images are de-grained by the artists. This step removes the sharp information in the image and smooths the image overall. The de-grained information is added back to the image once the automatic image modification is complete. The purpose of this step is to maintain the high-resolution detail of the image. The de-grained images are then automatically cropped for a region of interest. It is sufficient to process only the region of an image that requires modification. However, the region of interest is larger than the actual target area of image modification; this step increases the software's computational efficiency significantly. A very small set of images are selected for each shot to be modified by professional artists manually. These images and their modifications are used as input and target images for the machine learning model in question.

Face Crop:

Faces may be cropped, in some embodiments, using the following process:

Using target and source images, the system employs the RetinaFace face detector to identify faces in the images and generate a database of unique faces in the shot. Using the faces identified, generate bounding box coordinates as well as five face landmarks (two eye centres, tip of nose, two corners of mouth). The system then refines the bounding box for a cropped part of interest (e.g. eyes, mouth, full face). The system saves new bounding box coordinates for later use in the inverse crop. In some embodiments, Face crop may be performed using a pre-trained model, such as InsightFace's face analysis app, for example.

Model Training—Image Modification/Translation:

In some embodiments, an autoencoder may be used to perform the image modification automatically. This autoencoder is trained for the type of image improvement the model needs to perform using training images. After training, test images that are also cropped for the region of interest are passed as an input to this model, and the model returns the inferred/modified image. The inferred images are not the final outputs. These images are cropped at the region of interest that contains the target area of modification. But the machine learning model can inadvertently modify image regions that are outside the target area. Hence, it may be important to identify and segment the target's exact area and return the modifications to this region.

Post-Processing—During Inference:

According to some embodiments, all the crops of the target face are fed into the trained model. Machine learning translates the input to the desired output, and the translated face crops are saved on the disc space for further processing.

Post-Processing—During Inverse Crop:

In some embodiments, if boundary shift is on, the predicted crop boundary may be adjusted with a delta of given pixels (default may be 10, for example) to perform a smooth blending of the crop to the original source file. The adjusted translated face crop may then be placed back onto the source image according to the bounding box coordinates obtained in the face crop stage. Optionally, in other embodiments, if the crop box tracker flag is on, an all-white tracker box may be created based on the bounding box coordinates in the source file.

Figure 14:
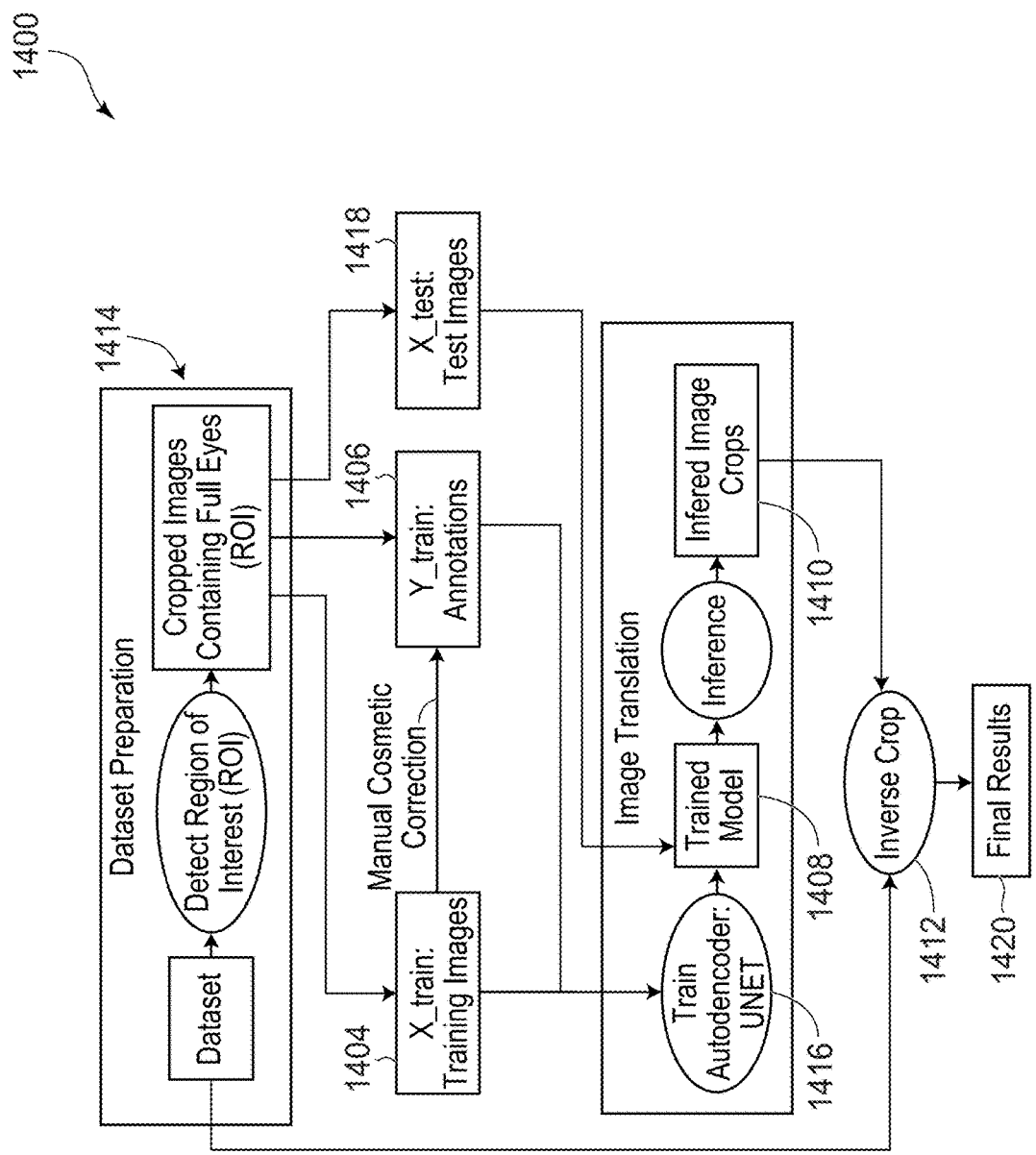
FIG. 14 shows a flowchart illustrating a code workflow, according to some embodiments.

FIG. 14 shows a flowchart illustrating a code workflow 1400, according to some embodiments.

As can be seen in 1400, a code flow in some embodiments, may involve cropping all the dataset source images for the region of interest (e.g. full eyes) and retaining crop coordinates in 1402. Crops may then be split into training and test sets. The autoencoder model may be trained using cropped training images 1404 and cropped annotated image pairs 1406 (X_train, Y_train). The trained model 1408 may perform image translation, and obtain inferred image crops 1410. Inverse crop 1412 may then be used to back project the modified image in the original image to the target region using cropped coordinates.

The original images are typically part of a video. This video is further divided into a set of shots. Each shot consists of a set of images that are continuous in time. These images are commonly of a very high resolution (4K, for example). As a first step, in some embodiments, the images may be de-grained. This step removes the sharp information in the image and smooths the image overall. The de-grained information may then be added back to the image once the automatic image modification is complete. High-frequency details are difficult to learn with a small dataset. The purpose of this step is to maintain the high-resolution detail of the image without learning it.

The images, which in some embodiments are de-grained, are then automatically cropped for a region of interest in 1414. It may be sufficient to process only the region of an image that requires modification. This step ensures that the training process takes less time. Training on full images decreases computational efficiency as well as performance accuracy. If the application requires the full image transformation, for example style transfer, cropping-ROI steps can be omitted.

For each shot, a very small set of images, keyframes, are selected to be modified by professional artists manually. These images 1404 and their modifications 1406 are used as input and target images for the machine learning model in question.

An autoencoder 1416 may be used to perform the image modification automatically. Using training image pairs, first, this autoencoder 1416 is trained for the kind of image improvement the model needs to perform. After training, test images 1418 that are also cropped for the region of interest are passed as an input to this model, and the model returns the inferred/modified image 1410.

The inferred images 1410 are not the final outputs. These images are cropped at the region of interest that contains the target area of modification, but the machine learning model can inadvertently modify image regions that are outside the target area. If the application demands change only on a very focused region, it may be important to segment that region further inside the cropped image and return the modifications only to this segmented region. This step can also be skipped if the condition for the focused region modification is relaxed.

In some embodiments, a second machine learning model of type autoencoder may be trained to learn and segment the target area during image segmentation. This second machine learning model is optional and provided in certain embodiments. An annotated image may be subtracted from the original image. The non-zero region of the resultant image from this subtraction is the exact region of the target. This image is defined as a mask. A set of pairs of images and their masks are used as input and target to train this network. The trained model is then applied to the rest of the images to segment the target image region pixels.

Now, during inverse crop 1412, the modified pixels in the output image from the image translation model are back-projected to the original image in the target image region to get the final output image 1420. In some embodiment where image segmentation has been performed, the modified pixels in the output image from the image translation model are back-projected to the original image in the target image region identified in the segmentation model output.

Figure 15A:
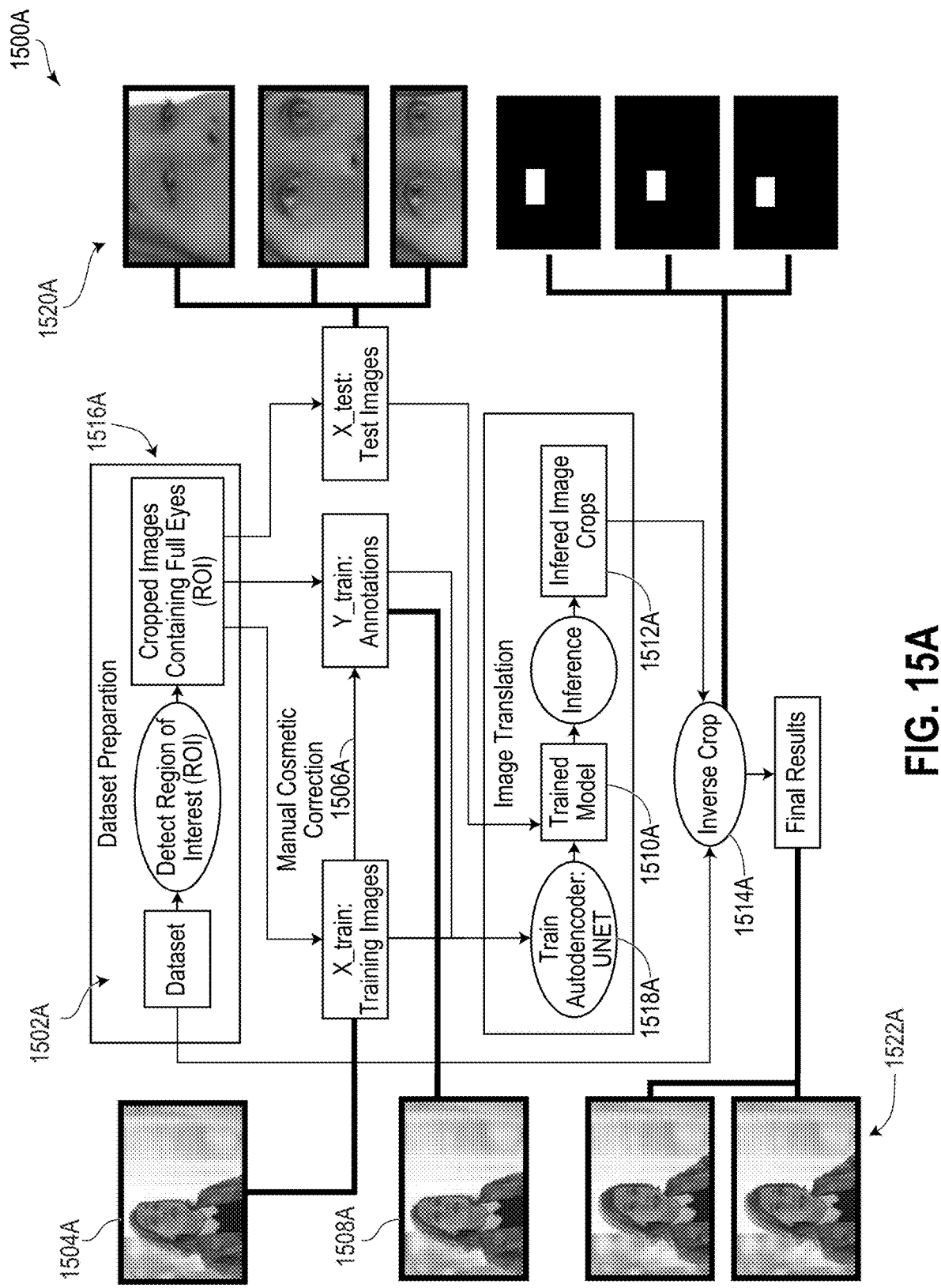
FIGS. 15A and 15B show flowcharts illustrating example use cases using Residual U-Net, according to some embodiments.
Figure 15B:
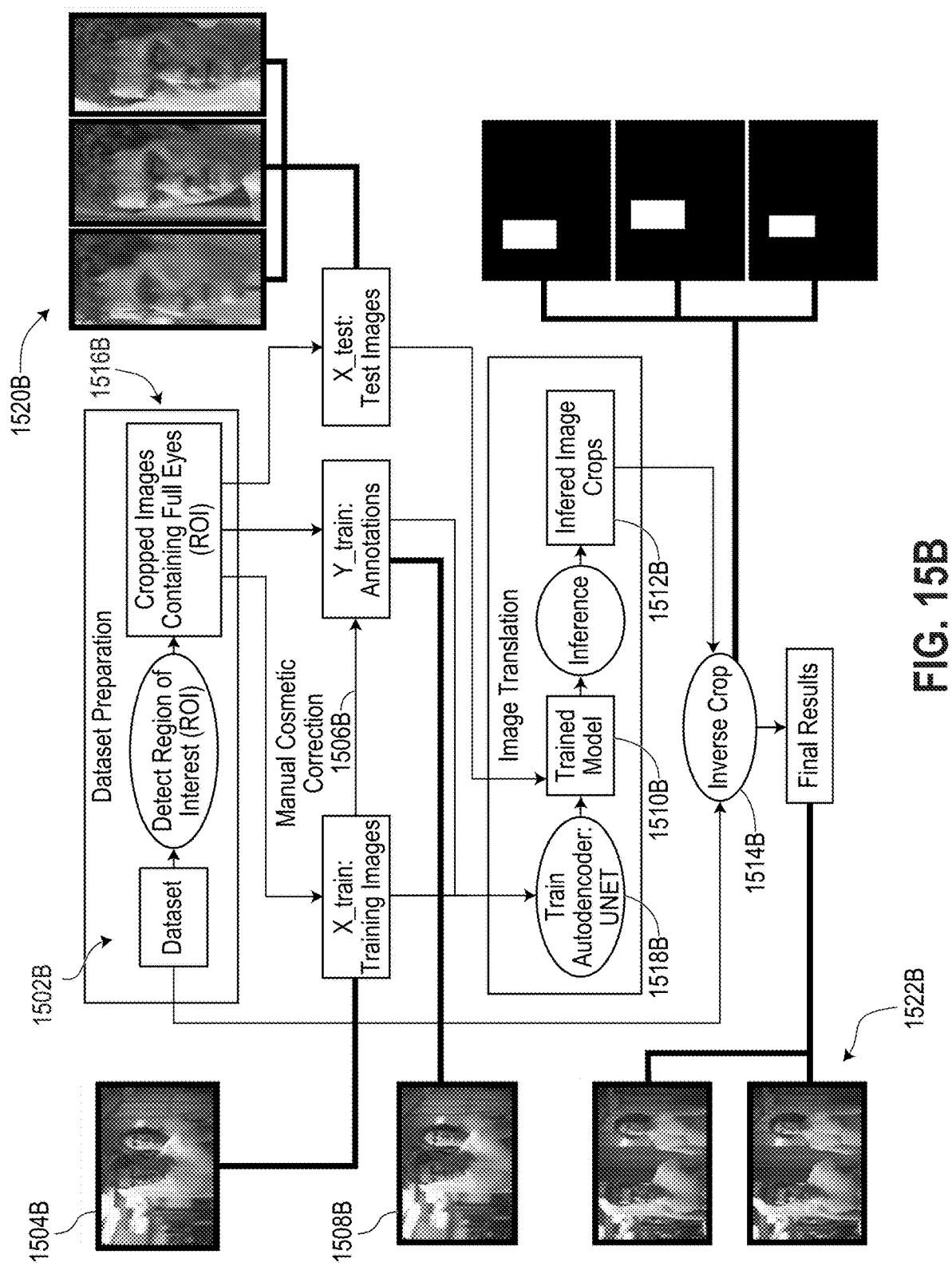

FIGS. 15A and 15B show flowcharts 1500A and 1500B illustrating example use cases using Residual U-Net, according to some embodiments.

FIG. 15A shows eye-bag correction using Residual U-Net, according to an embodiment. One of the example use cases of this process is eye de-aging. The goal of this task is to remove aging wrinkles and black circles for actors in a movie or production.

An example use case of the de-aging process is eye de-aging in 1500A. This task aims to remove aging wrinkles and black circles for the lead actors in a movie. The input images 1502A are comprised of the cropped faces of the actors for each image frame in every shot. Some of the images 1504A are handpicked such that they cover a variety of light conditions, facial expressions, etc. This subset of images 1504A is sent to the composition artist to manually perform the desired cosmetic corrections in 1506A. Once the client approves these corrections 1508A, they are used as the ground truth to train a supervised autoencoder.

FIG. 15B shows full face de-aging using Residual U-Net, according to an embodiment, which follows a similar flow to that in FIG. 15A. This task 1500B aims to remove all signs of aging on the face for the lead actors in a movie. This may, for example, involve removing aging wrinkles and black circles, as described above. The input images 1502B are comprised of the cropped faces of the actors for each image frame in every shot. Some of the images 1504B are handpicked such that they cover a variety of light conditions, facial expressions, etc. This subset of images 1504B is sent to the composition artist to manually perform the desired cosmetic corrections in 1506B. Once the client approves these corrections 1508B, they are used as the ground truth to train a supervised autoencoder.

In both 1500A and 1500B, the system may, in some embodiments, follow a similar process to that described in FIG. 14.

As can be seen in 1500A and 1500B, a work flow in some embodiments, may involve cropping all the dataset source images for the region of interest (e.g. full eyes) and retaining crop coordinates. Crops may then be split into training and test sets. The autoencoder model may be trained using cropped training images 1504A or 1504B and cropped annotated image pairs 1508A or 1508B (X_train, Y_train). The trained model 1510A or 1510B may perform image translation, and obtain inferred image crops 1512A or 1512B. Inverse crop 1514A or 1514B may then be used to back project the modified image in the original image to the target region using cropped coordinates.

The original images are typically part of a video. This video is further divided into a set of shots. Each shot consists of a set of images that are continuous in time. These images are commonly of a very high resolution (4K, for example). As a first step, in some embodiments, the images may be de-grained. This step removes the sharp information in the image and smooths the image overall. The de-grained information may then be added back to the image once the automatic image modification is complete. High-frequency details are difficult to learn with a small dataset. The purpose of this step is to maintain the high-resolution detail of the image without learning it.

The images, which in some embodiments are de-grained, are then automatically cropped for a region of interest in 1516A or 1516B. It may be sufficient to process only the region of an image that requires modification. This step ensures that the training process takes less time. Training on full images decreases computational efficiency as well as performance accuracy. If the application requires the full image transformation, for example style transfer, cropping-ROI steps can be omitted.

For each shot, a very small set of images, keyframes, are selected to be modified by professional artists manually. These images 1504A or 1504B and their modifications 1508A or 1508B are used as input and target images for the machine learning model in question.

An autoencoder 1518A or 1518B may be used to perform the image modification automatically. Using training image pairs, first, this autoencoder 1518A or 1518B is trained for the type of image improvement the model needs to perform. After training, test images 1520A or 1520B that are also cropped for the region of interest are passed as an input to this model, and the model returns the inferred/modified image 1512A or 1512B.

The inferred images are not the final outputs. These images are cropped at the region of interest that contains the target area of modification, but the machine learning model can inadvertently modify image regions that are outside the target area. If the application demands change only on a very focused region, it may be important to segment that region further inside the cropped image and return the modifications only to this segmented region. This step can also be skipped if the condition for the focused region modification is relaxed.

In some embodiments, a second machine learning model of type autoencoder may be trained to learn and segment the target area during image segmentation. An annotated image may be subtracted from the original image. The non-zero region of the resultant image from this subtraction is the exact region of the target. This image is defined as a mask. A set of pairs of images and their masks are used as input and target to train this network. The trained model is then applied to the rest of the images to segment the target image region pixels.

For example, in some embodiments a second model may be used to learn where the eye bags are exactly located under the eyes. Only those modified pixels that are identified as the eye-bag region by a segmentation model are then considered to be projected back to the original image to generate the final de-aged face.

Now, during inverse crop 1514A or 1514B, the modified pixels in the output image from the image translation model are back-projected to the original image in the target image region to get the final output image 1522A or 1522B. In some embodiment where image segmentation has been performed, the modified pixels in the output image from the image translation model are back-projected to the original image in the target image region identified in the segmentation model output.

In some embodiments, the proposed solution may allow for retention of the low-frequency information learned from the previous data while adding high-frequency, actor-specific data using a minimal set of image pairs. Moreover, when working on episodic shows, the data required for the same actor reduces for future episodes.

For a design model, according to one embodiment, define the source image as X and the target image as Y, where:

$$Y = X + (Y - X)$$
$$Y = I(X) + h(X)$$

Figure 16:
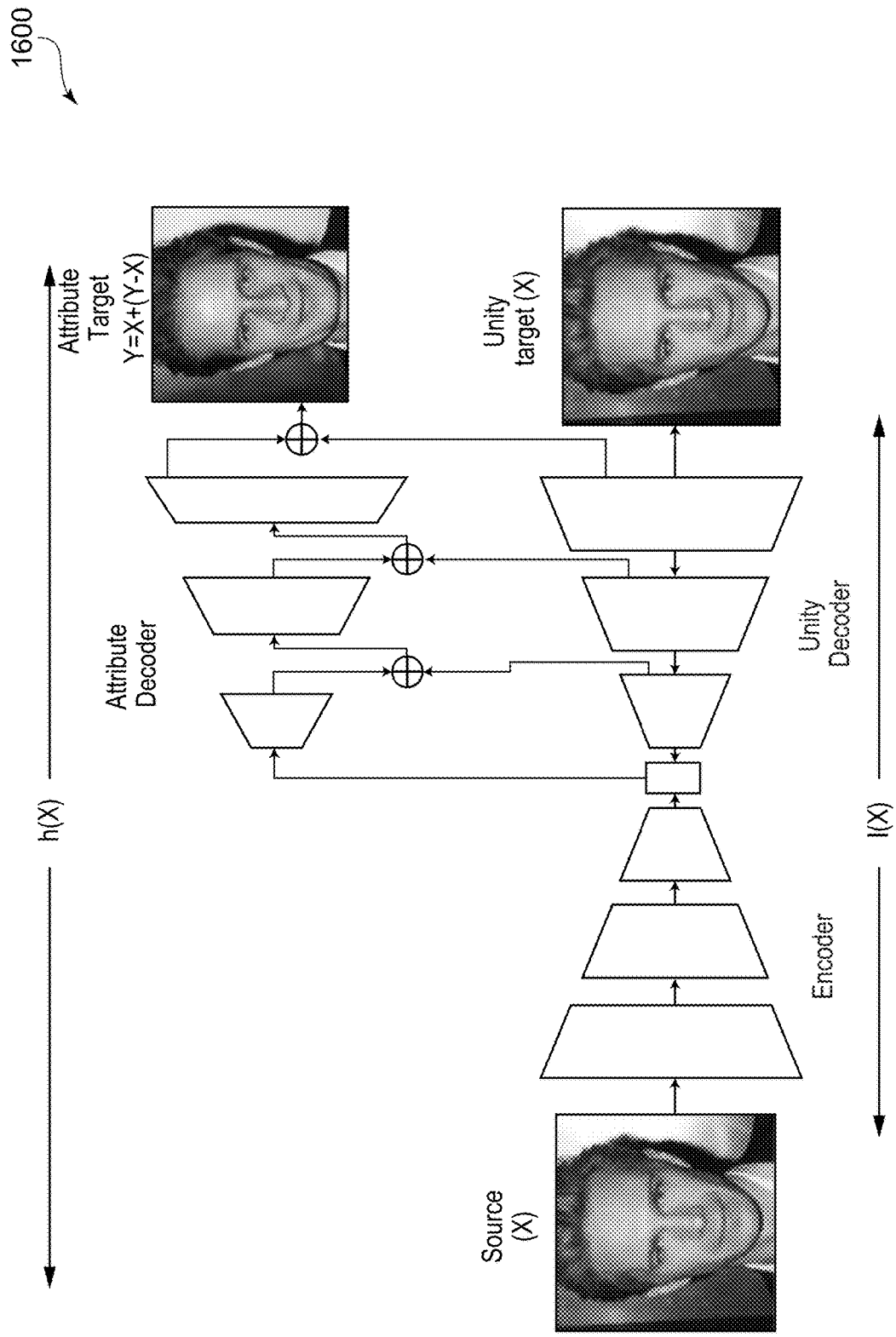
FIG. 16 shows a block diagram illustrating a proposed architecture design, according to some embodiments.

FIG. 16 shows a block diagram illustrating a proposed architecture design 1600, according to some embodiments. Here, I is a Unity network, and h is a difference network that, given the source, learns the difference between target and source. The reason to break down this image-to-image translation problem into two functions is twofold, 1) There are many more unchanged pixels than those that are changed. 2) To learn the unity function, there is no need for annotated data and the network can be trained in an unsupervised fashion. High-resolution facial data can be combined using various actors for this network, and hope to learn the low-frequency facial features. The difference network h is specific to a single actor and can be trained using a small set of paired images in a supervised fashion. This network may responsible, in some embodiments, for learning the high-frequency actor-specific features.

The unity network's training and inference can be described. During the training of the decoder of h, all the weights of network I are frozen. The output of I's encoder is passed as an input to h's decoder. Furthermore, at each resolution decoder, I's output is combined with the h's decoder output to construct the Y=X+(Y−X) at each resolution decoder. This way, the number of learnable parameters using supervised data is halved (as only the decoder needs to be trained, in some embodiments) and can be learned very well for a specific actor by using only a small dataset.

In model design, according to another embodiment, an approach is proposed that builds a network that takes (i) the input image X and (ii) one or more pairs of before/after reference images from the artists, P=[($X_1^*$, $Y_1^*$), ($X_2^*$, $Y_2^*$) ..., ($X_i^*$, $Y_i^*$)], i∈N, and then outputs a suitably transformed version of the input image Y.

Figure 17:
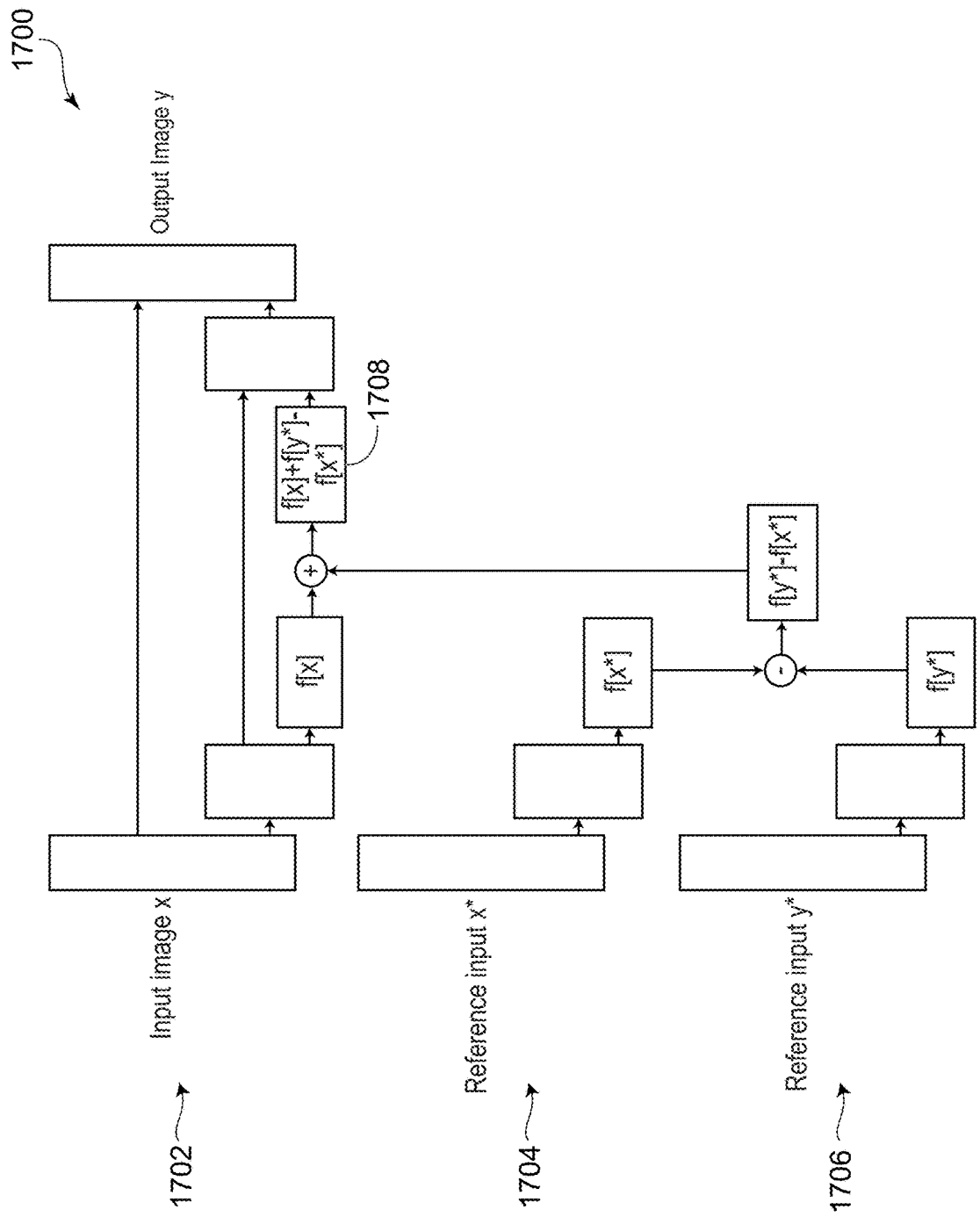
FIG. 17 shows a block diagram illustrating a proposed architecture design, according to some embodiments.

FIG. 17 shows a block diagram illustrating a proposed architecture design 1700, according to some embodiments. An example architecture which may do the above is as follows. Take an input image X 1702, a reference-before image x* 1704, and a reference-after image y* 1706. In some embodiments, x may be modified in the same way that x* has been modified to y*. In some embodiments, this architecture design may have a similar U-Net architecture.

All three images may be passed through the first half of the U-Net to representations, say f[x], f[x*], and f[y*]. Then f [x] may be modified in the same way that f [x*] has been modified to get f [y*] by adding the difference of those two tensors to create: f[x]+f[y*]−f[x*] 1708. Then this modified representation may be passed through the second half of the U-Net, which will upsample it and put the detail back in. In some embodiments, this net could be trained from all existing data (perhaps just for one actor, or more ambitiously, for all actors). Each training sample consists of three inputs and one output, in some embodiments. This approach, or a similar one, may be able to copy the style change from the reference pair and apply it to the input image. Some embodiments may be adapted to allow for multiple reference pairs to be taken.

Figure 18:
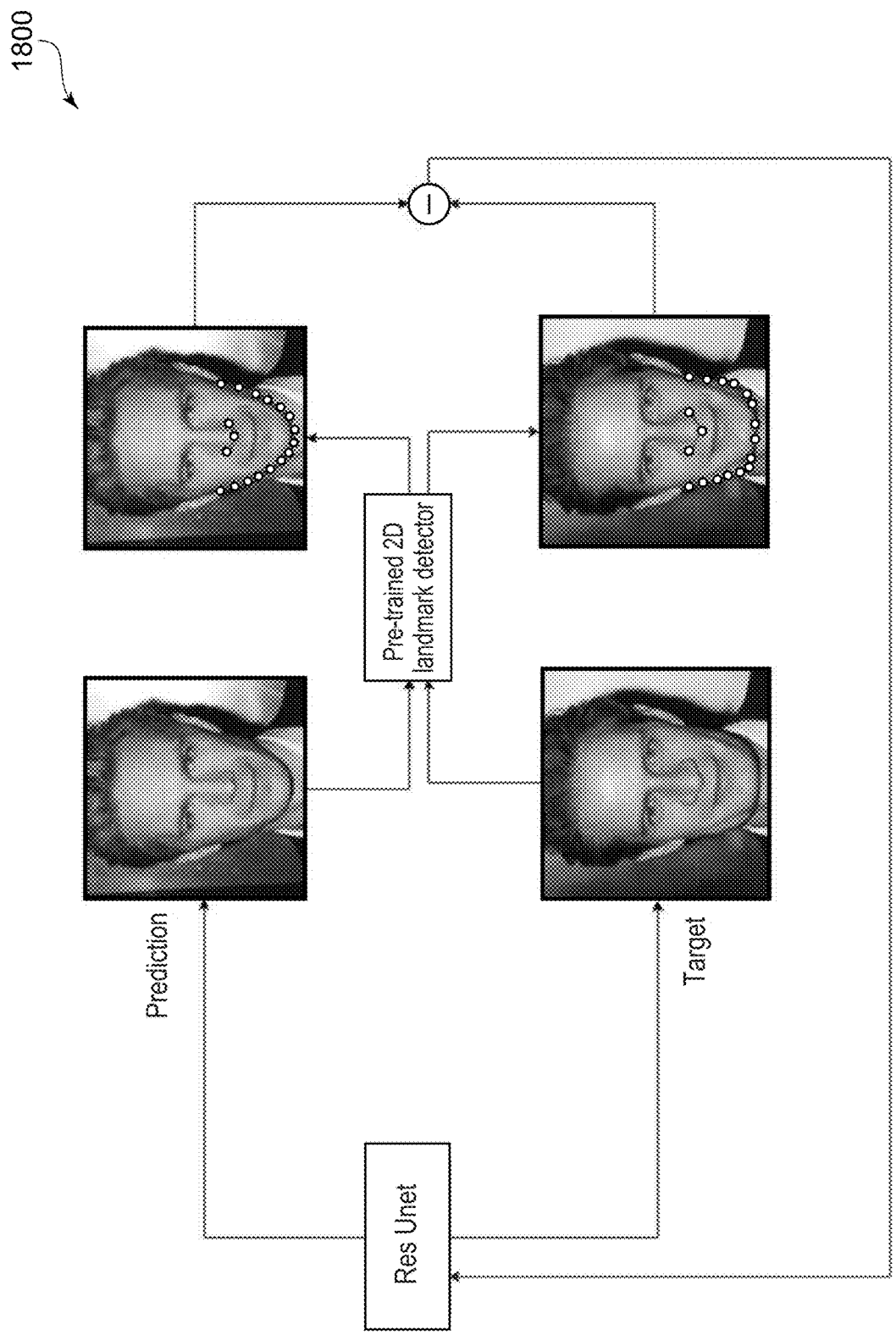
FIG. 18 shows a block diagram illustrating 2D landmark loss, according to some embodiments.

Example Loss Functions:

FIG. 18 shows a block diagram 1800 illustrating 2D landmark loss, according to some embodiments. For training, in some embodiments, input may be RGB and a segmentation mask of the source, and output may be an RGB image. A segmentation mask, for example, could be a two dimensional array of values that has dimensions that match the height and width of the frame or a region of frames, and, in some embodiments, is a pixel mask. The two-dimensional array, for example, can include values for masking or modifying the pixels themselves, and in a first embodiment, can include 0s and 1s, representing whether a particular pixel should be masked or not. In a second embodiment, the segmentation mask instead includes values between 0 and 1, operating as a softmax of probabilities, for example.

In the shown embodiment in FIG. 18, the following occurs at each training iteration:

Get an RGB output and pass this prediction output to the segmentation net to get the segmentation mask corresponding to the predicted image. Compute loss function on RGB images and segmentation masks of predicted and ground truth images. Compute the gradient and perform back-propagation.

When making the inference, in some embodiments, input may be RGB and a segmentation mask of the source, and output may be an RGB image of the target.

Figure 19:
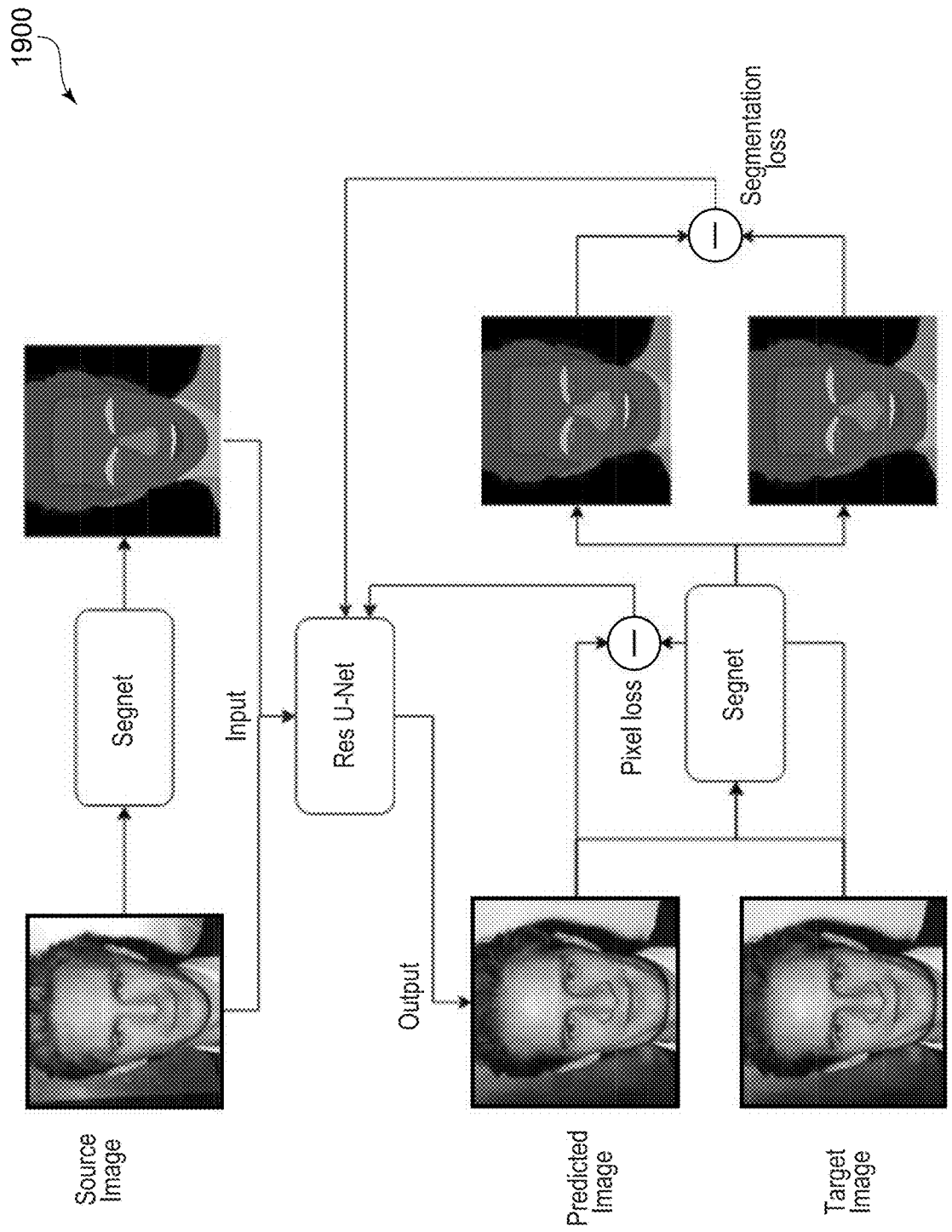
FIG. 19 shows a block diagram illustrating segmentation loss, according to some embodiments.

FIG. 19 shows a block diagram 1900 illustrating segmentation loss, according to some embodiments. For training, in some embodiments, input may be RGB and a segmentation mask of the source, and output may be an RGB image.

In the shown embodiment in FIG. 19, the following occurs at each training iteration:

Get an RGB output and pass this prediction output to the segmentation net to get the segmentation mask corresponding to the predicted image. Compute loss function on RGB images and segmentation masks of predicted and ground truth images. Compute the gradient and perform back-propagation.

When making the inference, in some embodiments, input may be RGB and a segmentation mask of the source, and output may be an RGB image of the target.

Figure 20:
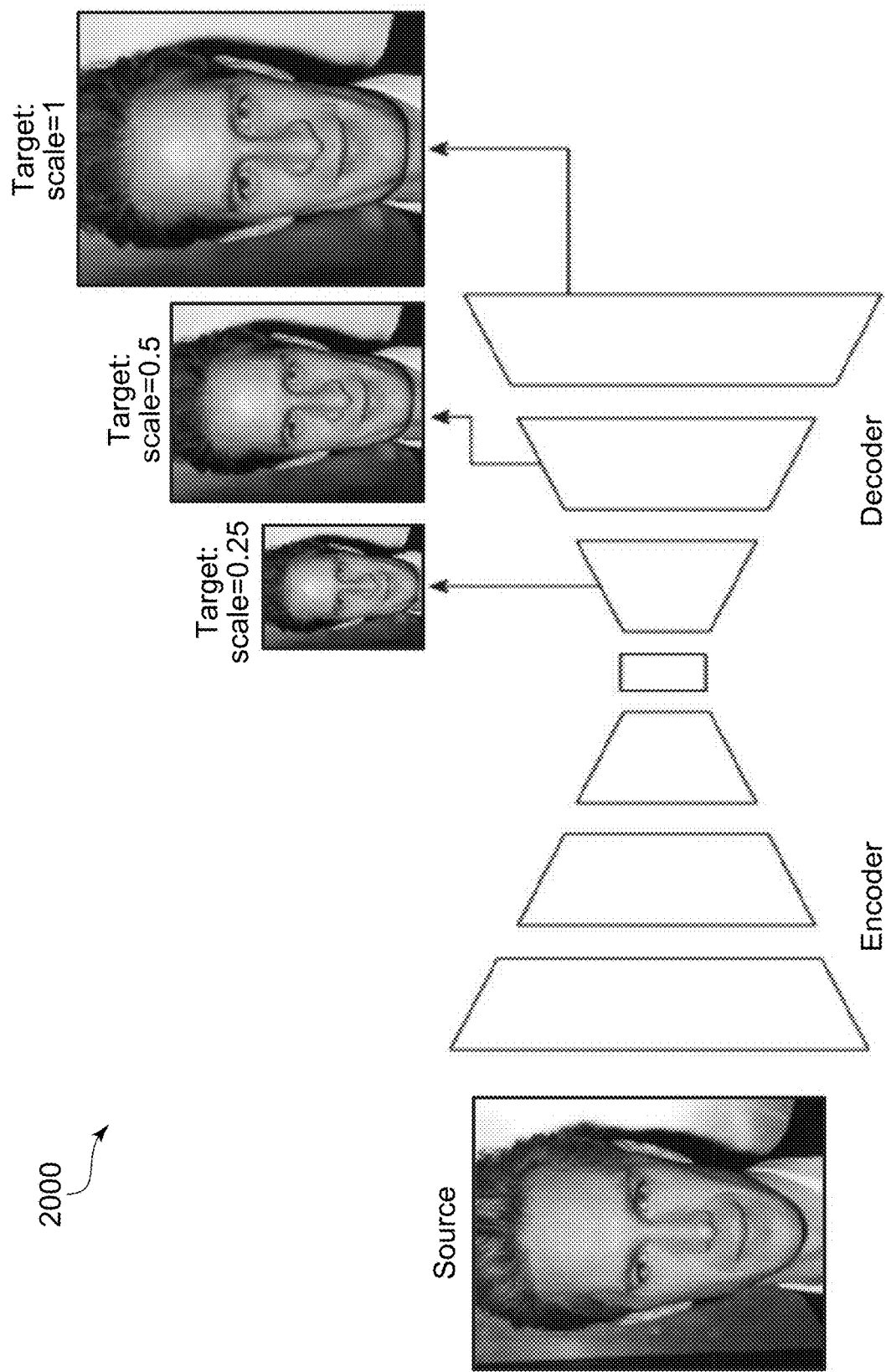
FIG. 20 shows a block diagram illustrating multi-scale reconstruction loss, according to some embodiments.

FIG. 20 shows a block diagram 2000 illustrating multi-scale reconstruction loss, according to some embodiments. For training, in some embodiments, input may be an RGB image of the source, and output may be an RGB image at every decoder block.

In the shown embodiment in FIG. 20, the following occurs at each training iteration:

Determine loss at a different resolution to capture coarse to fine detail reconstruction loss. Compute gradient and perform back-propagation on the weighted losses of each resolution where higher resolution gets more weight.

When making the inference, in some embodiments, input may be RGB of the source, and output may be an RGB image at source resolution.

Figure 21:
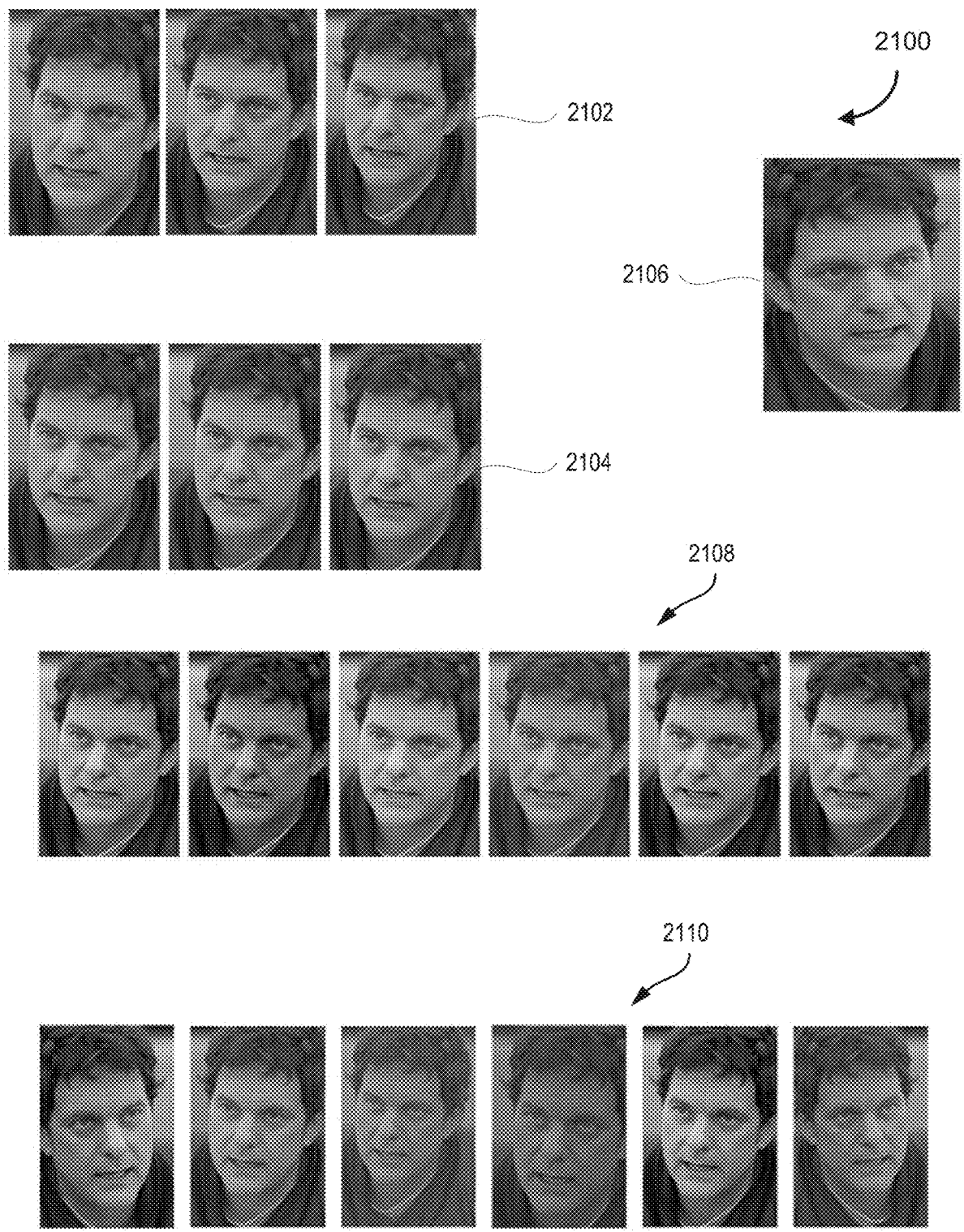
FIG. 21 shows images illustrating example augmentations, according to some embodiments.

FIG. 21 shows images 2100 illustrating example augmentations, according to some embodiments. Scale augmentations are shown in 2102, where the augmentations are randomly scaled by s∈[0.8, 1.2]. Translation augmentations are shown in 2104, where the augmentations are randomly translated to (x,y)ε([x−20,x+20], [y−20, y+20]. A flip augmentation is shown in 2106, where to augmentation was randomly flipped with 0.5 probability. Various colour augmentations are shown in 2108, including brightness, hue, saturation, and contrast augmentations: Hue+delta_h: [−0.08, 0.08]; Saturation+delta_s: [0.6, 1.6]; Brightness+delta_b: [−0.05, 0.05]; Contrast+delta_c: [0.7, 1.3]. All the augmentations are combined and shown in 2110.

Figure 22:
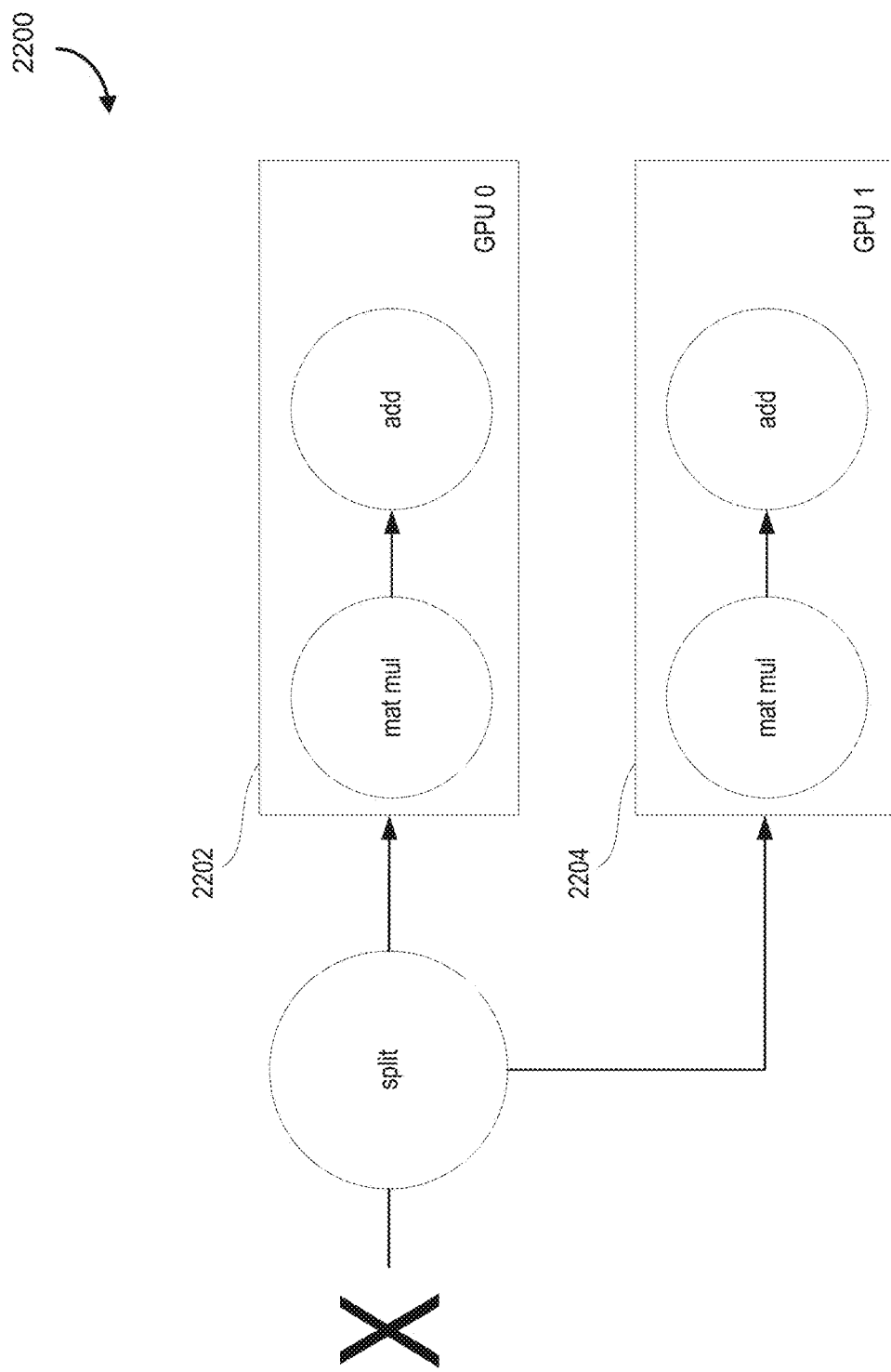
FIG. 22 shows a block diagram illustrating an example of data distributed over two GPUs, according to some embodiments.

The described embodiments provide numerous technical advantages. FIG. 22 shows a block diagram 2200 illustrating an example of data distributed over two GPUs, according to some embodiments.

For example, one caveat of using a complex model and combined dataset is the need for higher GPU memory. To overcome GPU memory limitations, distributed learning may be introduced in the system, according to some embodiments. This method enables the parallel usage of multiple GPUs over a single machine or multiple machines in the network. For instance, the use of GPU 0 2202 and GPU 1 220. Using the distributed learning model, the dataset may be distributed over several GPUs which perform the training faster than before. Thereby providing more efficient use of computing resources.

Described embodiments also provided input and output support for the DPX Log3G10 Colour Space. The VFX-specific data extension is different from the regular images. The most commonly used extensions here are EXR and DPX. With the OpenImageIO integration, the system, in some embodiments, can now read/write any type of file extension. In addition, there are various colour spaces that the model should be able to convert to linear before applying any transformation. In some embodiments, the system can handle rare colour spaces such as Log3G10.

Figure 23:
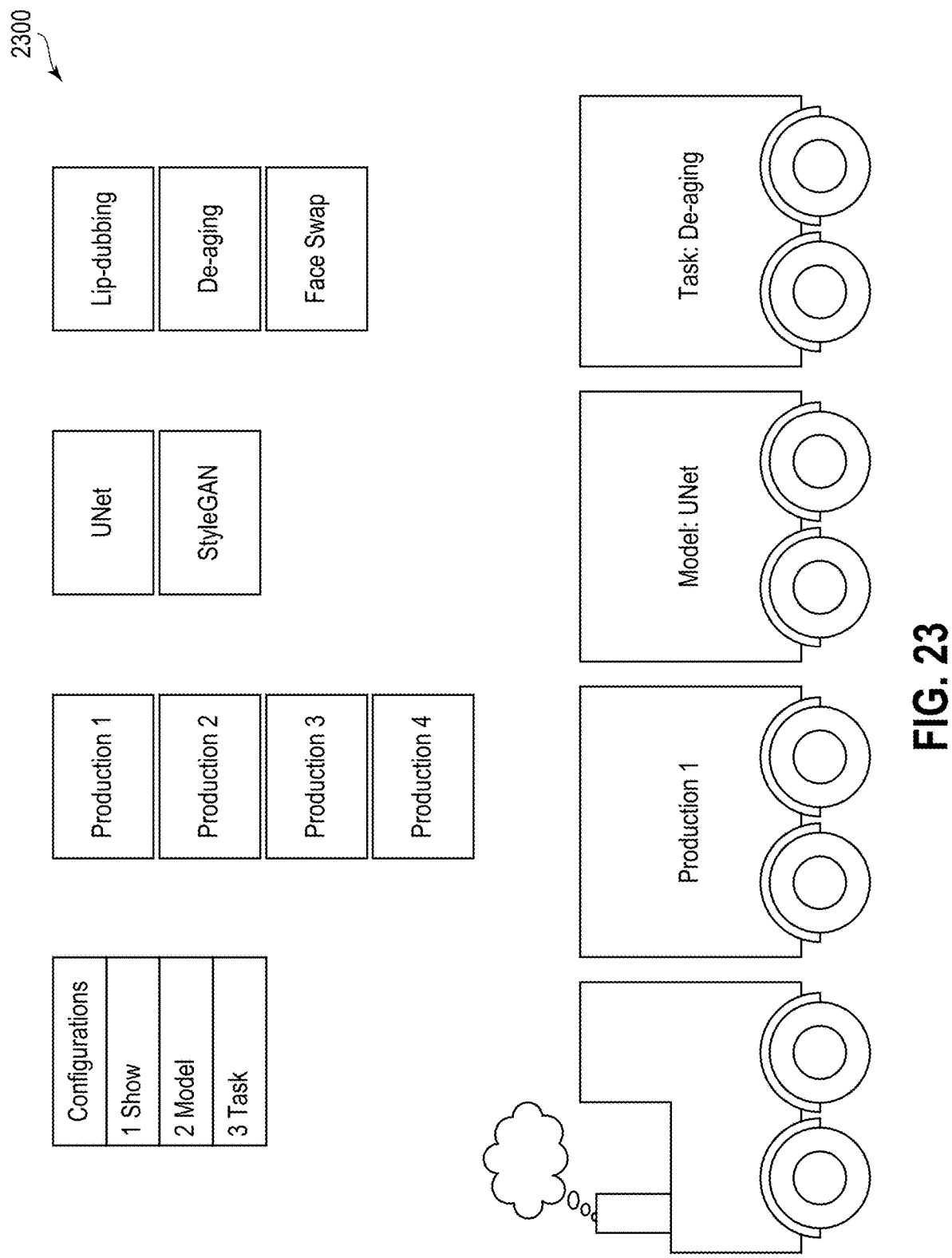
FIG. 23 shows a block diagram illustrating a flexible hydra configuration, according to some embodiments.

FIG. 23 shows a block diagram illustrating a flexible hydra configuration, according to some embodiments.

Described embodiments may allow for a flexible hydra configuration, as shown in 2300 which provides easy combination of model, data and hyperparameter set for fast benchmarking and experiments.

Described embodiments also provide advantages with respective to quantitative evaluation. Evaluation of a result means to compare the model output with the ground truth provided by Comp artists and determine if the results are potentially acceptable as Perfect or Polish.

A better quantitative evaluation of a result produced by the described model than the mean pixel error, mentioned earlier, was desired. The newly implemented quantitative evaluation, in some embodiments, presents a set of custom evaluation metrics, which users can configure. The four supported methods of evaluation are:

1. Mean of the absolute value of the difference between the predicted image and the ground truth image
2. Structure similarity between the two images 3. Mean of the absolute value of the difference between the predicted image and the ground truth image after thresholding 4. Histogram of the difference between the ground truth and the predicted image Other embodiments may support more or fewer methods of evaluation, and methods of evaluation not listed above.

Once the benchmarks are set up, this tool allows a user to have a sense of how good a model is, and it facilitates the quantitative evaluation of results before an artist team reviews them and provides qualitative feedback.

Layer visualization was developed to get better insight into which layers of the model are learning which features of the image. It is a tool, according to some embodiments, to visualize layers of CNN-based models. Users can choose which layers to visualize by passing in the index of the layers of interest. The tool may run on selected frames and save the visualized layers to a designated location.

Automatic shotgun patch fetching: Determining the shot paths from configuration files only leaves room for issues if there are version changes or other changes to the source/dataset path. By using the shotgun API, some embodiments may fetch the correct version of the degrained plates and degrained Comp from the Shotgun data directly. Calling this process is an optional configuration parameter, in some embodiments. This is most useful for projects that are in active production, for example.

Automatic shotgun publishes and review requests: It is important to make the transfer from ML to the compositing team as seamless as possible. By using an automated publishing tool, having to send plates for review over instant messaging, private group forums or emails, for instance, can be avoided. Any shot published under the ml_result or ml_model-train_inference tasks may be automatically assigned to the designated MLreview Comp personnel.

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Thus, the preceding detailed description is presented for purposes of illustration only and not of limitation, and the scope of the invention is defined by the preceding description, and with respect to the attached claims.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended embodiments are intended to include within their scope such processes, machines, manufacture, compositions of matter, means, methods, or steps.

As can be understood, the examples described above and illustrated are intended to be exemplary only.

As described in various embodiments above, a computer system configured to automatically interpolate or extrapolate visual modifications from a set of keyframes extracted from a set of target video frames is proposed. The system includes a computer processor, operating in conjunction with computer memory maintaining a machine learning model architecture. The computer processor is configured to: receive the set of target video frames; identify, from the set of target video frames, the set of keyframes; provide the set of keyframes for visual modification by a human; receive a set of modified keyframes; train the machine learning model architecture using the set of modified keyframes and the set of keyframes, the machine learning model architecture including a first autoencoder configured for unity reconstruction of the set of modified keyframes from the set of keyframes to obtain a trained machine learning model architecture; and process one or more frames of the set of target video frames to generate a corresponding set of modified target video frames having the automatically interpolated or extrapolated visual modifications.

The visual modifications can include visual effects applied to a target human being or a portion of the target human being visually represented in the set of target video frames.

The visual modifications can further include at least one of eye-bag addition/removal, wrinkle addition/removal, or tattoo addition/removal.

In some embodiments, the computer processor is further configured to: pre-process the set of target video frames to obtain a set of visual characteristic values present in each frame of the set of target video frames; and identify distributions or ranges of the set of visual characteristic values.

The set of visual characteristic values present in each frame of the set of target video frames can be utilized to identify which frames of the set of target video frames form the set of keyframes, and in a further variation, the set of visual characteristic values present in each frame of the set of target video frames are utilized to identify which frames of the set of target video frames form the set of keyframes includes at least one of a pose value, a lighting direction value, or a numbering of lighting sources value.

In another variation, the set of visual characteristic values present in each frame of the set of target video frames is utilized to perturb the set of modified keyframes to generate an augmented set of modified keyframes, the augmented set of modified keyframes representing an expanded set of additional modified keyframes having modified visual characteristic values generated across the ranges or distributions of the set of visual characteristic values, the augmented set of modified keyframes utilized for training the machine learning model architecture. The set of visual characteristic values present in each frame of the set of target video frames can also be utilized to generate the augmented set of modified keyframes includes at least one of a brightness value, a contrast value, a translation value, a rotation value, a hue value, a saturation value, a tint value, or a crop value.

To reduce an overall computing burden, in some embodiments, the visual modification is conducted across an identified region of interest in the set of target video frames, and the computer processor is configured to pre-process the set of target video frames to identify a corresponding region of interest in each frame of the set of target video frames. The corresponding set of modified target video frames having the automatically interpolated or extrapolated visual modifications can include modified frame regions of interest for combining into the set of target video frames.

In another variation, the corresponding region of interest in each frame of the set of target video frames is defined using a plurality of segmentation masks. In this variation, the machine learning model architecture includes a second autoencoder that is trained for identifying segmented target regions through comparing modifications in the set of modified keyframes with the corresponding frames of the set of keyframes, the second autoencoder, after training, configured to generate a new segmented target region when provided a frame of the set of target video frames.

Outputs of the first autoencoder and the second autoencoder can be combined together to conduct modifications of the provided frame of the set of target video frames to generate a final output frame having a modification generated by the first autoencoder applied in the new segmented target region generated by the second autoencoder.

In another variation, training the machine learning model architecture using the set of modified keyframes and the set of keyframes includes determining per-pixel differences between the set of modified keyframes and the set of keyframes.

The trained machine learning model architecture, after training, can be replicated for usage in a plurality of parallel processing pipelines, each parallel processing pipeline of the parallel processing pipelines configured to process a corresponding subset of frames of the set of target video frames.

Different variations of model usage are possible. For example, for each target human being present in the set of target frames, a separate corresponding trained machine learning model architecture can be utilized, or for situations where there are different one or more discrete desired visual modifications are made to the target human being, for each of the one or more discrete desired visual modifications, a separate corresponding trained machine learning model architecture is utilized.

The computer system can be provided as a computing appliance coupled to a system implementing a post-production processing pipeline. Other cloud-based distributed computing variations are possible.

The post-production processing pipeline can include manually assessing each frame of the corresponding set of modified target video frames having the automatically interpolated or extrapolated visual modifications to identify a set of incorrectly modified frames; wherein for each frame of the set of incorrectly modified frames, a reviewer provides a corresponding revision frame; and wherein the trained machine learning model architecture is further retrained using a combination of revision frames and a corresponding modified target video frame corresponding to each revision frame of the revision frames.

Corresponding computer implemented methods and non-transitory computer readable media (e.g. computer program products) are contemplated.

What is claimed is:

1. A computer system configured to automatically interpolate or extrapolate visual modifications from a set of keyframes extracted from a set of target video frames, the system comprising:
a computer processor, operating in conjunction with computer memory maintaining a machine learning model architecture, the computer processor configured to:
receive the set of target video frames;
identify, from the set of target video frames, the set of keyframes;
provide the set of keyframes for visual modification;
receive a set of modified keyframes;
train the machine learning model architecture using the set of modified keyframes and the set of keyframes, the machine learning model architecture configured for reconstruction of the set of modified keyframes from the set of keyframes to obtain a trained machine learning model architecture; and
process one or more frames of the set of target video frames to generate a corresponding set of modified target video frames having the automatically interpolated or extrapolated visual modifications.

2. The computer system of claim 1, wherein the visual modifications include visual effects applied to a target human being or a portion of the target human being visually represented in the set of target video frames.

3. The computer system of claim 2, wherein the visual modifications include at least one of eye-bag addition/removal, wrinkle addition/removal, or tattoo addition/removal.

4. The computer system of claim 2, wherein the computer processor is further configured to:
  pre-process the set of target video frames to obtain a set of visual characteristic values present in each frame of the set of target video frames; and
  identify distributions or ranges of the set of visual characteristic values.

5. The computer system of claim 4, wherein the set of visual characteristic values present in each frame of the set of target video frames is utilized to identify which frames of the set of target video frames form the set of keyframes.

6. The computer system of claim 4, wherein the set of visual characteristic values present in each frame of the set of target video frames is utilized to perturb the set of modified keyframes to generate an augmented set of modified keyframes, the augmented set of modified keyframes representing an expanded set of additional modified keyframes having modified visual characteristic values generated across the ranges or distributions of the set of visual characteristic values, the augmented set of modified keyframes utilized for training the machine learning model architecture.

7. The computer system of claim 1, wherein the visual modification is conducted across an identified region of interest in the set of target video frames, and the computer processor is configured to pre-process the set of target video frames to identify a corresponding region of interest in each frame of the set of target video frames.

8. The computer system of claim 7, wherein the corresponding set of modified target video frames having the automatically interpolated or extrapolated visual modifications include modified frame regions of interest for combining into the set of target video frames, and wherein the corresponding region of interest in each frame of the set of target video frames is defined using a plurality of segmentation masks.

9. The computer system of claim 8, wherein the machine learning model architecture includes an autoencoder that is trained for identifying segmented target regions through comparing modifications in the set of modified keyframes with the corresponding frames of the set of keyframes, the autoencoder, after training, configured to generate a new segmented target region when provided a frame of the set of target video frames; and
  wherein outputs of the machine learning model architecture and the autoencoder are combined together to conduct modifications of the provided frame of the set of target video frames to generate a final output frame having a modification generated by the machine learning model architecture applied in the new segmented target region generated by the autoencoder.

10. The computer system of claim 1, wherein the computer system is provided as a computing appliance coupled to a system implementing a post-production processing pipeline, and wherein the post-production processing pipeline includes manually assessing each frame of the corresponding set of modified target video frames having the automatically interpolated or extrapolated visual modifications to identify a set of incorrectly modified frames;
  wherein for each frame of the set of incorrectly modified frames, a reviewer provides a corresponding revision frame; and
  wherein the trained machine learning model architecture is further retrained using a combination of revision frames and a corresponding modified target video frame corresponding to each revision frame of the revision frames.

11. A computer implemented method for automatic interpolation or extrapolation of visual modifications from a set of keyframes extracted from a set of target video frames, the method comprising:
  instantiating a machine learning model architecture;
  receiving the set of target video frames;
  identifying, from the set of target video frames, the set of keyframes;
  providing the set of keyframes for visual modification;
  receiving a set of modified keyframes;
  training the machine learning model architecture using the set of modified keyframes and the set of keyframes, the machine learning model architecture configured for reconstruction of the set of modified keyframes from the set of keyframes to obtain a trained machine learning model architecture; and
  processing one or more frames of the set of target video frames to generate a corresponding set of modified target video frames having the automatically interpolated or extrapolated visual modifications.

12. The computer implemented method of claim 11, wherein the visual modifications include visual effects applied to a target human being or a portion of the target human being visually represented in the set of target video frames.

13. The computer implemented method of claim 12, wherein the visual modifications include at least one of eye-bag addition/removal, wrinkle addition/removal, or tattoo addition/removal.

14. The computer implemented method of claim 12, wherein the method comprises:
  pre-processing the set of target video frames to obtain a set of visual characteristic values present in each frame of the set of target video frames; and
  identifying distributions or ranges of the set of visual characteristic values.

15. The computer implemented method of claim 14, wherein the set of visual characteristic values present in each frame of the set of target video frames is utilized to identify which frames of the set of target video frames form the set of keyframes.

16. The computer implemented method of claim 14, wherein the set of visual characteristic values present in each frame of the set of target video frames is utilized to perturb the set of modified keyframes to generate an augmented set of modified keyframes, the augmented set of modified keyframes representing an expanded set of additional modified keyframes having modified visual characteristic values generated across the ranges or distributions of the set of visual characteristic values, the augmented set of modified keyframes utilized for training the machine learning model architecture.

17. The computer implemented method of claim 11, wherein the visual modification is conducted across an identified region of interest in the set of target video frames, and the method comprises configured to pre-processing the set of target video frames to identify a corresponding region of interest in each frame of the set of target video frames.

18. The computer implemented method of claim 17, wherein the corresponding set of modified target video frames having the automatically interpolated or extrapolated visual modifications include modified frame regions of interest for combining into the set of target video frames, and wherein the corresponding region of interest in each frame of the set of target video frames is defined using a plurality of segmentation masks.

19. The computer implemented method of claim 18, wherein the machine learning model architecture includes an autoencoder that is trained for identifying segmented target regions through comparing modifications in the set of modified keyframes with the corresponding frames of the set of keyframes, the autoencoder, after training, configured to generate a new segmented target region when provided a frame of the set of target video frames; and wherein outputs of the machine learning model architecture and the autoencoder are combined together to conduct modifications of the provided frame of the set of target video frames to generate a final output frame having a modification generated by the machine learning model architecture applied in the new segmented target region generated by the autoencoder.

20. A non-transitory computer readable medium, storing machine-interpretable instruction sets which when executed by a processor, cause the processor to perform a method for automatic interpolation or extrapolation of visual modifications from a set of keyframes extracted from a set of target video frames, the method comprising:

instantiating a machine learning model architecture;
receiving the set of target video frames;
identifying, from the set of target video frames, the set of keyframes;
providing the set of keyframes for visual modification;
receiving a set of modified keyframes;
training the machine learning model architecture using the set of modified keyframes and the set of keyframes, the machine learning model architecture configured for reconstruction of the set of modified keyframes from the set of keyframes to obtain a trained machine learning model architecture; and
processing one or more frames of the set of target video frames to generate a corresponding set of modified target video frames having the automatically interpolated or extrapolated visual modifications.

* * * * *